United States Patent
Ghosh et al.

(10) Patent No.: US 10,376,861 B2
(45) Date of Patent: Aug. 13, 2019

(54) METHOD, SYNTHESIS, ACTIVATION PROCEDURE AND CHARACTERIZATION OF AN OXYGEN RICH ACTIVATED POROUS CARBON SORBENT FOR SELECTIVE REMOVAL OF CARBON DIOXIDE WITH ULTRA HIGH CAPACITY

(71) Applicants: William Marsh Rice University, Houston, TX (US); Apache Corporation, Houston, TX (US)

(72) Inventors: Saunab Ghosh, Houston, TX (US); Andrew R. Barron, Houston, TX (US); Jason Ho, Houston, TX (US)

(73) Assignees: WILLIAM MARSH RICE UNIVERSITY, Houston, TX (US); APACHE CORPORATION, Houston, TX (US)

(*) Notice: Subject to any disclaimer, the term of this patent is extended or adjusted under 35 U.S.C. 154(b) by 0 days.

(21) Appl. No.: 15/875,471

(22) Filed: Jan. 19, 2018

(65) Prior Publication Data
US 2018/0169611 A1 Jun. 21, 2018

Related U.S. Application Data

(63) Continuation of application No. 15/631,341, filed on Jun. 23, 2017, now Pat. No. 10,232,342, which is a continuation-in-part of application No. 15/200,632, filed on Jul. 1, 2016, now abandoned.

(60) Provisional application No. 62/187,744, filed on Jul. 1, 2015.

(51) Int. Cl.
| | | |
|---|---|---|
| C01B 31/08 | (2006.01) | |
| B01J 20/20 | (2006.01) | |
| C10L 3/10 | (2006.01) | |
| B01J 20/30 | (2006.01) | |
| B01J 20/28 | (2006.01) | |
| B01D 53/04 | (2006.01) | |
| C01B 32/30 | (2017.01) | |
| B01D 53/02 | (2006.01) | |
| C01B 32/342 | (2017.01) | |

(52) U.S. Cl.
CPC ............. B01J 20/20 (2013.01); B01D 53/02 (2013.01); B01D 53/04 (2013.01); B01J 20/2808 (2013.01); B01J 20/28066 (2013.01); B01J 20/28076 (2013.01); B01J 20/3078 (2013.01); C01B 32/30 (2017.08); C01B 32/342 (2017.08); C10L 3/104 (2013.01); *B01D 2253/102* (2013.01); *B01D 2253/306* (2013.01); *B01D 2253/311* (2013.01); *B01D 2256/245* (2013.01); *B01D 2257/504* (2013.01); *C10L 2290/542* (2013.01); *Y02C 10/08* (2013.01); *Y02P 20/152* (2015.11)

(58) Field of Classification Search
CPC ................................ C01B 32/30; B01D 53/04
See application file for complete search history.

(56) References Cited

U.S. PATENT DOCUMENTS

| | | | | |
|---|---|---|---|---|
| 5,269,834 A | * | 12/1993 | Dotson | ............. B01D 19/0031 210/662 |
| 8,840,706 B1 | | 9/2014 | Srinivasachar | |
| 8,926,932 B2 | * | 1/2015 | Pfeifer | ..................... B01J 20/20 252/502 |
| 8,993,478 B2 | * | 3/2015 | Fujii | ..................... H01G 9/058 502/427 |

OTHER PUBLICATIONS

Office Action issued by U.S. patent office for U.S. Appl. No. 15/640,765, dated Dec. 6, 2017.
D'Alessandro, et al., "Carbon Dioxide Capture: Prospects for New Materials", Angew. Chem. Int. Ed. 2010, 49, 6058-6082.
Shen, Fenghua, et al. Oxygen-Rich Porous Carbon Derived from Biomass for Mercury Removal: An Experimental and Theoretical Study), American Chemical Society 2018, 34, 12049-12057, State Key Laboratory of Coal Combustion, School of Energy and Power Engineering, Huazhong University of Science and Technology, Wuhan 430074, China.
Ma, Hongyun et al.,Tailoring the oxygenated groups of graphene hydrogels for high-performance supercapacitors with large areal mass loadings, Journal of Materials Chemistry A, Dec. 11, 2017: 6587-6594.
Chen, Mingfeng et al., Oxygen-rich porous carbon sheets: Facile one-step synthesis and enhanced electrochemical performance, Diamond and Related Materials 85 (2018): 89-97.
Blankenship, Troy Scott et al., Oxygen-rich microporous carbons with exceptional hydrogen storage capacity, Nature Communications 8, Nov. 16, 2017.
Li, Jing et al., Oxygen-rich hierarchical porous carbon made from pomelo peel fiber as electrode material for supercapacitor, Applied Surface Science 416, Sep. 15, 2017: 918-924.

(Continued)

*Primary Examiner* — Stuart L Hendrickson
(74) *Attorney, Agent, or Firm* — Winstead PC

(57) ABSTRACT

The present disclosure pertains to methods of capturing $CO_2$ from an environment at pressures above 1 bar by associating the environment with a porous material that has a surface area of at least 2,800 m$^2$/g, and a total pore volume of at least 1.35 cm$^3$/g, where a majority of pores of the porous material have diameters of less than 2 nm. The present disclosure also pertains to methods for the separation of $CO_2$ from natural gas in an environment at partial pressures of either component above 1 bar by associating the environment with a porous material that has a surface area of at least 2,200 m$^2$/g, and a total pore volume of at least 1.00 cm$^3$/g, where a majority of pores of the porous material have diameters of greater than 1 nm and less than 2 nm.

26 Claims, 68 Drawing Sheets

(56) References Cited

OTHER PUBLICATIONS

Zhang, Yongzhi et al., Sodium Carboxymethylcellulose Derived Oxygen-Rich Porous Carbon Anodes for High-Performance Lithium/Sodium-Ion Batteries, ChemElectroChem 4.3, Mar. 2017: 500-507.

Zhao, Yufeng et al., Oxygen-Rich Hierarchical Porous Carbon Derived from Artemia Cyst Shells with Superior Electrochemical Performance, ACS Applied Materials & Interfaces 7.2, Jan. 21, 2015: 1132-1139.

Satko, Daniel P. et al., Effect of microstructure on oxygen rich layer evolution and its impact on fatigue life during high-temperature application of $\alpha/\beta$ titanium, Acta Materialia 107, Apr. 1, 2016: 377-389.

Mohottala, Hashini E. et al., Flux pinning and phase separation in oxygen-rich $La_2—xSr_xCuO_{4+y}$, Physical Review B (Condensed Matter and Materials Physics) 78.6, Aug. 2008: 064504-1-5.

Wells, B.O., et al., Intercalation and staging behavior in super-oxygenated $La_2CuO_{4+\delta}$, Zeitschrift fur Physik B (Condensed Matter) 100.4, Aug. 1996: 535-45.

Hebard, A.F., et al., Enhanced Cohesion of Photo-Oxygenated Fullerene Films: A New Opportunity for Lithography, Applied Physics A (Solids and Surfaces) 57.3, Sep. 1993: 299-303.

McGraw-Hill Dictionary of Scientific and Technical Terms, Sixth Edition, Copyright 2003, 1994, 1984, 1978, 1976, 1974 by The McGraw-Hill Companies, Inc., Technical dictionary definitely of "Oxygenate [CHEM]", p. 1510.

\* cited by examiner

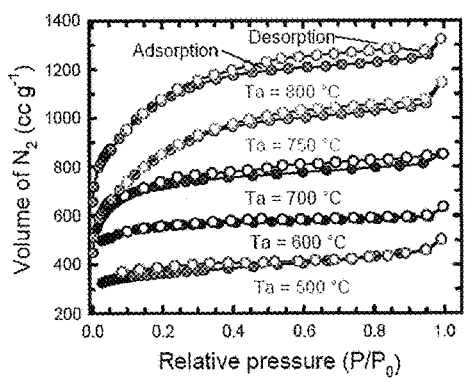
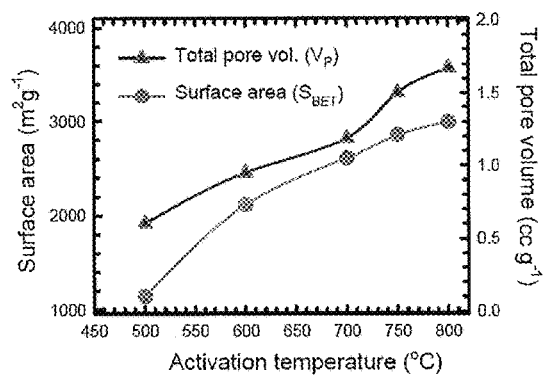
FIG. 16A
FIG. 16B
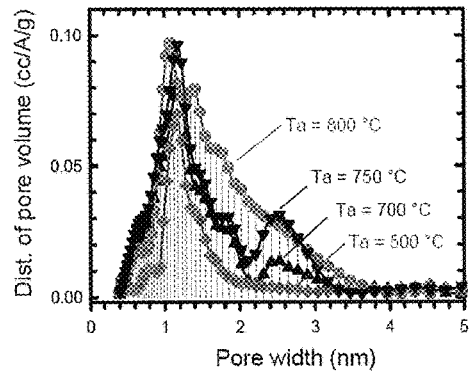
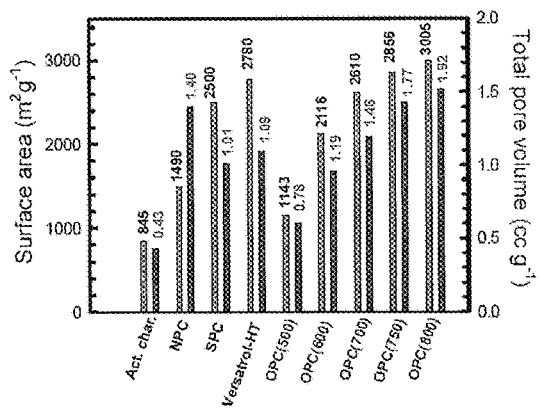
FIG. 16C
FIG. 16D

Synthesis scheme for OPC

C-precursor

OPC

SPC wt %
C: 90.6
O: 9.4

Anisyl alcohol

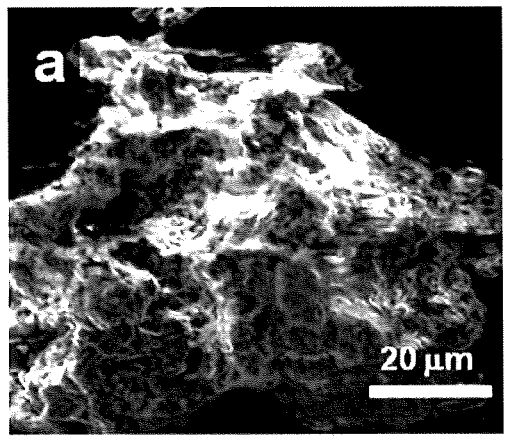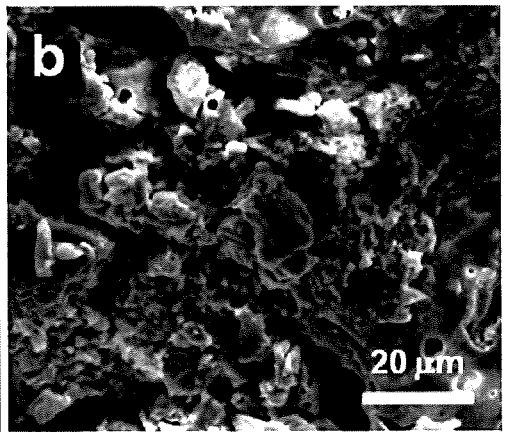
FIG. 26A  FIG. 26B
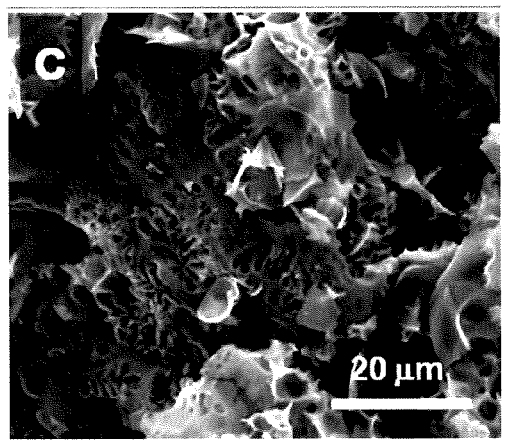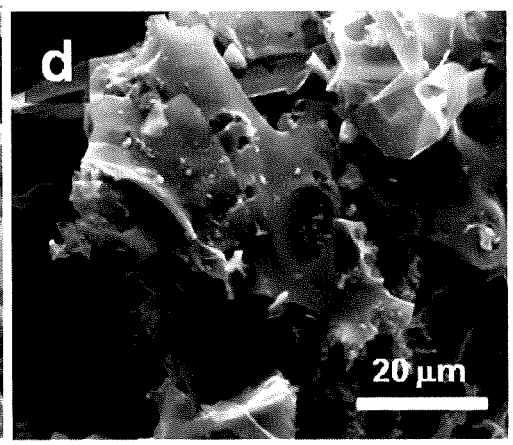
FIG. 26C  FIG. 26D

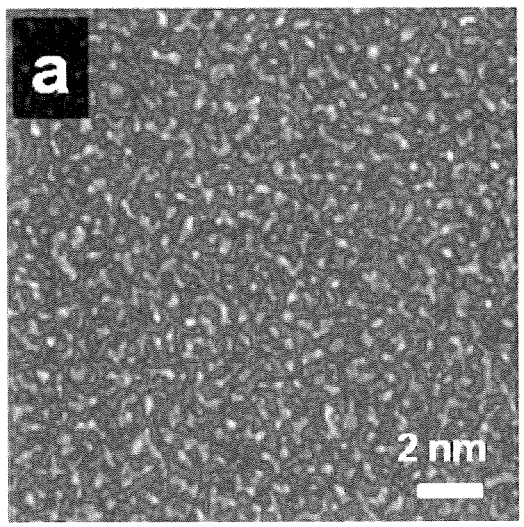 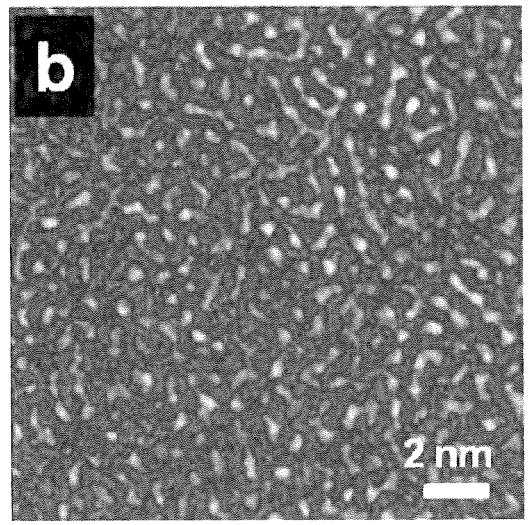
FIG. 27A  FIG. 27B
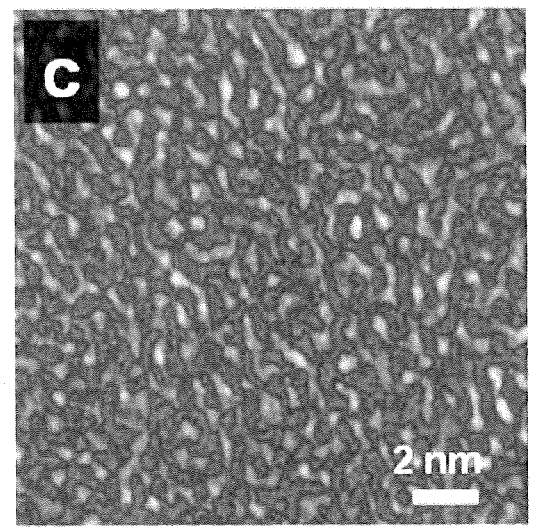
FIG. 27C

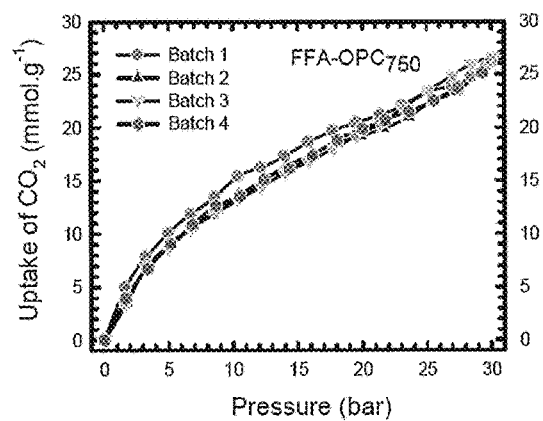
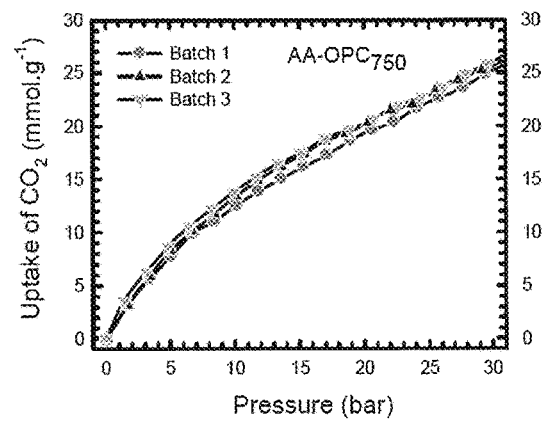
FIG. 38A  FIG. 38B
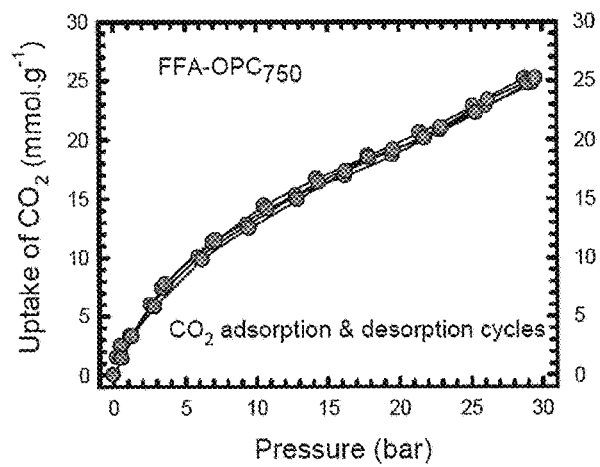
FIG. 38C

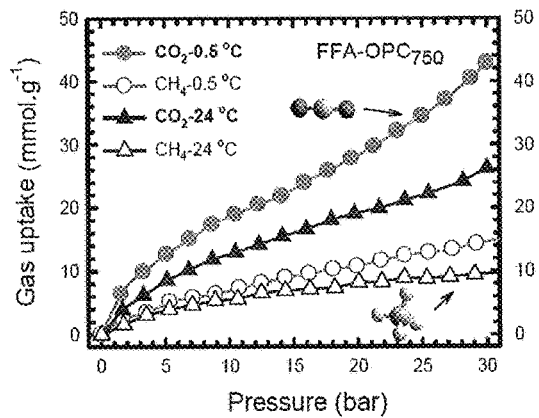
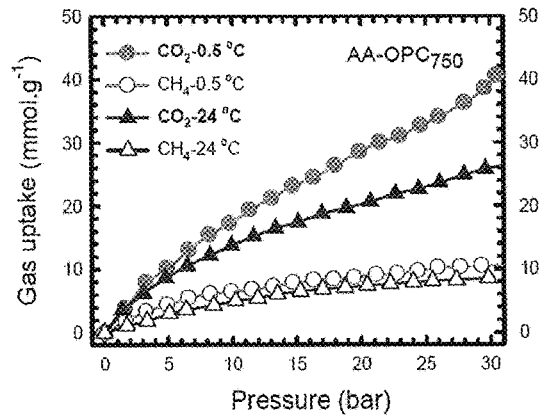
FIG. 40A  FIG. 40B
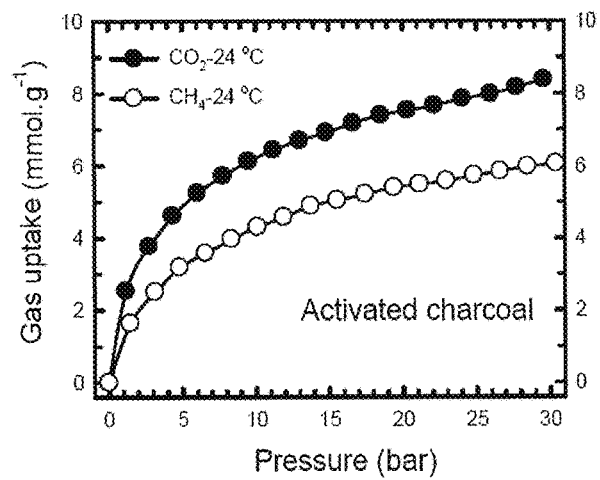
FIG. 40C

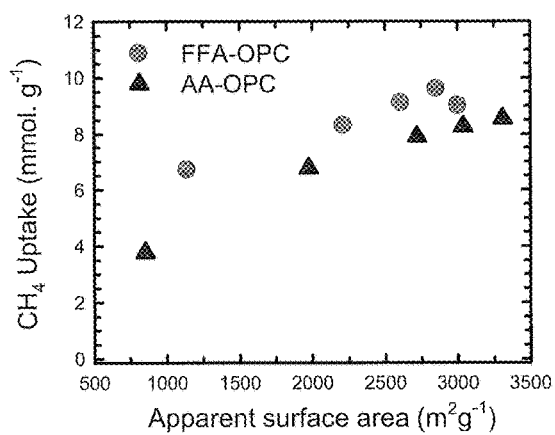 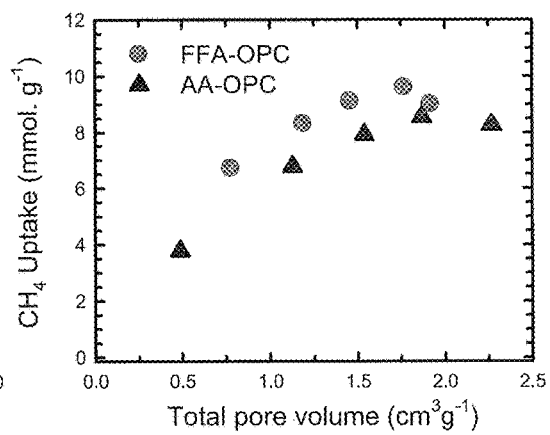
FIG. 41A  FIG. 41B

METHOD, SYNTHESIS, ACTIVATION PROCEDURE AND CHARACTERIZATION OF AN OXYGEN RICH ACTIVATED POROUS CARBON SORBENT FOR SELECTIVE REMOVAL OF CARBON DIOXIDE WITH ULTRA HIGH CAPACITY

CROSS-REFERENCE TO RELATED APPLICATIONS

This application is a continuation of U.S. patent application Ser. No. 15/631,341, filed on Jun. 23, 2017, which is a continuation-in-part application of U.S. patent application Ser. No. 15/200,632, filed on Jul. 1, 2016, which claims priority to U.S. Provisional Patent Application No. 62/187,744, filed on Jul. 1, 2015. The entirety of each of the aforementioned applications is incorporated herein by reference.

STATEMENT REGARDING FEDERALLY SPONSORED RESEARCH

Not applicable.

BACKGROUND

Current materials for capturing carbon dioxide ($CO_2$) suffer from numerous limitations, including limited $CO_2$ sorption capacity and selectivity. Various embodiments of the present disclosure address these limitations.

SUMMARY

In some embodiments, the present disclosure pertains to materials for $CO_2$ adsorption at pressures above 1 bar. In some embodiments, the materials include a porous material with a surface area of at least 2,800 $m^2/g$, and a total pore volume of at least 1.35 $cm^3/g$. In some embodiments, a majority of pores of the porous materials have diameters of less than 2 nm as measured from $N_2$ sorption isotherms using the BET (Brunauer-Emmett-Teller) method.

In some embodiments, the present disclosure pertains to materials for the separation of $CO_2$ from natural gas at partial pressures of either component above 1 bar. In some embodiments, the materials include a porous material with a surface area of at least 2,200 $m^2/g$, and a total pore volume of at least 1.00 $cm^3/g$. In some embodiments, a majority of pores of the porous materials have diameters of greater than 1 nm and less than 2 nm as measured from $N_2$ sorption isotherms using the BET (Brunauer-Emmett-Teller) method.

In some embodiments, the porous materials of the present disclosure include a porous carbon material with a carbon content of between 80% and 95% as measured by X-ray photoelectron spectroscopy. In some embodiments, the porous materials of the present disclosure include a porous carbon material with a surface area of at least 2,800 $m^2/g$, a total pore volume of at least 1.35 $cm^3/g$, and a carbon content of between 80% and 95% as measured by X-ray photoelectron spectroscopy.

In additional embodiments, the present disclosure pertains to materials for the separation of $CO_2$ from natural gas at partial pressures of either component above 1 bar. In some embodiments, the materials include a porous carbon material with a surface area of at least 2,000 $m^2/g$, a total pore volume of at least 1.00 $cm^3/g$, and a carbon content of greater than 90% as measured by X-ray photoelectron spectroscopy.

In some embodiments, the porous carbon materials of the present disclosure are prepared by heating an organic polymer precursor or biological material in the presence of potassium hydroxide (KOH). In some embodiments, the temperature of activation is between 700° C. and 800° C. In some embodiments, the temperature of activation is between 600° C. and 700° C.

In some embodiments, the porous carbon materials of the present disclosure are prepared by heating an organic polymer precursor. In some embodiments, the organic polymer precursor includes oxygen in a functional group. In some embodiments, the functional group is a furyl. In some embodiments, the organic polymer precursor is furfuryl alcohol. In some embodiments, the organic polymer precursor polymerizes to form polyfurfuryl alcohol (PFFA). In some embodiments, PFFA is prepared by the polymerization of furfuryl alcohol with a catalyst. In some embodiments, the catalyst is iron(III) chloride.

In some embodiments, the functional group is an anisyl. In some embodiments, the organic polymer precursor is anisyl alcohol (AA). In some embodiments, the organic polymer precursor polymerizes to form polyanisyl alcohol (PAA). In some embodiments, PAA is prepared by the polymerization of AA with a catalyst. In some embodiments, the catalyst is a protic acid.

In some embodiments, the porous carbon materials of the present disclosure are prepared by heating a biological material. In some embodiments, the biological material includes, without limitation, sawdust, coconut husk, and combinations thereof. In some embodiments, the biological material is chosen from at least one of the following: sawdust and coconut husk.

Additional embodiments pertain to methods of making the materials of the present disclosure. Further embodiments pertain to utilizing the materials of the present disclosure for the capture of $CO_2$ from various environments.

DESCRIPTION OF THE FIGURES

FIG. 7A shows the pore size distributions of PPy-T-2 samples prepared at the three activation temperatures shown, as determined by the non-local density functional theory (NLDFT) method. FIG. 7B shows a scanning electron microscope (SEM) image of a PPy-600-2 sample. FIG. 7C shows high resolution transmission electron microscope (HRTEM) images of the PPy-600-2 sample. FIG. 7D summarizes high pressure volumetric $CO_2$ adsorption uptake measurements on PPy-800-2 and PPy-800-4, showing the effect of the KOH:precursor ratio. Sorption measurements were performed at 24° C. Also shown are typical X-ray photoelectron spectroscopy (XPS) survey scans for the polypyrrole precursor (FIG. 7E) and PPy-600-2 NPC samples (FIG. 7F). Also shown are the wt % determined by XPS of elemental carbon (FIG. 7G) and oxygen and nitrogen versus activation temperature (FIG. 7H) for the PPy precursor and PPy-T-2 samples.

FIGS. 16A-16D provide an analysis of the porous structure of OPC samples activated at different temperatures. FIG. 16A shows $N_2$ adsorption and desorption isotherms for a PC (800) sample. FIG. 16B shows estimated surface area and total pore-volume vs. activation temperature. FIG. 16C shows the distribution of pore volumes as a function of activation temperature as estimated by NLDFT. FIG. 16D shows the surface area (blue bars) and total pore volume (purple) for activated charcoal and eight different PC samples known for high $CO_2$ uptakes (>14 mmol g$^{-1}$ at 30 bar).

FIG. 17A shows the volumetric $CO_2$ uptake of various porous carbons prepared from different carbon precursors, including O-rich PC (OPC), N-rich PC (NPC) and S-rich PC (SPC). Measurements were performed in a PCTPRO instrument at 24° C. FIG. 17B shows the graphical representation of surface areas and maximum $CO_2$ uptake capacities at 30 bar for nine different porous carbon sorbents. The highest $CO_2$ uptake property (26.6 mmol g$^{-1}$) is demonstrated by Applicants' newly discovered OPC (750) sample (second bar to the right).

FIG. 18A shows volumetric $CO_2$ and $CH_4$ uptake measurements on OPC (750) sorbents up to a pressure range of 30 bar at 0.5 and 24° C. FIG. 18B shows volumetric $CO_2$ and $CH_4$ uptake measurements on commercially available activated charcoal. The molar uptake ratios ($CO_2$/$CH_4$) at 30 bar for OPC (750) and activated charcoal are 2.74 and 1.4, respectively.

FIG. 20A shows volumetric $CO_2$ uptake measurements on four different OPC (750) samples synthesized and activated the same way. FIG. 20B shows two successive $CO_2$ adsorption and desorption cycles.

FIG. 21A provides a synthesis scheme for OPC. Photographs of carbon precursor (FIG. 21B), as-synthesized OPC (FIG. 21C), and as-synthesized SPC samples (FIG. 21D) are also shown. OPC samples are pellet like compared to SPC and other PC materials. Scanning electron microscopy (SEM) images of carbon precursor (FIG. 21E), OPC (600) (FIG. 21F) and OPC (800) samples (FIG. 21G) are also shown. FIG. 21H shows an energy-dispersive X-ray spectroscopy (EDS) elemental scan for OPC (800). Also shown are high resolution transmission electron microscopy (TEM) images of OPC (600) (FIG. 21I) and OPC (800) samples (FIG. 21J) showing nm sized micro porous structures.

FIG. 23G shows the Fourier transform infrared spectroscopy (FTIR) spectra of C-precursor and activated OPCs. FIG. 23H shows the Raman spectra and Raman disorder (D) to graphene (G) band intensity ratio vs. activation temperature. The KOH:Polymer weight ratio is 3 in all cases. IR spectra are base line corrected and vertically offset for clarity.

FIG. 24A provides a synthetic reaction scheme for the synthesis of furfuryl alcohol-OPC (FFA-OPC) ($FeCl_3$:FA=10, KOH:PFFA=3, and T=500-800° C.). FIG. 24B provides a synthetic reaction scheme for the synthesis of anisyl alcohol (AA)-OPC (AA-OPC) (KOH:PAA=3, and T=500-800° C.).

FIGS. 26A-26D show SEM images of PFFA (FIG. 26A), precursors and the associated OPCs (FIG. 26B), FFA-$OPC_{750}$ (FIG. 26C), and AA-$OPC_{750}$ (FIG. 26D).

FIGS. 27A-27C show representative high-resolution TEM images of FFA-$OPC_{600}$ (FIG. 27A), FFA-$OPC_{800}$ (FIG. 27B), and AA-$OPC_{800}$ (FIG. 27C) samples showing nanometer sized micro porous structures.

FIGS. 38A-38B show demonstration of reproducibility of sample preparation and gas uptake properties. Volumetric $CO_2$ uptake measurements are shown on four different batches of FFA-$OPC_{750}$ (FIG. 38A) and AA-$OPC_{750}$ (FIG. 38B) that were synthesized and activated the same way. FIG. 38C shows successive $CO_2$ adsorption and desorption cycle measurements on an individual FFA-$OPC_{750}$ sample.

FIG. 39A shows volumetric $CO_2$ uptake measurements on an FFA-$OPC_{750}$ sample at four temperatures. At 0.5° C. and 30 bar pressure, sorbent adsorbed an ultrahigh amount of $CO_2$ that maxed to 43 mmol·$g^{-1}$ (189 wt %). FIG. 39B shows $CO_2$ uptakes at four different (labelled) pressures as a function of experiment temperatures.

FIGS. 40A-40B show volumetric $CO_2$ and $CH_4$ uptakes measurements on FFA-$OPC_{750}$ (FIG. 40A) and AA-$OPC_{750}$ (FIG. 40B) sorbents up to a pressure range of 30 bar at 0.5 and 24° C. FIG. 40C shows volumetric $CO_2$ and $CH_4$ uptake measurements on activated charcoal.

FIGS. 41A-41B show a plot of $CH_4$ uptake at 30 bar as a function of surface area (FIG. 41A) and total pore volume (FIG. 41B) for FFA-OPC and AA-OPC.

FIG. 58A shows the molar $CO_2:CH_4$ uptake ratio as a function of a gas pressure for SPC sorbents activated with different KOH:PTh ratio. Also shown are plots of molar $CO_2:CH_4$ uptake ratios at 30 bar as a function of KOH:PTh ratio (FIG. 58B), surface area (FIG. 58C), and total pore volume (FIG. 58D). Experiments were performed at 24° C.

DETAILED DESCRIPTION

Figure 1A:
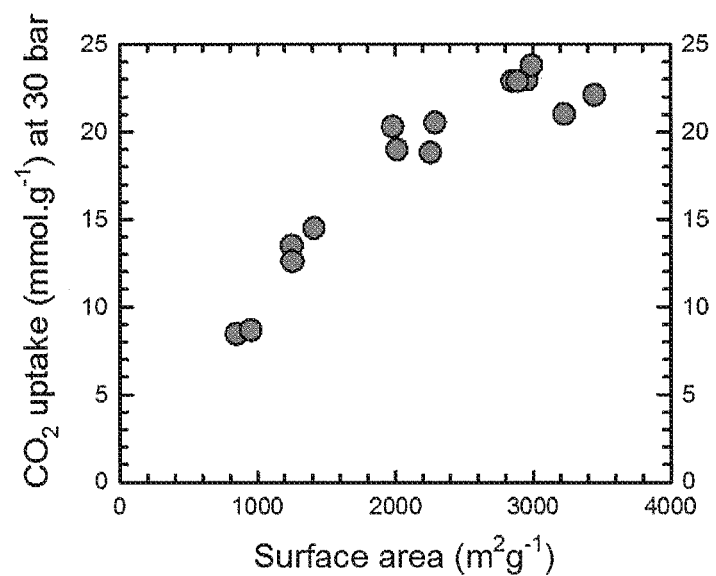
FIGS. 1A-1B provide data relating to high pressure $CO_2$ uptake (at 30 bar and 24° C.) as a function of the surface area (FIG. 1A) and total pore volume (FIG. 1B) for a range of porous carbons (PCs), including N-containing PCs (NPCs) and S-containing PCs (SPCs). Also shown are data relating to high pressure $CO_2$ uptake at different pressures as a function of surface area (FIG. 1C) and total pore volume (FIG. 1D). A comparison of the total pore volume as a function of surface area for a range of PCs, NPCs and SPCs is also shown (FIG. 1E).

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

There are generally two classes of materials employed for carbon dioxide ($CO_2$) separation: reactants and adsorbents. The former includes amine and other reactive species such as ionic liquids and alkali-metal-based oxides. At present, monoethanolamine (MEA) is the industry standard. However, regeneration, degradation and corrosion, together with health and environmental issues, still affect its large scale implementation.

Impregnation of $CO_2$ capture materials onto supports has been investigated, but it is only recently that the regeneration temperature has been lowered by their combination with carbon nanomaterials. Ionic liquids, suitable for high pressure capture, are expensive and toxic, while cheap alkali metal oxides suffer from severe deactivation upon cycling.

Although the aforementioned materials show optimal selectivity between $CO_2$ and methane ($CH_4$), their myriad drawbacks have meant that much effort has been invested into the study of solid porous sorbents, such as porous carbons (PC), metal-organic frameworks (MOFs), microporous zeolites, and porous silica-based sorbents with high surface area.

MOFs outperform zeolites in terms of maximum capacity at high pressure, but are expensive since they require complex multistep synthesis procedures. In addition, their gas adsorption capacity degrades after several cycles of usage. Carbonaceous materials, such as activated carbon and charcoal, are cheaper and less sensitive to moisture than zeolites and MOFs, but their adsorption capacity generally increases with loss of selectivity at high pressure.

Chemically activated porous carbon adsorbents have large surface areas and pore volumes associated with micro- and meso-porous structure. As a result, such materials show significantly improved $CO_2$ capturing capacity as compared to traditional carbonaceous materials.

It has been suggested that the presence of nitrogen or sulfur dopants is responsible for improved $CO_2$ uptake in porous carbon materials (e.g., *Nat Commun.*, 2014, 5, 3961 and U.S. Pat. Pub. No. 2015/0111024). These studies were undertaken at 30 bar (1 bar=100,000, Pa=750.06 mmHg) using compounds previously reported to show improved results over activated carbon at 1 bar (e.g., *Adv. Funct. Mater.*, 2011, 21, 2781-2787; and *Microporous Mesoporous Mater.*, 2012, 158, 318-323). The improved high pressure results were proposed to be due to the S or N centers acting as a Lewis base to facilitate the ambient polymerization of the $CO_2$. However, previous investigations of the role of N-doping in $CO_2$ capture by PCs up to 1 bar pressure shows no correlation (e.g., *ACS Appl. Mater. Interfaces*, 2013, 5, 6360-6368).

The conventional goal in synthesizing a porous carbon material with optimal $CO_2$ adsorption is to focus on increased surface area and pore volume (e.g., U.S. Pat. Pub. No. 2016/0136613). The same approach is presumed to also work for the separation of $CO_2$ from natural gas.

However, the present disclosure demonstrates that increasing the surface area and pore volume of a carbon material do not guarantee the best adsorbent. Instead, a combination of factors is involved in defining the ideal porous carbon absorbent material.

In some embodiments, the present disclosure pertains to novel materials for $CO_2$ capture. In additional embodiments, the present disclosure pertains to methods of making the materials of the present disclosure. In further embodiments, the present disclosure pertains to methods of utilizing the materials of the present disclosure for the capture of $CO_2$ from various environments. As set forth in more detail herein, the present disclosure can have various embodiments.

Materials for $CO_2$ Capture

In some embodiments, the present disclosure pertains to materials for $CO_2$ adsorption at pressures above 1 bar. In some embodiments, the materials include a porous material with a surface area of at least 2,800 $m^2/g$, and a total pore volume of at least 1.35 $cm^3/g$. In some embodiments, a majority of pores of the porous material have diameters of less than 2 nm as measured from $N_2$ sorption isotherms using the BET (Brunauer-Emmett-Teller) method.

In some embodiments, more than about 50% of pores of the porous material have diameters of less than 2 nm. In some embodiments, more than about 60% of pores of the porous material have diameters of less than 2 nm. In some embodiments, more than about 70% of pores of the porous material have diameters of less than 2 nm. In some embodiments, more than about 80% of pores of the porous material have diameters of less than 2 nm. In some embodiments, between about 50% to about 90% of pores of the porous material have diameters of less than 2 nm.

In some embodiments, the present disclosure pertains to materials for the separation of $CO_2$ from natural gas at partial pressures of either component above 1 bar. In some embodiments, the materials include a porous material with a surface area of at least 2,200 $m^2/g$, and a total pore volume of at least 1.00 $cm^3/g$. In some embodiments, a majority of pores of the porous material have diameters of greater than 1 nm and less than 2 nm as measured from $N_2$ sorption isotherms using the BET (Brunauer-Emmett-Teller) method.

In some embodiments, more than about 50% of pores of the porous material have diameters of greater than 1 nm and less than 2 nm. In some embodiments, more than about 60% of pores of the porous material have diameters of greater than 1 nm and less than 2 nm. In some embodiments, more than about 70% of pores of the porous material have diameters of greater than 1 nm and less than 2 nm. In some embodiments, more than about 80% of pores of the porous material have diameters of greater than 1 nm and less than 2 nm. In some embodiments, between about 50% to about 90% of pores of the porous material have diameters of greater than 1 nm and less than 2 nm.

In some embodiments, the porous materials of the present disclosure include a porous carbon material. In some embodiments, the porous carbon material has a carbon content of between 80% and 95% as measured by X-ray photoelectron spectroscopy. In some embodiments, the porous materials include a porous carbon material with a surface area of at least 2,800 m$^2$/g, a total pore volume of at least 1.35 cm$^3$/g, and a carbon content of between 80% and 95% as measured by X-ray photoelectron spectroscopy. In some embodiments, the materials include a porous carbon material with a surface area of at least 2,000 m$^2$/g, a total pore volume of at least 1.00 cm$^3$/g, and a carbon content of greater than 90% as measured by X-ray photoelectron spectroscopy.

The porous carbon materials of the present disclosure may be prepared in various manners. For instance, in some embodiments, the porous carbon material is prepared by heating an organic polymer precursor or biological material in the presence of potassium hydroxide (KOH). In some embodiments, the temperature of activation is between 700° C. and 800° C. In some embodiments, the temperature of activation is between 600° C. and 700° C.

The materials of the present disclosure can have various chemical components. For instance, in some embodiments, the materials of the present disclosure are rich in oxygen. As such, in some embodiments, the materials of the present disclosure are referred to as oxygen rich activated porous carbons (OPCs). In some embodiments, the materials of the present disclosure have an oxygen content of more than about 10 wt %. In some embodiments, the materials of the present disclosure have an oxygen content between about 10 wt % and about 25 wt %.

In some embodiments, the materials of the present disclosure may lack other heteroatoms, such as nitrogen or sulfur. For instance, in some embodiments, the total heteroatom content of the materials of the present disclosure may range from about 0 wt % to about 1 wt %. In some embodiments, the total heteroatom content of the materials of the present disclosure may be less than about 1 wt %.

The materials of the present disclosure can have various advantageous properties. For instance, in some embodiments, the materials of the present disclosure have high surface areas. In some embodiments, the materials of the present disclosure have surface areas of more than about 1,000 m$^2$/g. In some embodiments, the materials of the present disclosure have surface areas that range from about 1,000 m$^2$/g to about 5000 m$^2$/g (e.g., Table 5). In some embodiments, the materials of the present disclosure have surface areas of about 3005 m$^2$/g (e.g., in OPC samples chemically activated at 800° C.) (e.g., FIG. 16D).

In some embodiments, the materials of the present disclosure have high CO$_2$ adsorption capacities. In some embodiments, the materials of the present disclosure have a CO$_2$ adsorption capacity of more than about 100 wt %. In some embodiments, the materials of the present disclosure have CO$_2$ adsorption capacities between about 117 wt % and about 189 wt %.

Figure 17A:
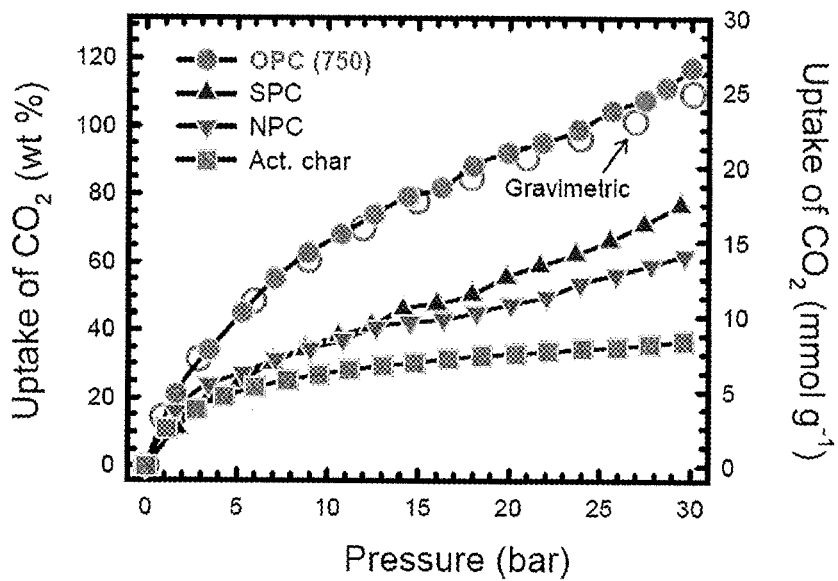
FIGS. 17A-17B provide additional data relating to the $CO_2$ uptake of porous carbons.
Figure 17B:
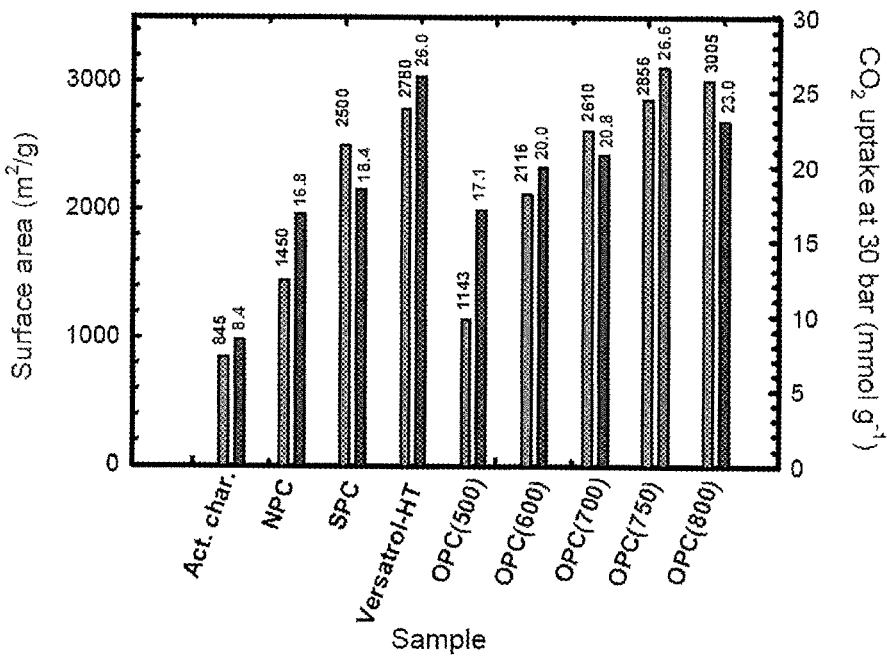

In some embodiments, the materials of the present disclosure have a CO$_2$ adsorption capacity of up to 117 wt % (26.6 mmol/g) at a pressure of 30 bar, a number that is higher than any reported uptake values for activated porous carbon (PC) adsorbents (e.g., FIGS. 17A-17B and Table 5). In some embodiments, the materials of the present disclosure capture CO$_2$ from a natural gas containing environment that is rich in CH$_4$ at a maximum molar uptake ratio of 2.75 (7.5 by mass ratio) at a pressure of 30 bar (e.g., FIGS. 18A-18B and FIG. 19).

In some embodiments, the materials of the present disclosure (e.g., OPCs that are activated at 750° C., referred to herein as OPC (750)) outperform most of the existing porous carbons for high pressure uptake of CO$_2$ (e.g., 26.6 mmol/g; 117 wt % at 30 bar) and demonstrate optimal selectivity for CO$_2$ capture over CH$_4$ uptake (e.g., $V_{CO2}N_{CH4}$ ratio ~2.7 (molar) and ~7.5 (by wt) at 30 bar) at room temperature. Additionally, OPC (750) demonstrates ultrahigh CO$_2$ uptake (43 mmol g$^{-1}$; 189 wt %) at 0.5° C., a value that was never reported previously (e.g., FIG. 18A).

Figure 20A:
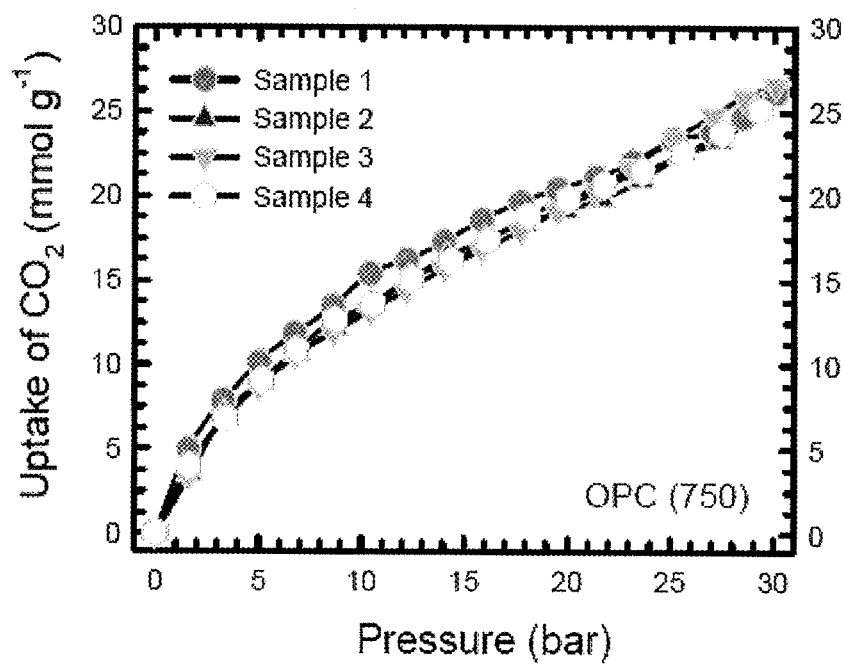
FIGS. 20A-20B provide a demonstration of the reproducibility of sample preparation and gas uptake properties of OPCs.
Figure 20B:
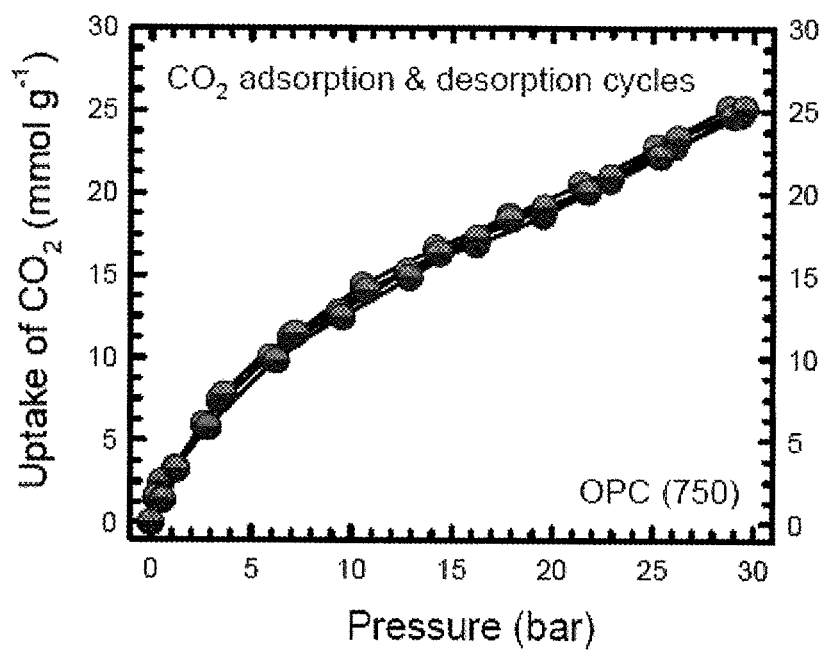

In some embodiments, the materials of the present disclosure exhibit remarkable thermal stability and reproducible gas uptake properties for many cycles (e.g., FIGS. 20A-20B). Unlike other fine powder type activated porous carbon materials, the materials of the present disclosure can be clumpy and pelletized in some embodiments. Such properties can in turn make the materials of the present disclosure better candidates for preparing solid pellet-like adsorbents (e.g., FIG. 21C).

Formation of Materials

The materials of the present disclosure can be prepared in various manners. Additional embodiments of the present disclosure pertain to methods of making the materials of the present disclosure.

In some embodiments, a carbon precursor is first synthesized. Next, the carbon precursor is activated to form porous carbon materials. Various methods may be utilized to optimize sample preparation to synthesize activated porous carbon materials with very high CO$_2$ uptake.

Figure 15:
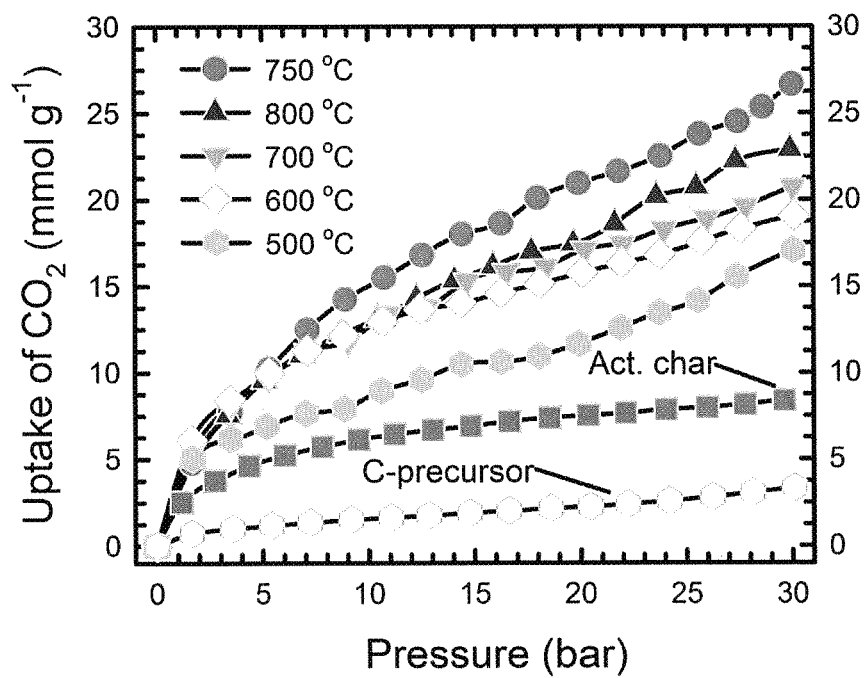
FIG. 15 shows volumetric $CO_2$ uptake of different OPCs activated at increasing temperature, activated carbon and carbon precursor.

In some embodiments, a carbon precursor is activated by chemical activation. In some embodiments, the chemical activation includes heating the carbon precursor in a mixture. In some embodiments, the carbon precursor is heated in a mixture that contains a base, such as KOH. In some embodiments, the heating temperature ranges from about 500° C. to about 800° C. (FIG. 15). In some embodiments, the activation temperature is about 750° C.

In some embodiments, the carbon precursor is synthesized by polymerizing a carbon source. In some embodiments, the polymerization occurs by exposing the carbon source to an oxidant, such as iron (III) chloride (FeCl$_3$) in the presence of acetonitrile (CH$_3$CN).

In some embodiments, the materials of the present disclosure are prepared from affordable and readily available carbon sources. In some embodiments, the carbon sources include oxygen-containing carbons. In some embodiments, the oxygen containing carbon sources are rich in alcohol. In some embodiments, the carbon sources lack heteroatoms such as nitrogen, sulfur, and combinations thereof. As such, in some embodiments, the formed materials of the present disclosure also lack such heteroatoms.

In some embodiments, the materials of the present disclosure are prepared by heating a biological material. In some embodiments, the biological material includes, without limitation, sawdust, coconut husk, and combinations thereof. In some embodiments, the biological material is chosen from at least one of the following: sawdust and coconut husk.

In some embodiments, the carbon source that is utilized to make the materials of the present disclosure is furfuryl alcohol (FFA) (e.g., purchasable from Sigma Aldrich at a price of $354 for 25 kg with purity >98%) (e.g., Table 4). In some embodiments where the carbon source is FFA, the formed carbon precursor is polyfurfuryl alcohol (PFFA).

In some embodiments, the materials of the present disclosure are prepared by heating an organic polymer precursor or biological material. In some embodiments, the organic polymer precursor or biological material includes oxygen in a functional group. In some embodiments, the functional group is a furyl. In some embodiments, the organic polymer precursor is FFA. In some embodiments, the organic polymer precursor polymerizes to form polyfurfuryl alcohol (PFFA). In some embodiments, PFFA is prepared by the polymerization of furfuryl alcohol with a catalyst. In some embodiments, the catalyst is $FeCl_3$.

In some embodiments, the functional group is an anisyl. In some embodiments, the organic polymer precursor polymerizes to form polyanisyl alcohol (PAA). In some embodiments, PAA is prepared by the polymerization of anisyl alcohol with a catalyst. In some embodiments, the catalyst is a protic acid.

Figure 21A:
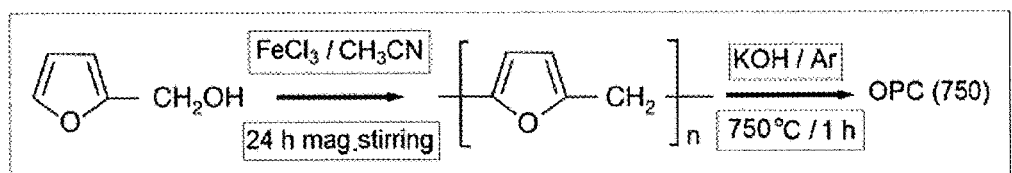
FIGS. 21A-21J provide various schemes and data relating to the synthesis and characterization of OPCs.
Figure 21B:
Figure 21C:
Figure 21D:
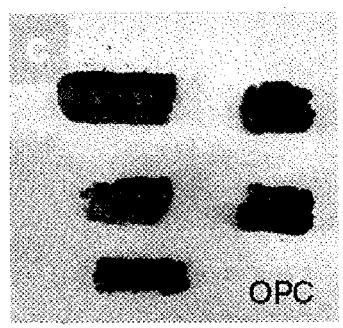
Figure 21E:
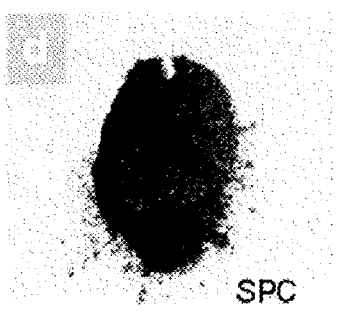
Figure 21F:
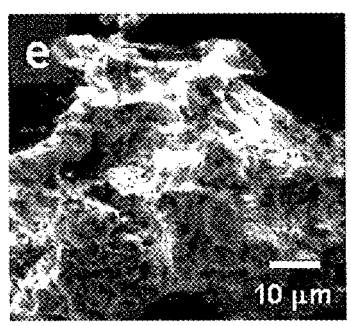
Figure 21G:
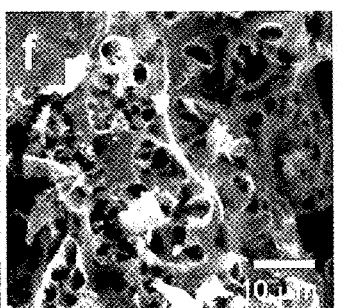
Figure 21H:
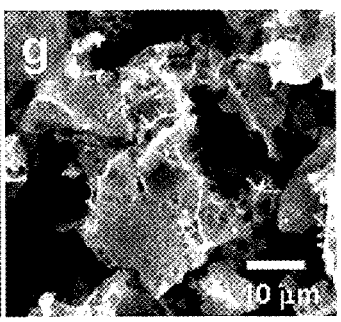
Figure 21I:
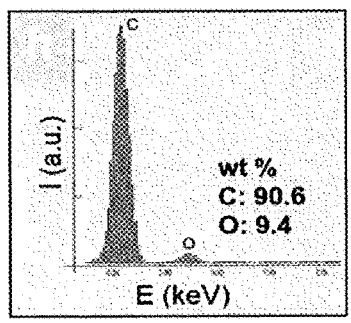
Figure 21J:
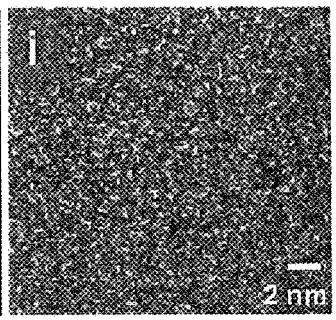

A more specific method of making the materials of the present disclosure is illustrated in FIG. 21A. In this illustration, the FFA is polymerized by using $FeCl_3$ as the oxidant. In a typical synthesis, a solution of $FeCl_3$ is prepared by solubilizing $FeCl_3$ in $CH_3CN$. FFA is then mixed with $CH_3CN$ and slowly added to the $FeCl_3$ solution. The mixture is then magnetically stirred for 24 hours at room temperature. The polymerized product, brown colored PFFA, is then separated by filtration over a sintered glass funnel, washed thoroughly with abundant distilled water, and then with acetone. This is followed by drying at 40° C. for 12 hours. The yield of the final product was ~98%.

Next, the porous carbon was chemically activated by heating a PFFA-KOH mixture (KOH/PFFA at a weight ratio of 3) in inert atmosphere. The mixture was then placed inside a quartz tube/tube furnace setup and heated for 1 hour at a fixed temperature in the 500-800° C. range, under a flow of Ar. The activated OPC sample was then thoroughly washed several times with diluted HCl and distilled water and dried on a hot plate at 70° C. for 12 hours.

In some embodiments, the KOH/PFFA ratio can be varied. In some embodiments, the activation temperatures and the PFFA-KOH mixing procedure can be varied.

Use of Materials for Gas Capture

The materials of the present disclosure can be utilized to capture and selectively remove various gases (e.g., $CO_2$, $CH_4$, and combinations thereof) from various environments. Additional embodiments of the present disclosure pertain to methods of utilizing the materials of the present disclosure for the separation of a mixture of gases by preferential adsorption and selective desorption. Further embodiments of the present disclosure pertain to methods of utilizing the materials of the present disclosure for the capture of $CO_2$ from various environments. In some embodiments, the environments include an atmosphere or an environment that contains a mixture of gases. In some embodiments, the methods of the present disclosure pertain to processes for separating $CO_2$ from natural gas by exposing the natural gas to the materials of the present disclosure.

In some embodiments, the methods of the present disclosure utilize the materials of the present disclosure in a process in which selectivity and separation of two gases (such as $CH_4$ and $CO_2$) is accomplished by a combination of an adsorption process that favors one of the components (e.g., selectivity of $CO_2$ over $CH_4$). Thereafter, the desorption of the two components from the carbon materials can be significantly different by control over various parameters, such as temperature, pressure, and combinations thereof. In some embodiments, such control allows for the specific desorption of one of the components prior to the other (e.g., $CH_4$ over $CO_2$). In some embodiments, the overall process allows for the selective separation of at least two gaseous components.

In some embodiments, the materials of the present disclosure differentiate between $CH_4$ and $CO_2$ adsorption as well as desorption. In some embodiments, the selectivity of adsorption is further enhanced since the pressure/temperature dependencies of the desorption of $CH_4$ and the desorption of $CO_2$ are distinct from each other such that they may be used to improve separation. Thus, in some embodiments, a mixture of adsorbed $CH_4$ and $CO_2$ will desorb under different conditions: the $CH_4$ first and the $CO_2$ second. In some embodiments, this difference means that the overall adsorption/desorption selectivity of $CH_4$ and $CO_2$ is higher than prior materials.

In some embodiments, the materials of the present disclosure can be used for the selective capture of $CO_2$ from various environments. In some embodiments, the materials of the present disclosure can be utilized for the selective capture of $CO_2$ over hydrocarbons in the environment (e.g., $CH_4$). In some embodiments, the adsorption of $CO_2/CH_4$ mixtures and measurement of the desorption selectivity can be varied.

Applications and Advantages

The methods and materials of the present disclosure can provide numerous advantages. For instance, in some embodiments, the methods and materials of the present disclosure can be utilized for the selective removal of $CO_2$ from natural gas (e.g., methane) that contains various amounts of $CO_2$ (e.g., 10-20 mol % of $CO_2$). Such an application is an important goal in the field of oil and natural gas, since contaminant $CO_2$ decreases its power efficiency. For an ideal gas adsorbing material, the major requirements are as follows: it should be cheap, simple to synthesize, demonstrate reproducible and high gas uptake property, and complete desorption of $CO_2$ at low pressure. In various embodiments, the materials of the present disclosure possess all of these properties.

In some embodiments, the methods and materials of the present disclosure can be utilized for the separation of $CO_2$ from natural gas at a source where low to medium levels of $CO_2$ are present. In some embodiments, the methods and materials of the present disclosure can be used as a secondary recovery method for treating $CH_4/CO_2$ mixtures in which $CO_2$ is the major component. In some embodiments, such mixtures include high-pressure samples that are the result of an initial $CH_4/CO_2$ separation using traditional methods.

The materials of the present disclosure can also provide numerous advantages. In particular, among the most efficient solid sorbents for capturing $CO_2$ from natural gas or atmosphere, MOFs and KOH aided chemically activated PC materials with large surface areas and micro pores have been investigated for decades. PC composites demonstrate remarkable thermal stability and repeatability for selective gas uptake measurements.

However, to date, most of the researchers have synthesized porous carbons from carbon rich precursors that contain heteroatoms, such as nitrogen or sulfur. For sulfur rich precursors, the most common feedstock for synthesizing PCs are polythiophene or poly(2-thiophenemethanol), whereas, pyrrole of acrylonitrile are being utilized for the production of nitrogen containing PCs.

Unfortunately, the high cost of both chemicals hinders the industrial scale use of PCs produced from these materials. Based upon an analysis of the best PC materials in terms of selectivity and $CO_2$ uptake, Applicants have noted that the common link is not the presence of strong Lewis base species such as N or S, but the presence of oxygen. Thus, Applicants envision that oxygen is an important component for selectivity and high adsorption of gases (e.g., $CO_2$ and/or $CH_4$) in the materials of the present disclosure.

ADDITIONAL EMBODIMENTS

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Preparation of Porous Carbon Materials

This Example provides processes for the preparation of various porous carbon materials.

Example 1.1. Synthesis of Activated Porous Carbon (PC) from Coconut Shell

Pieces of dry coconut shell were placed inside a quartz tube/tube furnace setup and carbonized for 1 hour at 450° C., under a flow of Ar (flow rate 500 sccm). The carbonized product (500 mg) was thoroughly mixed with potassium hydroxide (KOH) powder (1.0 g). The mixture was then placed inside a quartz tube/tube furnace setup, dried for 20 minutes and then heated for 1 hour at a fixed temperature of 600° C. under continuous flow of Argon (flow rate of about 600 sccm), washed with distilled water (ca. 4 L) and then with acetone (ca. 1 L) and dried at 80° C. for 12 hours.

Example 1.2. Synthesis of Nitrogen-Containing Porous Carbon (NPC) from Polypyrrole The polymerized carbon precursor polypyrrole was synthesized using $FeCl_3$ as a catalyst following a modification of Applicants' previous methods. In a typical synthesis, a solution of $FeCl_3$ (50 g) in $CH_3CN$ (200 mL) was prepared. Next, a solution of pyrrole (5.0 g) in $CH_3CN$ (50 mL) was slowly added to the previous solution. The mixture was stirred for 24 hours. The polymerized product was then separated by filtration, washed thoroughly with distilled water (ca. 4 L) and then with acetone (ca. 1 L) and dried at 80° C. for 12 hours. The yield of the final product was ~98%. The polypyrrole was chemically activated by heating with an excess (2 or 4 fold by weight) of KOH in inert atmosphere. In a typical activation process, polypyrrole (500 mg) was thoroughly mixed with KOH (1.0 g) that had been crushed to a fine powder in a mortar. The mixture was then placed inside a quartz tube within a tube furnace, dried for 20 minutes and then heated for 1 hour at a fixed temperature in the 500-800° C. range, under a flow of Ar (flow rate 600 sccm). The activated samples were then thoroughly washed with diluted HCl (1.4 M, 100 mL) and several times with distilled water until the filtrate attained neutral pH 7. Finally, the activated PC was dried on a hot plate at 70° C. for 12 hours.

Example 1.3. Synthesis of Polyfurfuryl Alcohol (PFFA)

In a typical synthesis, a solution was prepared by dissolving $FeCl_3$ (50 g) in $CH_3CN$ (200 mL). To this a solution of furfuryl alcohol (5 g, Sigma Aldrich, 98%) mixed with $CH_3CN$ (50 mL) was slowly added. The mixture was stirred for 24 hours under continuous argon purging. The polymerized product, brown colored polyfurfuryl alcohol (PFFA) was separated by filtration, washed thoroughly with DI water (ca. 4 L) and acetone (500 mL), before being dried at 40° C. for 12 hours under vacuum (Yield=98%).

Example 1.4. Conversion of PFFA to Oxygenated Porous Carbon (OPC)

In a typical activation process, PFFA (500 mg) was thoroughly mixed with KOH powder (1.5 g, crushed previously) in a mortar for 10 minutes. The mixture was then placed inside a quartz tube/tube furnace, dried for 20 minutes and then heated for 1 hour at 500, 600, 700 or 750° C., under a flow of Ar (99.9%, flow rate 600 sccm). The activated samples were then washed with HCl (100 mL, 1.4 M) and DI water until the filtrate attained pH=7. The product was dried at 70° C. for 12 hours under vacuum. The yield of activated PC materials depended on the activation temperature: $OPC_{500}$=55%, $OPC_{600}$=40%, $OPC_{700}$=30%, and $OPC_{750}$=25-27%.

Example 2. Characterization of the Porous Carbon Materials

This example provides various data relating to the characterization of the porous carbon materials in Example 1.

The volumetric uptake measurements (sorption and desorption) of $CO_2$ and $CH_4$ by the porous carbons were performed in an automated Sievert instrument (Setaram PCTPRO). Various PC samples were first crushed into powders and packed in a stainless steel autoclave sample cell. Initial sample pre-treatment was carried out at 130° C. for 1.5 hours under high vacuum. The free volume inside the sample cell was determined by a series of calibration procedures done under helium. Gas uptake experiments were carried out with high purity research grade $CO_2$ (99.99%) and $CH_4$ (99.9%) at 24° C.

FIG. 1A shows a plot of the uptake of $CO_2$ at 30 bar as a function of the apparent Brunauer-Emmett-Teller (BET) surface area ($S_{BET}$) for all the PC adsorbent measured. As expected, an increase in surface area correlates with an increase in $CO_2$ uptake. However, any value above 2,800 $m^2g^{-1}$ does not appear to improve adsorption. Thus, continued attempts to create even higher surface area materials may not result in any further improvements in $CO_2$ uptake.

Figure 1B:
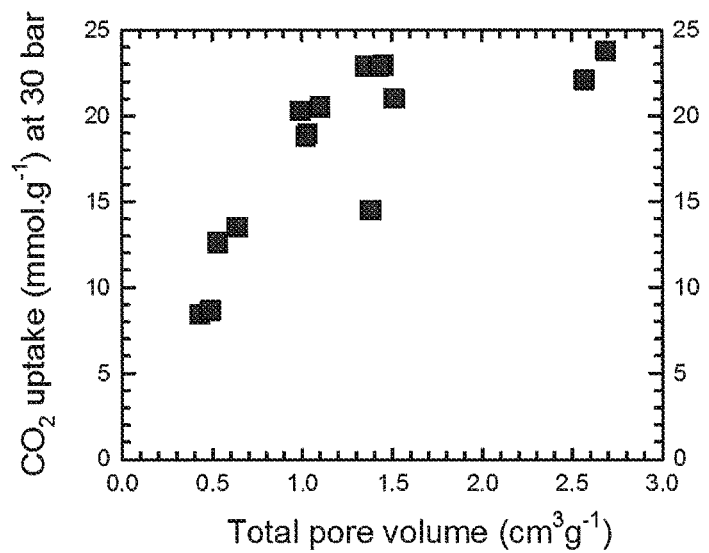

It is envisioned that increased total pore volume ($V_p$) will facilitate increased $CO_2$ adsorption. However, as shown in FIG. 1B, it appears that for pore volumes over 1.35 $cm^3g^{-1}$, there is not a resulting greater uptake.

The aforementioned trends were for the highest pressures. However, the homologous series PPy-T-2 (T=500, 600, 700, and 800° C.) along with the precursor (PPy) allows for a comparison across a range of pressures.

Figure 1C:
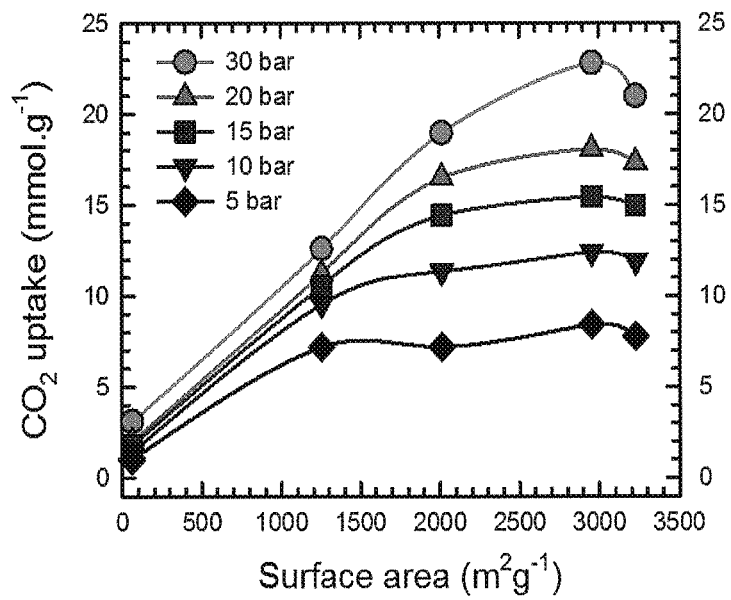
Figure 1D:
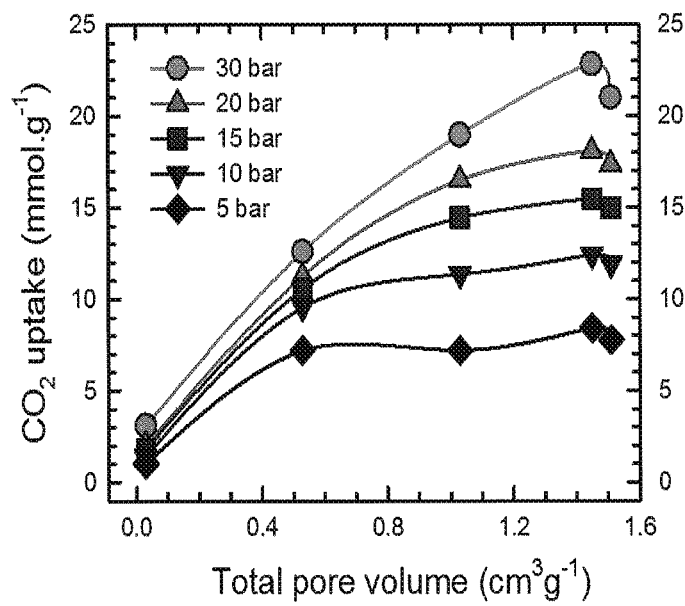

FIGS. 1C and 1D show the relationship between $CO_2$ uptake and BET surface area (FIG. 1C) and total pore volume (FIG. 1D) for different pressures in the range of 5-30 bar. As expected, these plots clearly show a significant effect of pressure on the $CO_2$ uptake (i.e., higher pressures result in higher uptake). Moreover, the point at which increased surface area (or total pore volume) does not increase $CO_2$ uptake decreases with decreased pressure. Thus, whereas at 30 bar $CO_2$ pressure increasing the surface area above 2,800 $m^2g^{-1}$ does not improve adsorption, at 5 bar this value decreases to 1300 $m^2g^{-1}$ (FIG. 1C). This suggests a greater diminution of returns in attempting to create high surface area adsorbents if lower pressures are to be used in the system. The effect is similar for total pore volume, where at 5 bar it appears that any pore volume over 0.5 cm$^3$g$^{-1}$ does not result in greater uptake.

Figure 1E:
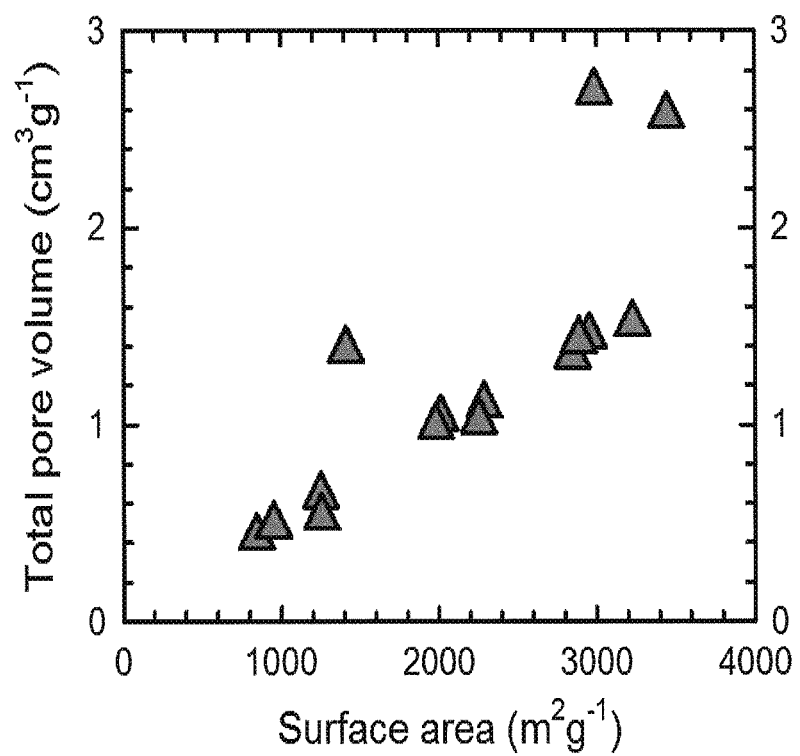

Furthermore, a linear trend has been observed between surface area and pore volume for the majority of the samples studied (FIG. 1E). However, many of the samples show a divergence from the trend. The aforementioned results demonstrate a higher pore volume than expected. Furthermore, Applicants note that the aforementioned porous carbons have some of the highest $CO_2$ uptake performances.

Figure 2:
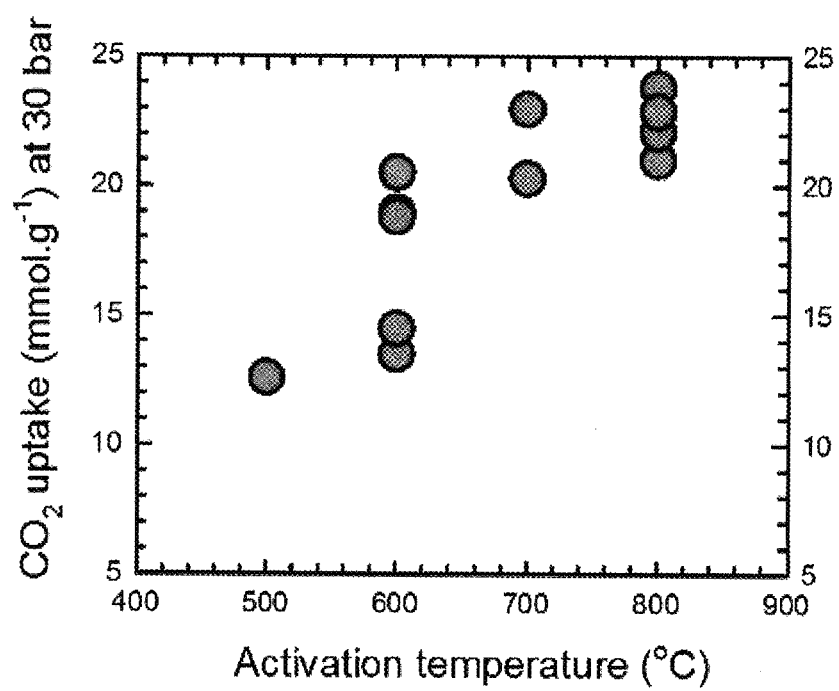
FIG. 2 provides a plot of $CO_2$ uptake at 30 bar and 24° C. as a function of activation temperature for PC, NPC, and SPC samples.

FIG. 2 shows the relationship between the activation temperature and the $CO_2$ uptake for the porous carbon samples listed in Table 1. The general trend is increasing uptake with increased activation temperature with a possible maximum between 700 and 800° C.

Besides the surface area and pore volume, another important characteristic that can be obtained from the $N_2$ adsorption isotherms is the pore size distribution (PSD) of the porous solid. FIGS. 7A-7H depict the PSDs for three different PPy-based PCs prepared under mild (T=500° C.) to strong (T=800° C.) activation conditions. The distribution plot for T=500° C. indicates that the activated PC mainly consists of micropores in the 1-2 nm range, whereas the plot for PPy-700-2 clearly shows signature of some larger pores in the 2-3.5 nm range. The most strongly activated PC and PPy-800-2 even shows a significant number of mesopores in the 3-6 nm range, in agreement with the steeper adsorption registered for relative pressures of more than 0.4.

A comparison of the variation in pore size and distribution (FIG. 7A) with the $CO_2$ uptake for the same samples (FIG. 4 and Table 1) was also made. From 500° C. to 700° C., there is a dramatic increase in the high pressure uptake, which can

TABLE 1

Summary of PC, NPC, and SPC samples studied with their elemental analysis, physical properties and $CO_2$ uptake.

| Sample[a] | C (wt %)[b] | O (wt %)[b] | N (wt %)[b] | S (wt %)[b] | Surface area $S_{BET}$ (m$^2$g$^{-1}$) | Total pore volume (cm$^3$g$^{-1}$)[c] | $CO_2$ uptake at 30 bar and 24° C. (mmol · g$^{-1}$) |
|---|---|---|---|---|---|---|---|
| Activated charcoal | 94.10 | 5.90 | 0.00 | 0.00 | 845 | 0.43 | 8.45 |
| BPL[d] | 91.3 | 8.7 | 0.00 | 0.00 | 951 | 0.49 | 8.66 |
| SD-600-4 | 82.24 | 15.80 | 0.00 | 0.00 | 2290 | 1.10 | 20.52 |
| SD-800-4 | 89.96 | 8.03 | 0.00 | 0.00 | 2850 | 1.35 | 22.90 |
| CN-600-2 | 88.13 | 11.87 | 0.00 | 0.00 | 1250 | 0.64 | 13.50 |
| PPy-500-2 | 72.47 | 17.19 | 10.33 | 0.00 | 1255 | 0.53 | 12.60 |
| PPy-600-2 | 74.78 | 19.72 | 5.49 | 0.00 | 2013 | 1.03 | 18.98 |
| PPy-700-2 | 90.01 | 9.87 | 0.14 | 0.00 | 2956 | 1.45 | 22.98 |
| PPy-800-2 | 91.39 | 8.60 | 0.00 | 0.00 | 3230 | 1.51 | 21.01 |
| PPy-800-4 | 90.78 | 9.11 | 0.10 | 0.00 | 3450 | 2.57 | 22.10 |
| PAn-600-3 | 84.50 | 6.75 | 8.75 | 0.00 | 1410 | 1.38 | 14.50 |
| SD-M-800-4 | 85.39 | 8.15 | 6.46 | 0.00 | 2990 | 2.69 | 23.80 |
| PTh-600-2 | 64.91 | 25.88 | 0.00 | 9.21 | 2256 | 1.02 | 18.81 |
| PTh-700-2 | 82.47 | 13.01 | 0.00 | 4.51 | 1980 | 0.99 | 20.32 |
| PTh-800-2 | 88.18 | 7.24 | 0.00 | 4.58 | 2890 | 1.43 | 22.87 |

[a]Precursor-temperature-KOH:precursor ratio.
[b] Determined by XPS.
[c]Determined at P/P$_o$ ~0.99.
[d]Purchased from Calgon Carbon Corp.

Figure 3A:
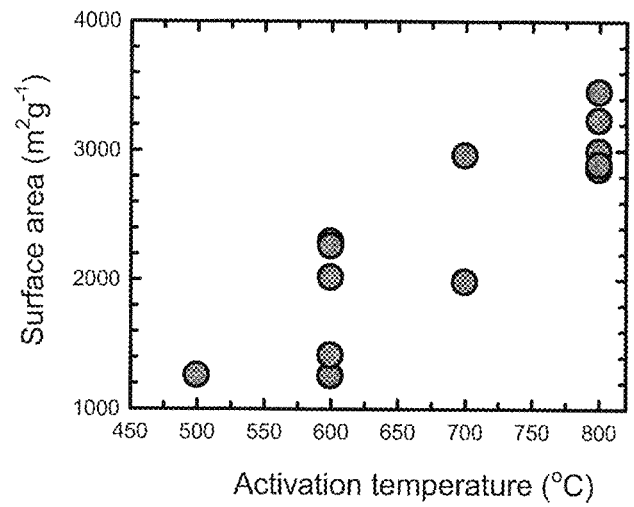
FIGS. 3A-3B provide estimated surface area (FIG. 3A) and total pore volume (FIG. 3B) as a function of activation temperature for PC, NPC and SPC samples.
Figure 3B:
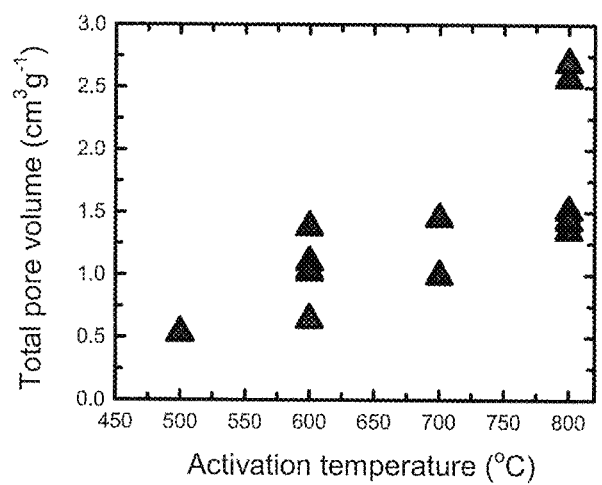

Given the relationships between surface area and pore volume with $CO_2$ uptake, it is not surprising that their relationship with activation temperature is also similar (FIGS. 3A-3B). The analysis of a series of samples prepared from N-containing polymer polypyrrole (PPy) at different activation temperatures (i.e., PPy-T-2), but otherwise under identical conditions, allows for a convenient direct comparison of the effects of temperature.

Figure 4:
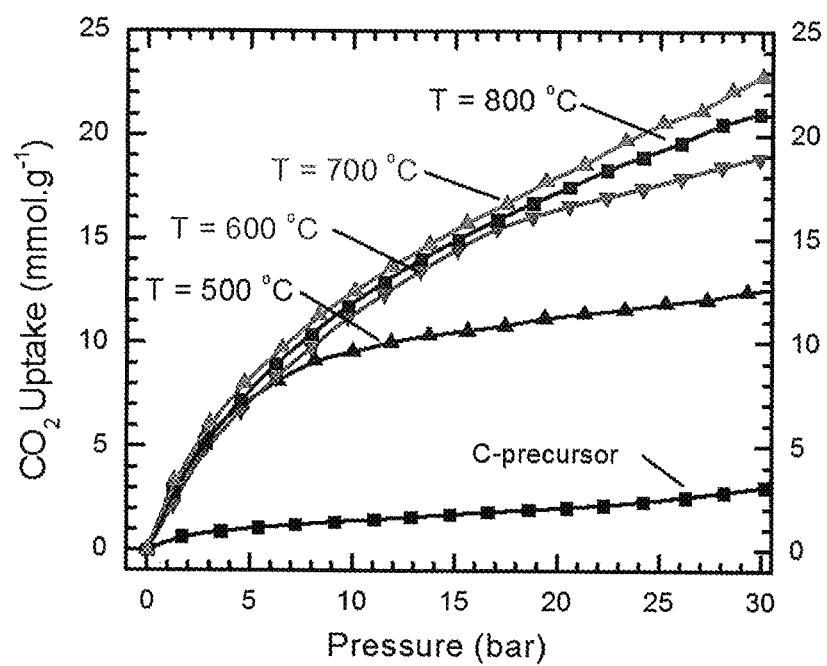
FIG. 4 provides comparative data relating to $CO_2$ uptake as a function of $CO_2$ pressure on N-containing polymer polypyrrole (PPy) precursors and PPy precursors activated at different temperatures (PPy-T-2). Sorption measurements were performed at 24° C.
Figure 5:
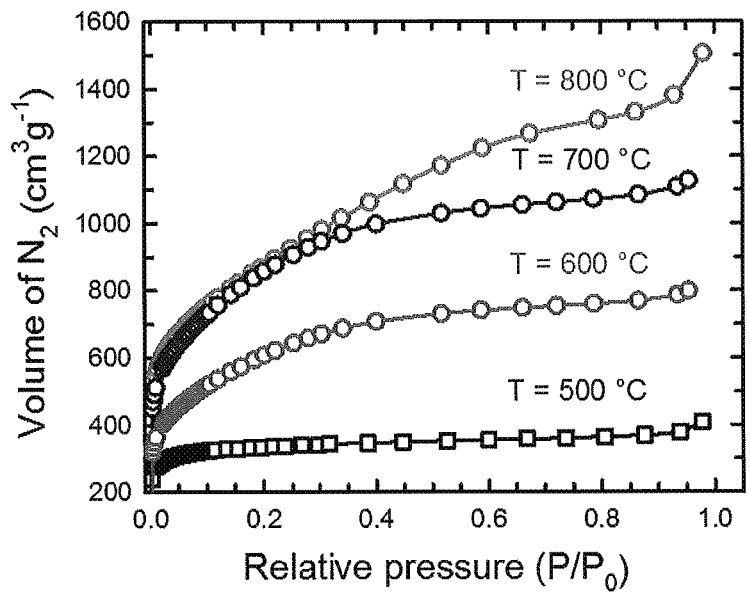
FIG. 5 provides $N_2$ adsorption isotherms for four different NPC samples of PPy-T-2 prepared from polypyrrole and activated at the labelled temperature (T). Sorption measurements were performed at 24° C.
Figure 6A:
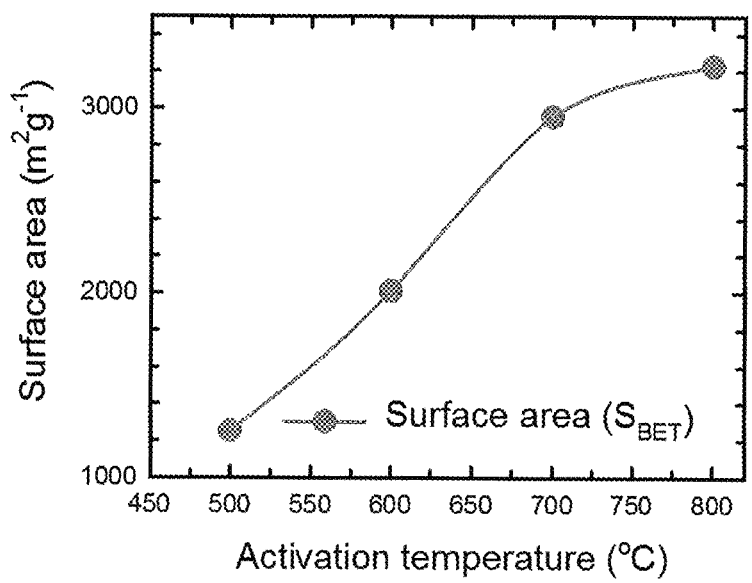
FIGS. 6A-6B provide data relating to the determination of pore structures by $N_2$ physisorption isotherms of PPy-T-2 samples activated at different temperatures by $N_2$ physisorption isotherms. Shown are the estimated surface area (FIG. 6A) and total pore volume (FIG. 6B) versus activation temperature.
Figure 6B:
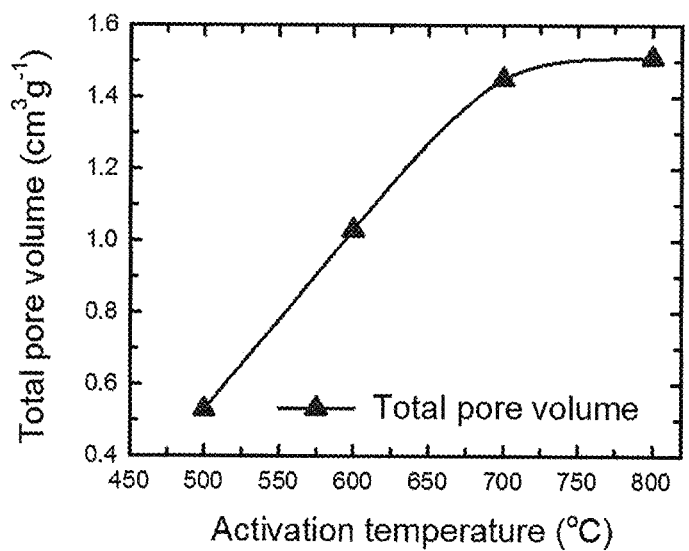

The $CO_2$ uptake plot for each sample as a function of $CO_2$ pressures is shown in FIG. 4, whereas FIG. 5 shows their corresponding $N_2$ adsorption isotherms at 77 K. It may be noticed that the shape of these isotherms is dependent on the activation temperature. The isotherm for PPy-800-2 is much steeper than that of PPy-500-2 between relative pressures of 0.4 and 1.0, indicating the variation in mesoporosity and adsorption capacity. For the homologous series of NPC materials, the estimated surface area ($S_{BET}$) and the total pore volume ($V_p$) gradually increase with activation temperature (FIGS. 6A-6B), describing the incremental trend for mildly to strongly activated samples. Between 500 and 700° C., the surface area and total pore volume increases systematically, whereas for temperatures above 700° C. no significant increment is noticed.

be associated with the generation of pores in the range of 2-3 nm. However, as may be seen from FIG. 4, there is a slight (but significant) decrease upon further activation to 800° C., even though there is an increase in the presence of larger pores. This suggests that larger pores are not necessarily ideal for a high $CO_2$ adsorption. The pore size distribution for the other top adsorbents studied shows a similar bi-modal pore structure centered on 1 nm and 1.5-2 nm.

Figure 7A:
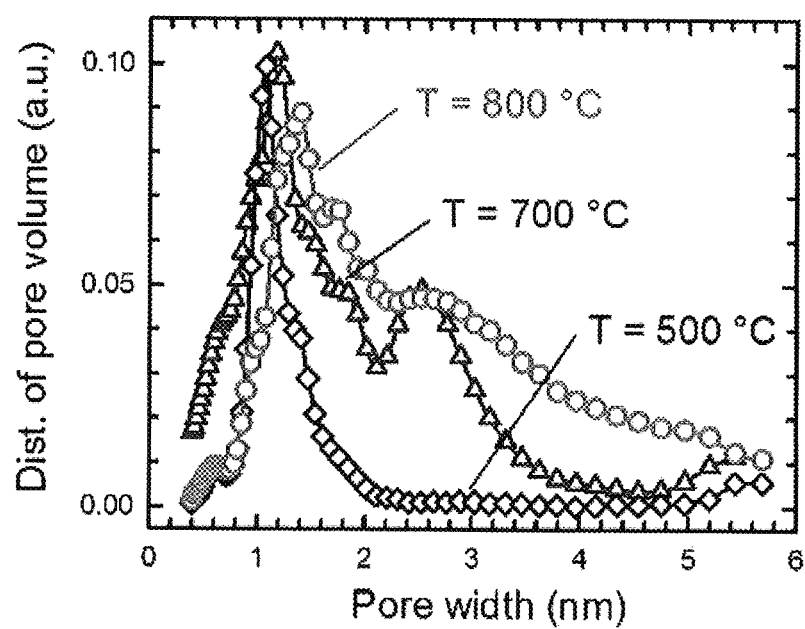
FIGS. 7A-7H show additional related data for PPy-T-2 samples.
Figure 7B:
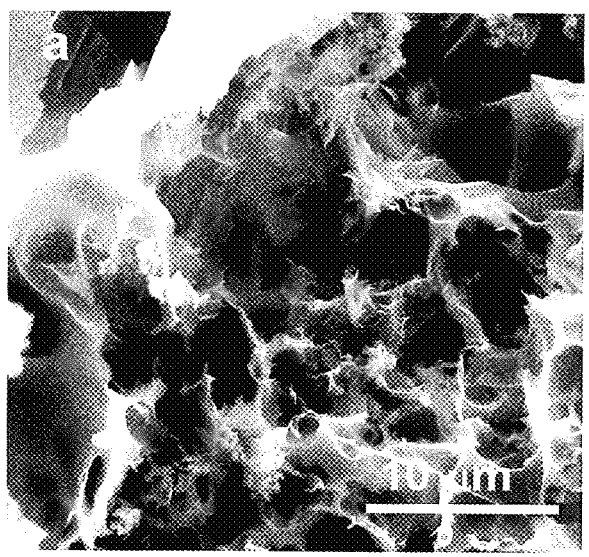

The structural and textural morphology of the activated PPy-T-2 samples were characterized by scanning electron microscopy (SEM). FIG. 7B shows that the activated NPC contains multiple layers projected vertically upward and surfaces that are full of micron sized holes. In order to image the microporous structure of the activated sample, high resolution transmission electron microscopy (HRTEM) was utilized.

Figure 7C:
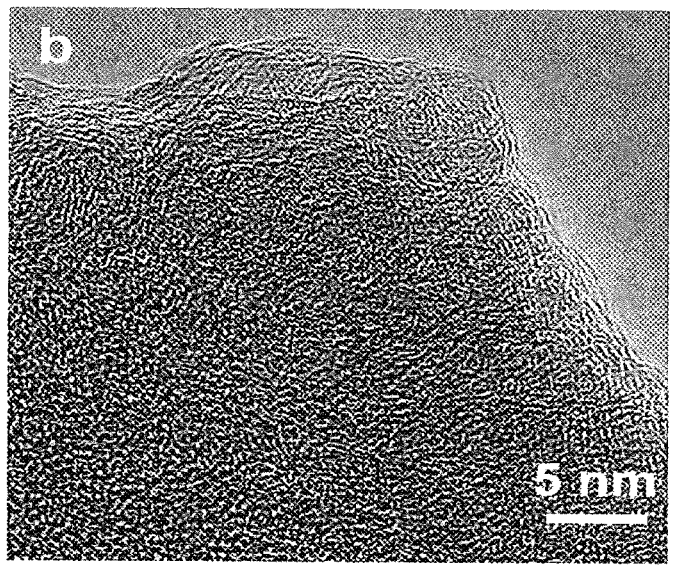
Figure 7D:
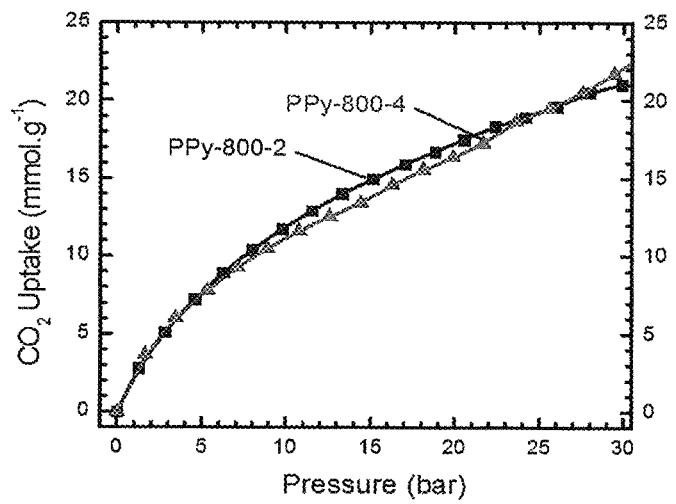
Figure 7E:
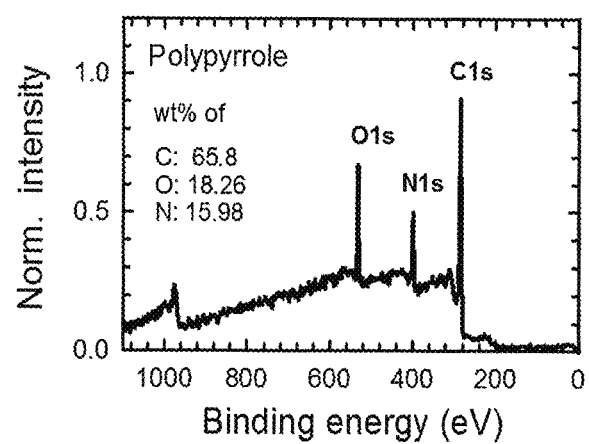
Figure 7F:
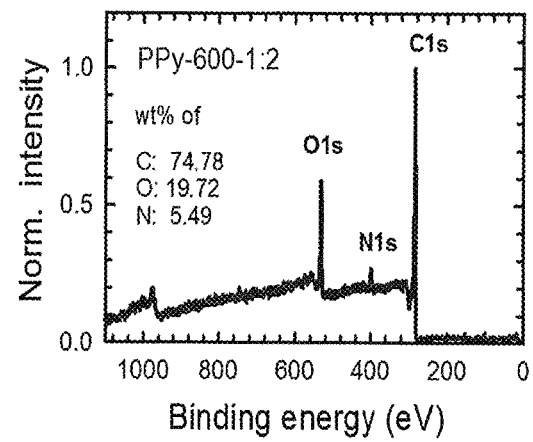

FIG. 7C displays an image demonstrating randomly distributed micropores with dimensions in the range of 0.5-1 nm for a PPy-600-2 sample. These and the images of the other samples are in agreement with the BET measurements.

Given the hazardous nature of working with KOH, the amount used in the activation process is of importance with regard to any scalability issues. Applicants have recently shown that KOH provides greater activation than borates. However, based upon the present data set for PPy-800-n (n=2, 4), it is clear that increasing the KOH:precursor ratio from 2 to 4 does not result in a change in the $CO_2$ uptake profile (FIG. 7D), despite a dramatic (70%) increase in the pore volume (Table 1).

Applicants note that PPy-800-4 has one of the highest surface areas (3450 $m^2g^{-1}$) measured for any PC sorbent. However, PPy-800-4 is less efficient than PPy-800-4 between 10-20 bar.

Figure 8A:
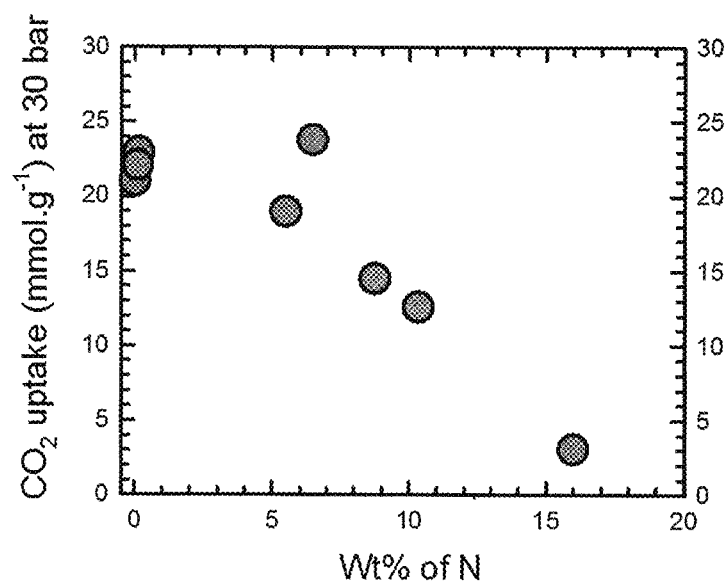
FIGS. 8A-8B show high pressure (30 bar) $CO_2$ uptake as a function of N wt % (FIG. 8A) and S wt % (FIG. 8B) in NPC and SPC samples, respectively. Also shown are high pressure $CO_2$ adsorption uptake for PAn-600-3 compared with PPy-600-2 (FIG. 8C) and SD-M-800-4 compared with PPy-800-4 (FIG. 8D).
Figure 8B:
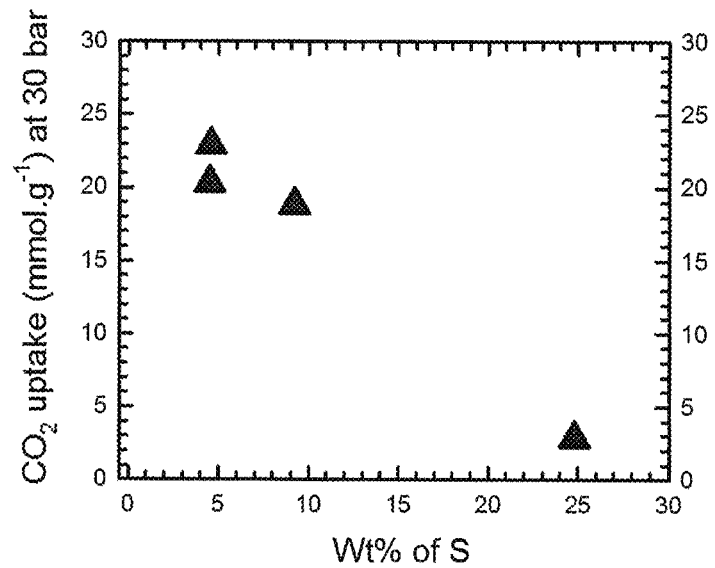

The $CO_2$ uptake for NPC and SPC samples as a function of their N or S content is shown in FIGS. 8A-8B. For both NPC (FIG. 8A) and SPC (FIG. 8B) samples, the $CO_2$ uptake is at a maximum with the heteroatom content of less than 5 wt %. The chemical composition of polypyrrole precursor and activated PPy derived NPC samples were determined by XPS (Table 1). The identity and wt % of the elements present on the sample surface were determined by XPS survey scans (e.g., FIGS. 7E and 7F). These spectra revealed that the precursor polypyrrole and activated NPCs are primarily composed of C, O, and N. It should be noted that the O content of NPCs has been observed, but discounted as significant, except as a potential source as both Lewis acid and base moieties. Applicants note that H content is not provided by XPS data, and so percentage values measured by other techniques will vary.

Figure 7G:
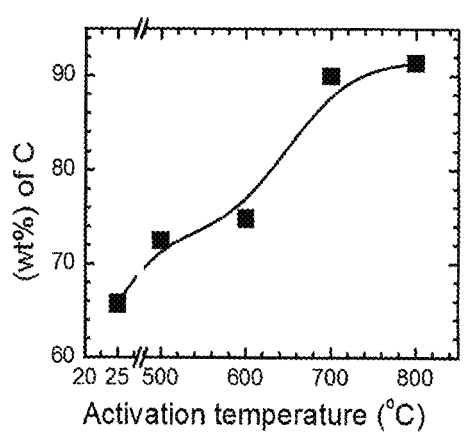
Figure 7H:
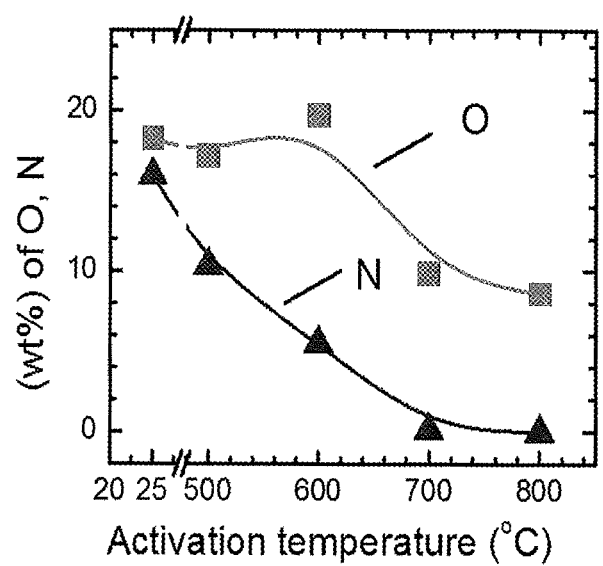

As a result of chemical activation and the activation temperature, the wt % of all elements changes (Table 1). The general trend is that the wt % of C increases, whereas that of O and N decreases gradually with increasing activation temperature. The compositional dependence on the activation temperature is demonstrated for the PPy-T-2 samples (FIG. 7G). The first point to note is that the N content decreases consistently with activation temperature (FIG. 7H). However, there is a distinct step in the O composition between 600 and 700° C. (FIG. 7H), which is mirrored in the C wt % composition (FIG. 7G). However, it is important to note that while at the highest activation temperatures the N content becomes negligible, the O content remains significant.

An equally interesting variation was observed for SPC samples (Table 1). The C content stays essentially constant between the PTh precursor and the product activated at 600° C., despite the S composition decreasing. The reason for this anomaly is the oxidation of the PC material as measured by the increased O content. As with the N content in the NPC samples, the S composition in the SPC samples decreases to a low value at the highest activation temperatures.

Based upon these results, it would appear that the presence of neither N nor S correlates in a positive manner with the $CO_2$ uptake, although in the present case a higher heteroatom content is associated to lower surface area and pore volume, hence the corresponding lower $CO_2$ uptake. Nonetheless, the limited effect of the presence of heteroatoms on $CO_2$ uptake is in line with previous results, and Applicants' proposal that the presence of N or S is not responsible for any stabilization of poly-$CO_2$ that has been proposed to be responsible for high $CO_2$ adsorption at 30 bar.

Figure 8C:
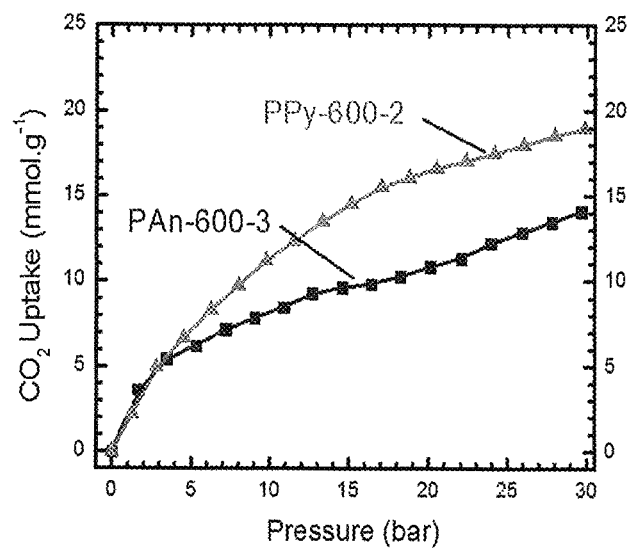
FIG. 8E shows the dependence of volumetric $CO_2$ uptake on N content for PPy-T-2 samples in comparison to the PPy precursor measured at different $CO_2$ pressures. Sorption measurements were performed at 24° C.
Figure 8D:
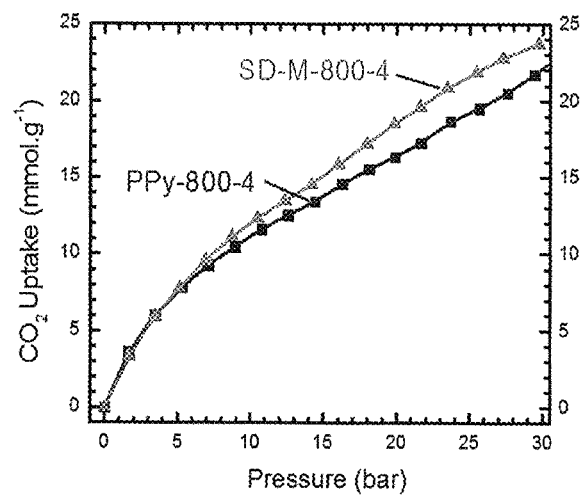

Furthermore, the source of the heteroatom also appears to affect the physical parameters and hence the $CO_2$ uptake. For example, the use of polyacrylonitrile (I, PAn) instead of polypyrrole (II, PPy) makes a significant difference suggesting the chemical speciation of the N content is important (FIG. 8C). In addition, the use of a poly-N containing heterocycle, melamine, as the N source results in an improvement in the performance (FIG. 8D). However, it is unclear whether this is a cause or effect. If the amount of $CO_2$ adsorbed is divided by the total pore volume one gets a similar value for both for PPy-800-4 and SD-M-800-4. Thus, the $CO_2$ uptake is determined by the total pore volume, but the pore volume is clearly a function of the precursor, rather than the process conditions.

Figure 8E:
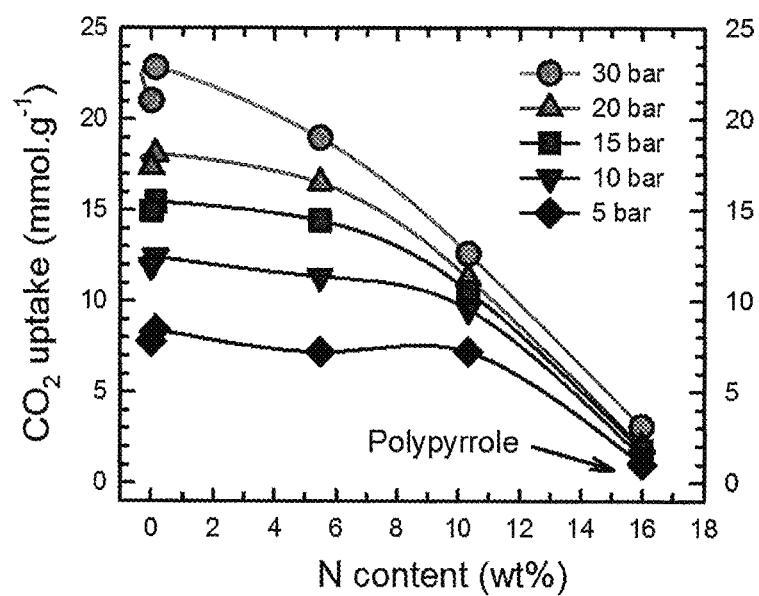

As was noted with the pressure dependence of the $CO_2$ uptake on the surface area and total pore volume, the uptake appears to be less affected by the N content at lower pressures. Thus, as shown in FIG. 8E, the greatest $CO_2$ uptake at 30 bar for NPC requires N<2 wt %. However, if measured at 5 bar the uptake is almost independent of N content at values <10 wt %. This again suggests that the need to create specialty adsorbents diminishes with decreased operating pressure.

Figure 9A:
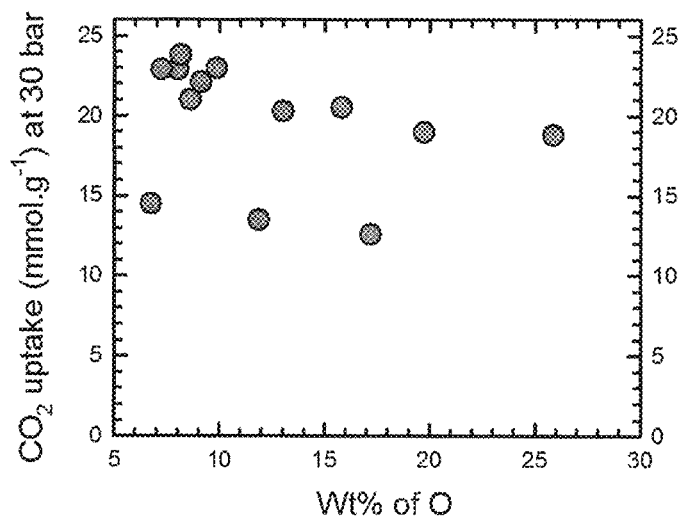
FIGS. 9A-9B show high pressure (30 bar) $CO_2$ uptake as a function of O wt % (FIG. 9A) and $\Sigma$(O,N,S) wt % (FIG. 9B) in PC, NPC and SPC samples. Sorption measurements were performed at 24° C.

Both NPC and SPC samples contain significant O, as do the PC samples produced from non-heteroatom containing precursors. Given that some of the PC samples perform in a comparable manner to those of NPC or SPC, N and S composition cannot be the sole key to high adsorption. While the presence of more than 5 wt % of either N or S appears to significantly lower the uptake of $CO_2$, although this could be related to the lower surface area of the heteroatom-rich samples, the O content is far more effective for the high $CO_2$ adsorption observed with 3-16 wt % O (FIG. 9A).

Figure 9B:
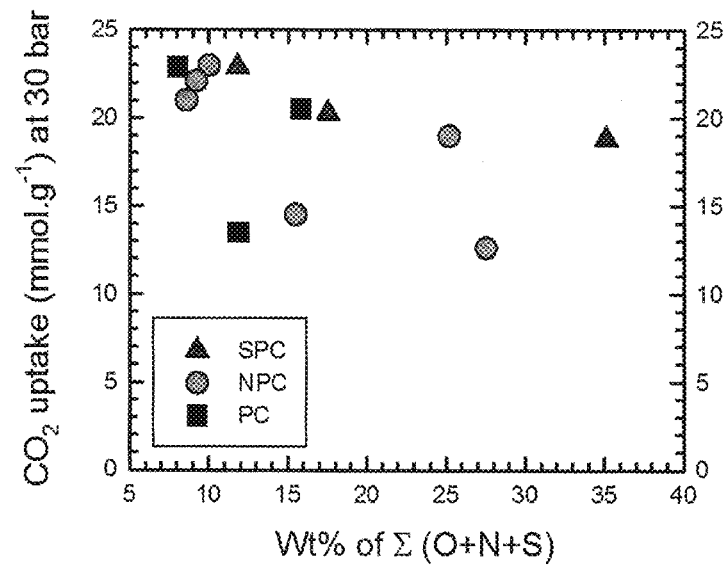

In support of this observation, there are also some significant findings on the $CO_2$ capture capacity of activated PCs obtained from the carbonization of asphalt with KOH. The reduction with $H_2$ of asphalt-derived N-doped PCs causes a significant increase of capture capacity up to 26 mmol·$g^{-1}$. The XPS elemental analysis of the sample before and after $H_2$ treatment shows that the sample with higher $CO_2$ capacity undergoes a significant increase of O content while the N content and type is only slightly changed. This finding supports Applicants' hypothesis that O plays a major role in establishing the $CO_2$ capture capacity of PCs. However, what appears to be more important is the combined presence of a heteroatom (i.e., $\Sigma$(O,N,S), FIG. 9B). This can be alternatively stated that the C content should be between 80-95 wt %.

Based upon the forgoing, it is possible to identify the parameters that define a PC material for maximum $CO_2$ uptake: have a surface area ≥2,800 $m^2g^{-1}$, a pore volume ≥1.35 $cm^3g^{-1}$, and a C content between 80-95 wt %. To achieve these performance parameters it is necessary to activate above 700° C. and to ensure full mixing of the KOH with the precursor. It is significant that the first two of these suggest that developing higher and higher surface area materials is unproductive, and that understanding the third may lead to the design of new PC materials. Furthermore, these values offer additional variance when the uptake of $CO_2$ is required at lower pressures.

Applicants have also investigated the $CO_2/CH_4$ selectivity by measuring $CO_2$ and $CH_4$ uptake isotherms up to a high pressure limit of 10, 20 and 30 bar at 24° C. A summary of the data is shown in Table 2.

TABLE 2

Summary of PC, NPC, and SPC samples studied with their molar gas uptakes and selectivity for $CO_2$ over $CH_4$ at different uptake pressures.

| | $CO_2$ uptake (mmol·g$^{-1}$) at | | | $CH_4$ uptake (mmol·g$^{-1}$) at | | | Molar ($CO_2$:$CH_4$) uptake ratio | | |
|---|---|---|---|---|---|---|---|---|---|
| Sample[a] | 10 bar | 20 bar | 30 bar | 10 bar | 20 bar | 30 bar | 10 bar | 20 bar | 30 bar |
| Activated charcoal | 6.27 | 7.51 | 8.45 | 4.28 | 5.44 | 6.03 | 1.46 | 1.38 | 1.41 |
| BPL | 6.30 | 7.87 | 8.66 | 3.24 | 4.96 | 6.18 | 1.94 | 1.59 | 1.40 |
| SD-600-4 | 12.06 | 16.77 | 20.52 | 5.23 | 7.54 | 8.52 | 2.31 | 2.22 | 2.41 |
| SD-800-4 | 13.61 | 18.78 | 22.90 | 6.65 | 9.45 | 10.92 | 2.05 | 1.99 | 2.10 |
| CN-600-2 | 10.91 | 12.65 | 13.50 | 5.94 | 7.24 | 7.96 | 1.83 | 1.74 | 1.70 |
| PPy-500-2 | 9.51 | 11.27 | 12.60 | 4.11 | 5.06 | 5.98 | 2.31 | 2.23 | 2.11 |
| PPy-600-2 | 11.37 | 16.45 | 18.98 | 5.39 | 6.33 | 7.41 | 2.11 | 2.60 | 2.56 |
| PPy-700-2 | 12.50 | 18.12 | 22.98 | 5.75 | 7.92 | 9.41 | 2.17 | 2.29 | 2.44 |
| PPy-800-2 | 11.94 | 17.21 | 21.01 | 5.78 | 8.23 | 9.82 | 2.07 | 2.09 | 2.14 |
| PPy-800-4 | 11.18 | 16.51 | 22.11 | 5.10 | 7.33 | 8.83 | 2.19 | 2.25 | 2.50 |
| PAn-600-3 | 8.19 | 10.84 | 14.50 | 4.04 | 5.26 | 6.03 | 2.03 | 2.06 | 2.40 |
| SD-M-800-4 | 12.09 | 18.70 | 23.76 | 5.58 | 8.12 | 9.41 | 2.17 | 2.30 | 2.52 |
| PTh-600-2 | 11.17 | 15.42 | 18.81 | 4.77 | 6.12 | 7.37 | 2.34 | 2.52 | 2.55 |
| PTh-700-2 | 11.51 | 16.67 | 20.32 | 4.62 | 6.87 | 8.01 | 2.49 | 2.43 | 2.54 |
| PTh-800-2 | 13.10 | 18.80 | 22.87 | 5.81 | 8.55 | 10.14 | 2.25 | 2.20 | 2.26 |

[a]Precursor-temperature-KOH:precursor ratio.

Figure 10A:
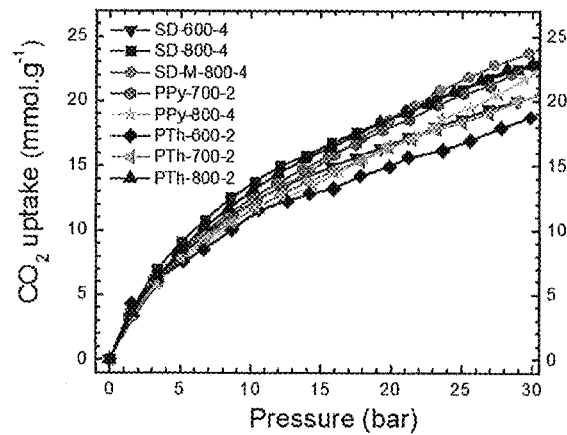
FIGS. 10A-10B show room temperature volumetric $CO_2$ (FIG. 10A) and methane ($CH_4$) (FIG. 10B) adsorption isotherms for PC, NPC, and SPC samples.
Figure 10B:
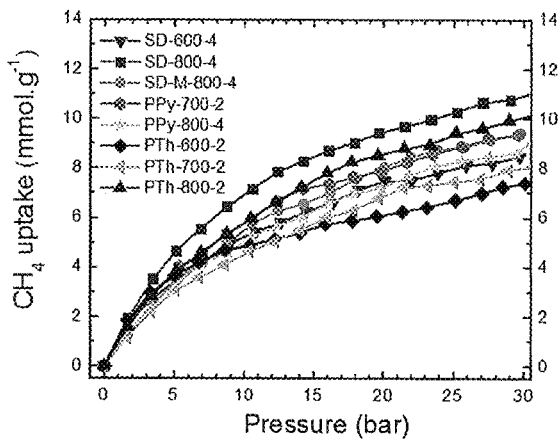
Figure 10C:
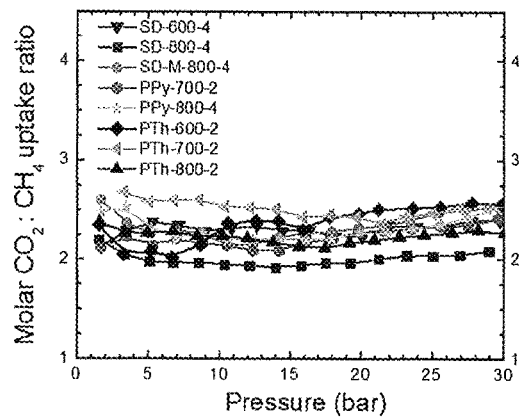
FIG. 10C shows the molar $CO_2$:$CH_4$ uptake ratio as a function of gas pressure for PC, NPC, and SPC samples.

FIG. 10A shows the $CO_2$ uptake plots along with the corresponding $CH_4$ uptake results in FIG. 10B. Additionally, the molar uptake selectivity ($CO_2/CH_4$) is defined by the molar ratio of adsorbed $CO_2$ and $CH_4$ at a certain pressure, i.e., at 30 bar. The dependence of molar uptake selectivity for a sorbent as a function of corresponding gas pressure is depicted in FIG. 10C. It is significant that for any particular sample, the selectivity varies with gas pressure. Of the samples investigated, PPy-600-2 demonstrated highest selectivity of 2.56 at 30 bar.

Figure 11A:
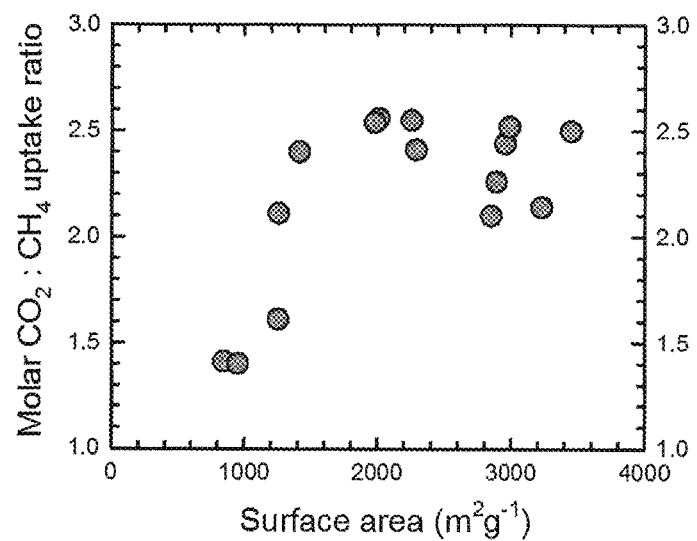
FIGS. 11A-11B show plots of molar $CO_2$:$CH_4$ uptake ratio (@ 30 bar) as a function of the surface area (FIG. 11A) and total pore volume (FIG. 11B) for a range of PC, NPC and SPC samples. Sorption measurements were performed at 24° C.

FIG. 11A shows a plot of molar $CO_2$:$CH_4$ uptake ratio as a function of the surface area ($S_{BET}$) for all the PC adsorbents measured. For low surface area samples, there is an increase in selectivity with increased surface area. However, as with uptake, further increase in surface area above 2000 m$^2$g$^{-1}$ does not appear to improve selectivity. In a similar manner, increased total pore volume ($V_p$) does facilitate increased selectivity, but only to a pore volume of 1.00 cm$^3$g$^{-1}$. No improvement in performance is shown above the aforementioned value (FIG. 11B).

Figure 11B:
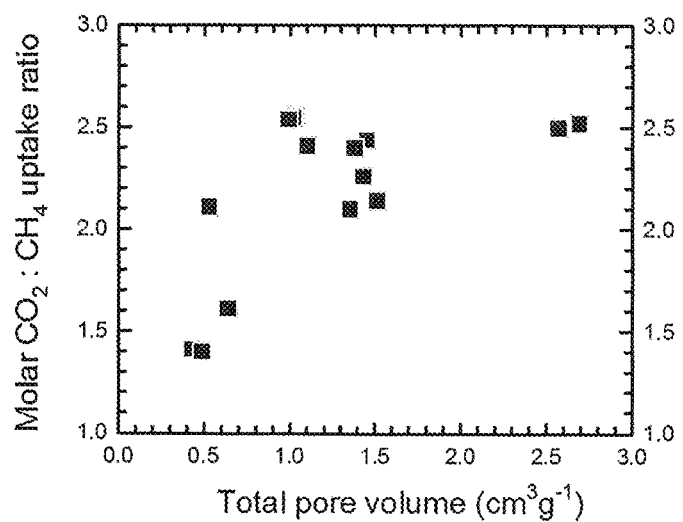
Figure 12A:
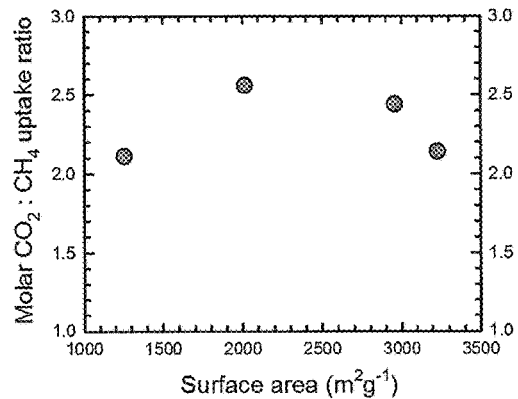
FIGS. 12A-12D show plots of molar $CO_2$:$CH_4$ uptake ratio (@ 30 bar) as a function of the surface area (FIG. 12A), total pore volume (FIG. 12B), activation temperature (FIG. 12C), and $CO_2$ uptake (FIG. 12D) for PPy-T-2 (T=500, 600, 700 and 800° C.) NPC samples. Sorption measurements were performed at 24° C.
Figure 12B:
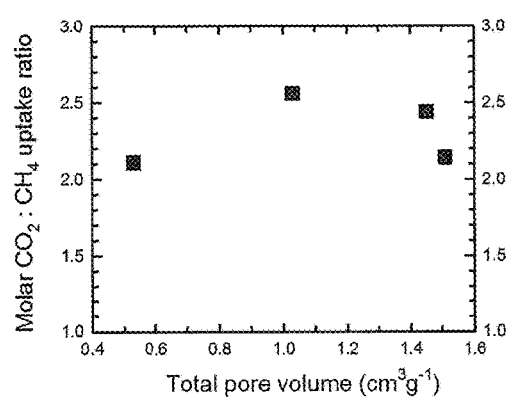
Figure 12C:
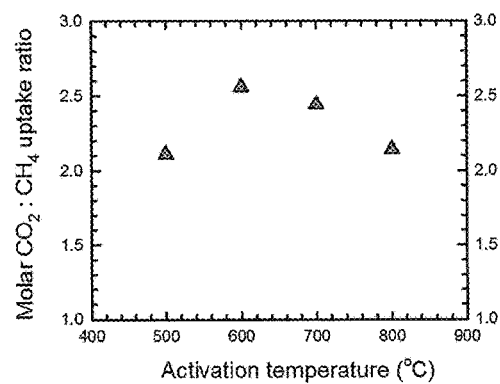
Figure 12D:
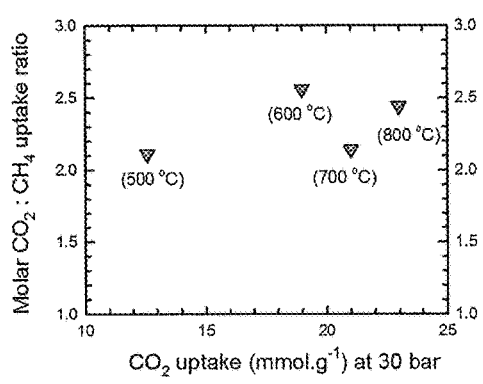

The series PPy-T-2 (T=500-800° C.) allows for the direct comparison of homologous materials. In this case, it appears that the values of 2,000 m$^2$g$^{-1}$ and 1.00 cm$^3$g$^{-1}$ for the surface area and total pore volume (FIGS. 12A-12D) represent maxima rather than thresholds. It is possible that for any homologous series similar maxima are observed. However, the thresholds observed in FIGS. 11A-11B are useful indicators.

From Table 2, it can be seen that an activation temperature of 600° C. is a minimum for good selectivity. However, from FIG. 12C, it may be seen that for the series PPy-T-2 (T=500-800° C.), this value is actually an optimum. Such results may vary with a particular class of material. However, a lower activation temperature is required to create a material with good selectivity as compared to optimum $CO_2$ uptake (FIG. 12D), suggesting that the best attainable sorbent material will have to combine a wise trade off of selectivity and $CO_2$ capture capacity. As may be seen from a comparison of PPy-800-2 and PPy-800-4 (Table 2), increased KOH concentration during the activation step results in greater selectivity.

Figure 13:
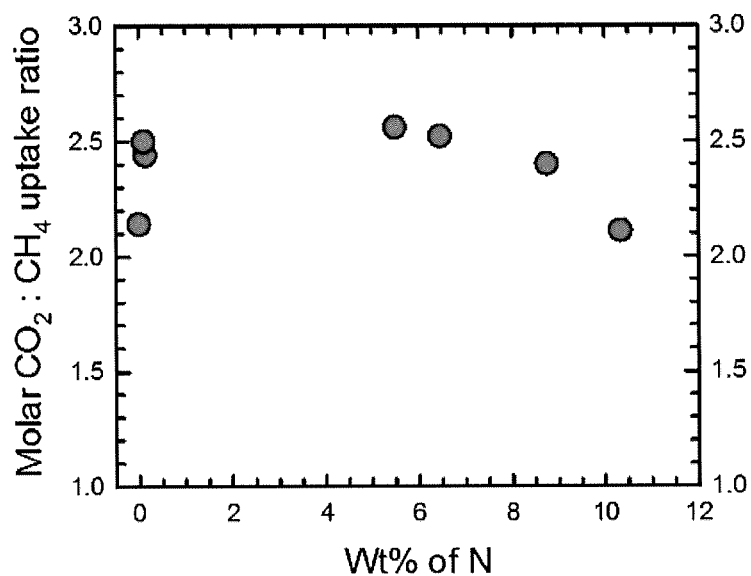
FIG. 13 shows high pressure (30 bar) molar $CO_2$:$CH_4$ uptake ratio as a function of N wt % in NPC samples. Sorption measurements were performed at 24° C.

The molar $CO_2$:$CH_4$ uptake ratio for NPC samples as a function of their N content is shown in FIG. 13. The selectivity for measurements at 30 bar decreases with N content above 5 wt %. In the case of SPC, there appears to be no effect on selectivity with S content (Tables 1 and 2).

These results seem to suggest that the presence of neither N nor S correlates in a direct manner with the $CO_2/CH_4$ selectivity. This is in line with Applicants' previous proposal. However, in this Example, a higher heteroatom content implies a lower surface area (and total pore volume) of the sorbent materials. Hence, a definite lack of impact of N or S doping on the selectivity performance of PCs cannot be considered a priori. Significantly, as may be seen from the data in Table 2, at lower pressures (10 bar), there is almost no dependence between selectivity and heteroatom content.

Figure 14:
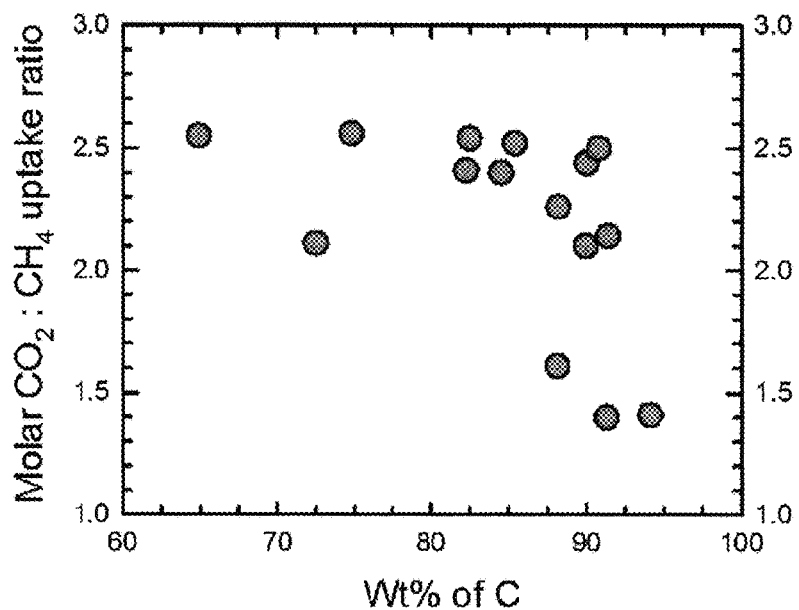
FIG. 14 shows the high pressure (30 bar) molar $CO_2$:$CH_4$ uptake ratio as a function of C wt % in PC, NPC, and SPC samples. Sorption measurements were performed at 24° C.

As was observed with the uptake efficiency for $CO_2$, the selectivity appears to be more a function of the total heteroatom composition (i.e., $\Sigma$(O,N,S) wt %, as presented in FIG. 14 in terms of C wt % (=100–$\Sigma$(O,N,S) wt %)). However, based upon the analysis of all the PC, NPC, and SPC materials studied, the 0 wt % seems to be the major contributor. The $CO_2/CH_4$ selectivity is at a potential maximum as long as C content is below 90 wt % (i.e., for $\Sigma$(O,N,S)>10 wt %). At lower pressure (10 bar), the carbon content is possibly even higher (C<94 wt %).

A study of a wide range of PC, NPC, and SPC materials under high pressure $CO_2$ and $CH_4$ adsorption offers some useful insight into the parameters that may collectively control both the $CO_2$ uptake efficiency and the $CO_2/CH_4$ selectivity. A summary of the proposed key requirements for a PC material with either good $CO_2$ uptake or good $CO_2/CH_4$ selectivity is given in Table 3 based on the results presented herein.

TABLE 3

Summary of proposed parameters required for optimum
$CO_2$ uptake and $CO_2/CH_4$ selectivity for PC, NPC, and SPC.

| Parameter | Uptake @ 30 bar | Selectivity @ 30 bar |
|---|---|---|
| Surface area ($m^2g^{-1}$) | >2800 | >2000 |
| Total pore volume ($cm^3g^{-1}$) | >1.35 | >1.0 |
| Temperature of activation (° C.) | 700-800 | 600 |
| Carbon content (%) | 80-95 | <90 |

As far as $CO_2$ uptake is concerned, any porous carbon material with a surface area of more than 2,800 $m^2g^{-1}$ at 30 bar is unlikely to be improved (when prepared from the KOH activation of non-nanostructured precursors). A similar threshold appears to be true for the total pore volume of the material (1.35 $cm^3g^{-1}$). This suggests that seeking synthetic routes to ever higher surface area and/or high pore volume PC-based adsorbents is counterproductive.

However, it should be understood that if uptake at lower pressures is desired, these threshold values decrease even further. This result is highly important in considering the choice of adsorbent to be used in a large scale unit. The adsorbent intended for use in a low pressure system needs a lower surface area and pore volume to perform than a potentially more expensive to manufacture material. It also impacts the formation of pelletized materials for adsorbent bed applications, since the formation of the pellet through inclusion of a binder inevitably lowers the surface area and pore volume. Applicants' results suggest that for lower pressure applications, this is not important since the uptake is less dependent on extremely high surface areas and/or pore volumes.

Given the prior interest in N- and S-doped PC materials, the results show that $CO_2$ uptake is inversely related to S and N content in SPC and NPC, respectively. However, due to the preparation process used in this Example (KOH activation), there is an intrinsic dependence between heteroatom content and surface area (total pore volume) in all sorbents. In particular, higher surface areas imply lower N or S contents.

Consequently, the use of KOH activated PCs in industrial scale units must take into account that a higher heteroatom content cannot offset the corresponding drop of $CO_2$ capture performance due to a decrease of surface area of the materials. In practical terms, it is the $\Sigma(O,N,S)$ wt % or C wt % (=100−$\Sigma(O,N,S)$ wt %) that is the defining factor for $CO_2$ uptake. This is true irrespective of the source of the heteroatom. However, O appears to be the main factor, since a C content of between 80 and 95 wt % offers the potential for high $CO_2$ uptake. However, at these levels, if the make-up is N or S, the uptake is likely reduced. It should also be observed based upon the source of the heteroatom that if heteroatoms are to be incorporated and "active", they are preferentially included using heterocycle precursors, such as melamine in the case of N, rather than other heteroatom-rich structures.

It may be assumed that the parameters that makes a good $CO_2$ adsorbent may be the same as those that make a selective material. However, Applicants' results indicate that the two are only broadly related. The levels of surface area and pore volume can be even lower for good $CO_2/CH_4$ selectivity, as compared to $CO_2$ uptake (Table 3).

In summary, Applicants demonstrate in this Example that a synthetic goal for PC-based material, for both high $CO_2$ adsorption and high $CO_2/CH_4$ selectivity, would comprise a C content of less than 90%. Given that neither N nor S seem to have a significant effect rather than the O that is present, it is clear that a design $C_xO_{1-x}$ where x<0.9 would possibly make an ideal $CO_2$ adsorbent material with the best $CO_2/CH_4$ selectivity. Furthermore, the goal should be a precursor where oxygen is incorporated into a cyclic moiety.

Additional experimental results and information are provided in FIGS. 15-23H and Tables 4-6. For instance, the chemical composition of OPC (750) has been thoroughly characterized via XPS, FTIR and Raman spectroscopy (FIGS. 23A-23H and Table 6), while textural properties were determined by high resolution scanning electron microscopy (FIGS. 21E-H), transmission electron microscopy (FIGS. 21I-J) and a BET Surface area analyzer (FIGS. 16A-16D). Moreover, measured values for gas uptakes have been confirmed via volumetric, gravimetric, multiple sample and cycles experiments.

Figure 22A:
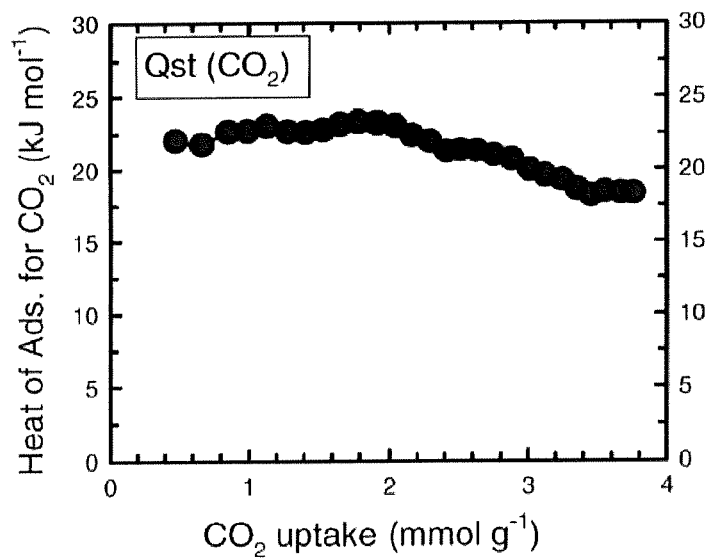
FIGS. 22A-22B show the isosteric heat of absorption of $CO_2$ (FIG. 22A) and $CH_4$ (FIG. 22B) as a function of molar gas uptakes.
Figure 22B:
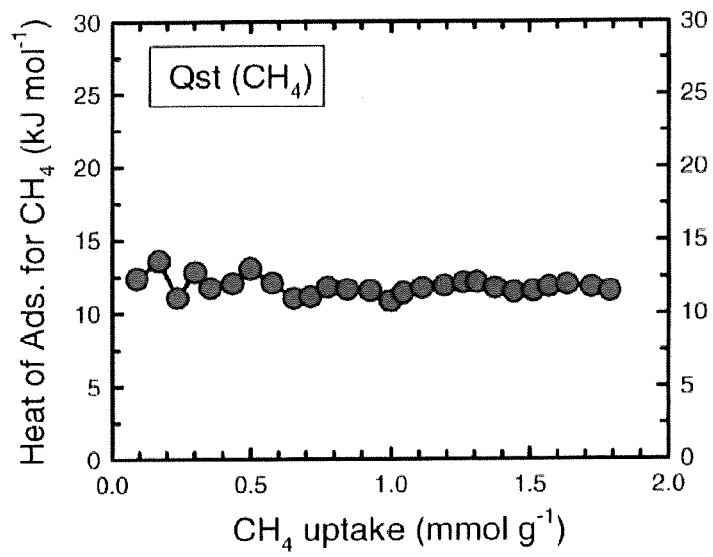
Figure 23A:
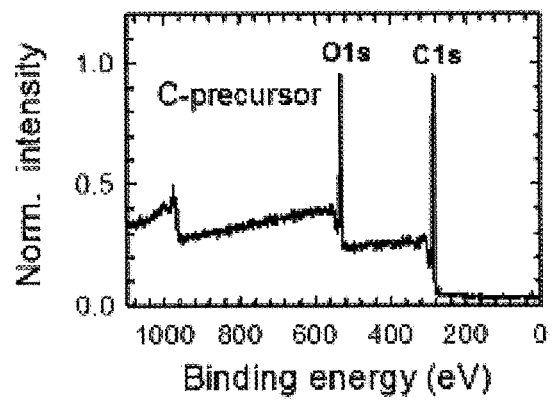
FIGS. 23A-23H show the characterization of chemical compositions of carbon precursor and porous carbon samples activated at increasing temperatures. Shown are X-ray photoelectron spectroscopy (XPS) survey scans for C-precursor (FIG. 23A) and OPC (800) (FIG. 23B). Also shown are the wt % of elemental carbon (FIG. 23C) and oxygen (FIG. 23D) vs. activation temperature. XPS elemental scanning for carbon C1s (FIG. 23E) and oxygen O1s (FIG. 23F) are also shown.
Figure 23B:
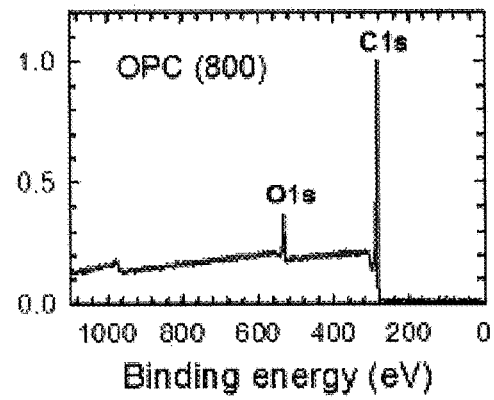
Figure 23C:
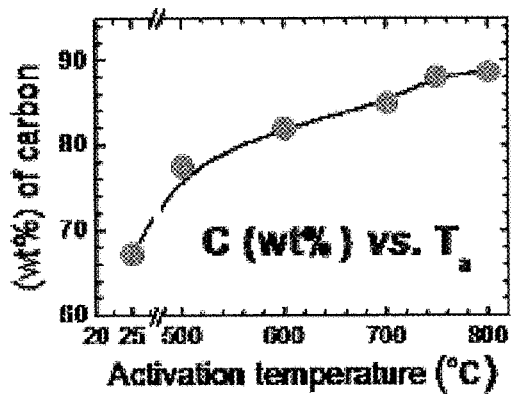
Figure 23D:
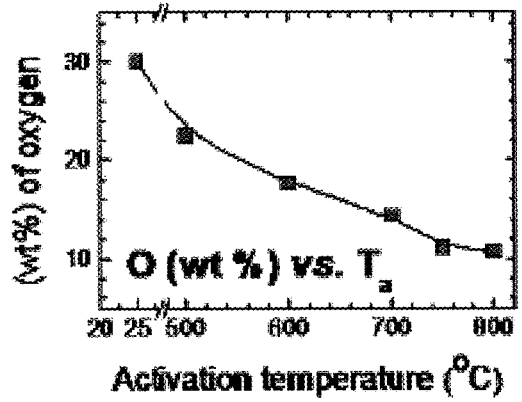
Figures 23E, 23F:
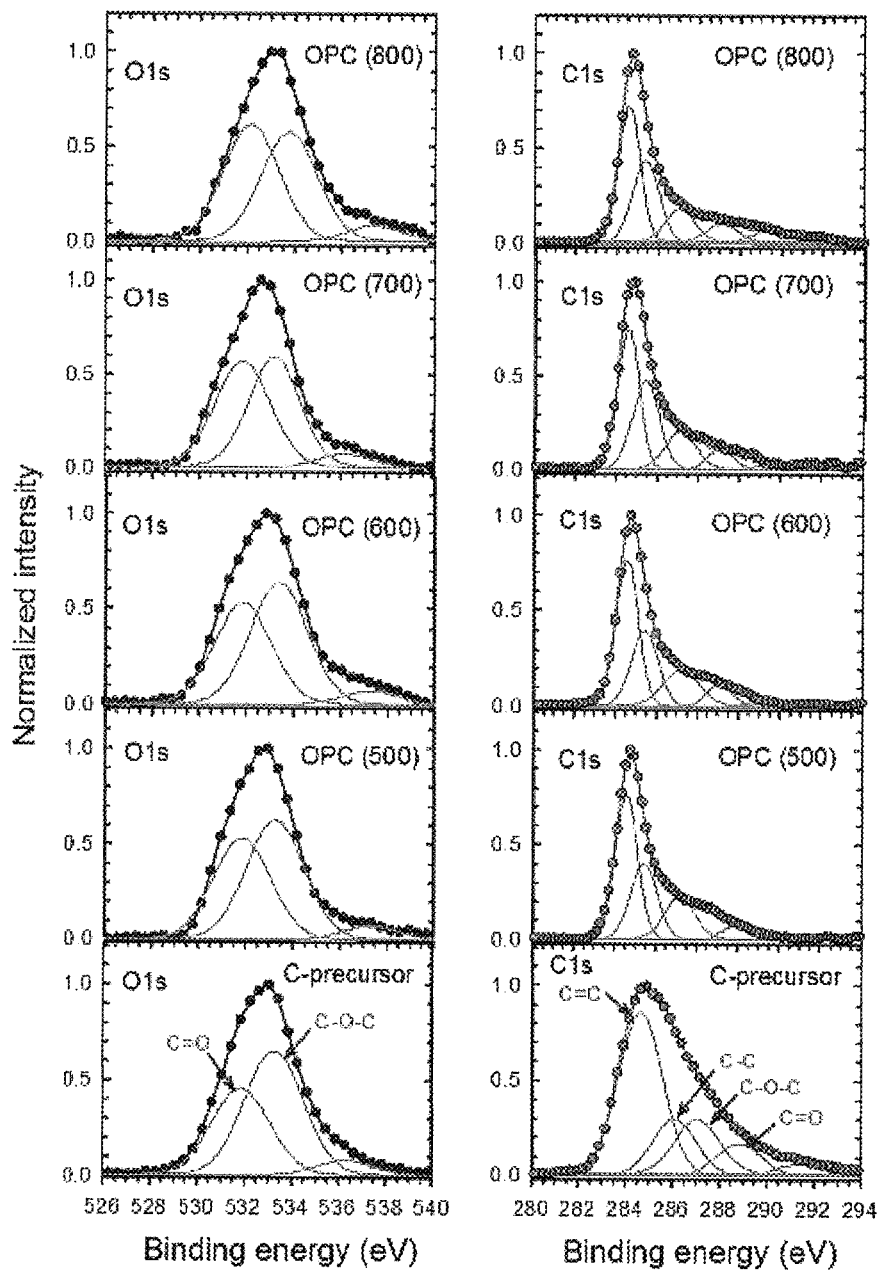
Figure 23G:
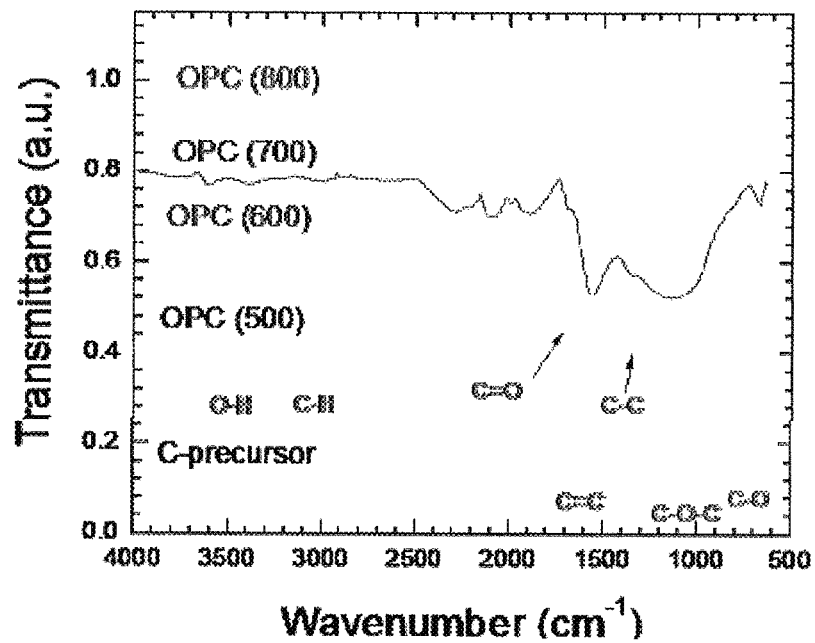
Figure 23H:
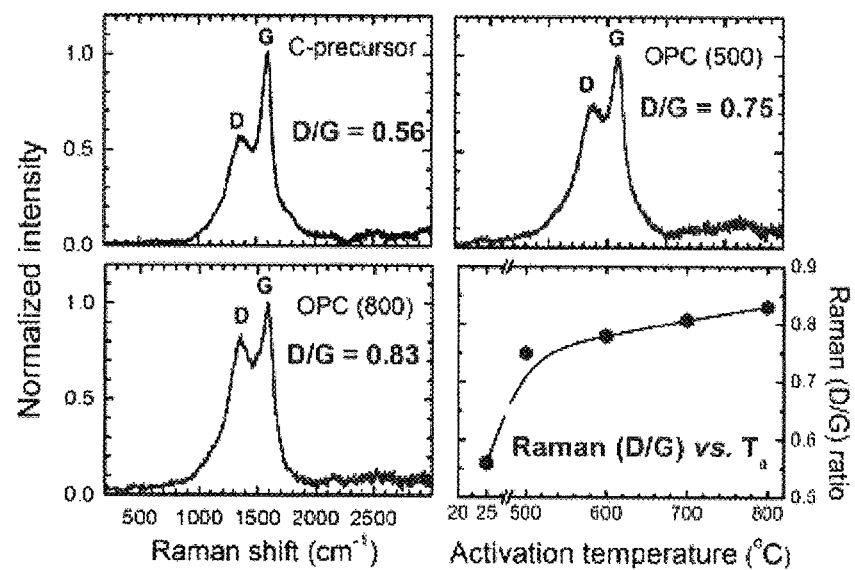

To the best of Applicants' knowledge, oxygen-rich carbon materials prepared from furfuryl alcohol has never been investigated for high pressure uptake of $CO_2$ and $CH_4$. In fact, there have been no reports of its use as a precursor for oxygen-rich porous carbon materials. In addition, a higher value for the isosteric heat of adsorption of $CO_2$ (23 kJ·mol$^{-1}$) versus 13 kJ·mol$^{-1}$ for $CH_4$ allows Applicants to scheme a temperature dependent strategy for removing $CO_2$ from natural gas via selective adsorption and desorption of $CH_4$ and $CO_2$ in steps (FIGS. 22A-22B).

TABLE 4

Survey of different c-feedstock used for the synthesis of
various PCs with high $CO_2$ uptake properties.

| PC sample | Source material for C-precursor | CAS no. | SKU pack size (Sigma Aldrich) | Price | Maximum $CO_2$ uptake at 30 bar (mmol g$^{-1}$) (wt %) |
|---|---|---|---|---|---|
| SPC (1) | 2-Thiophenemethanol | 636-72-6 | 181315-100 G | $155 for 100 g | 18.4 (81) |
| SPC (2) | Thiophene | 110-02-1 | T31801-500 G | $47 for 500 g | — |
| NPC (1) | Pyrrole | 109-97-7 | W338605-1 KG | $315 for 1 kg | — |
| NPC (2) | Polyacrylonitrile | 25014-41-9 | 181315-100 G | $190 for 100 g | 16.8 (74) |
| OPC (1) | Furfuryl alcohol | 98-00-0 | W249106-25 KG | $60 for 1 kg ($354 for 25 kg) | 26.6 (117) |
| OPC (2) | Furan | 110-00-9 | 185922-500 ML | $54 for 500 mL | — |

TABLE 5

Survey of gas adsorption properties of various PCs with high $CO_2$ uptake capacity.

| Sample | Surface area $S_{BET}$ ($m^2g^{-1}$) | Uptake of $CO_2$ at 30 bar (mmol · g-1) (wt %) | Uptake of $CO_2$ at 10 bar (mmol · g-1) (wt %) | Uptake of $CH_4$ at 30 bar (mmol · g-1) (wt %) | Ratio of adsorbed $CO_2/CH_4$ at 30 bar (molar) (mass) |
|---|---|---|---|---|---|
| C-Precursor | 48 | 3.3 (14.5) | 1.6 (7.0) | — | — |
| OPC (500) | 1143 | 17.1 (75.2) | 8.6 (37.8) | 6.7 (10.7) | 2.5 (7.0) |
| OPC (600) | 2116 | 20.0 (88.1) | 12.5 (55.0) | 8.3 (13.3) | 2.3 (6.3) |
| OPC (700) | 2610 | 20.8 (91.5) | 12.7 (55.9) | 9.1 (14.6) | 2.3 (6.2) |
| OPC (750) | 2856 | 26.6 (117.0) | 15.1 (66.4) | 9.6 (15.5) | 2.75 (7.5) |
| OPC (750) at 0.5° C. | 2856 | 42.9 (188.9) | 18.5 (81.5) | 14.6 (23.4) | 2.93 (8.0) |
| OPC (800) | 3005 | 23.0 (101.2) | 12.9 (56.7) | 9.01 (14.4) | 2.5 (7.0) |
| SPC [a] | 2500 | 18.4 (81.0) | 10.0 (44.0) | 7.1 (11.3) | 2.6 (7.1) |
| r-NPC [a] | 1450 | 16.8 (74.0) | 7.1 (31.2) | 1.6 (12.2) | 2.2 (6.1) |
| Act. charcoal | 845 | 8.4 (36.9) | 6.3 (27.7) | 6.0 (9.6) | 1.4 (3.8) |

TABLE 6

Elemental composition of various types porous carbon materials as determined by XPS excluding the contribution from elemental H.

| Sample | C (wt %) XPS | O (wt %) XPS | KOH:precursor | Surface area $S_{BET}$ ($m^2g^{-1}$) | Total pore volume $V_P$ ($cm^3g^{-1}$) |
|---|---|---|---|---|---|
| C-Precursor | 69.91 | 30.09 | — | 48 | 0.02 |
| OPC (500) | 77.49 | 22.51 | 3:1 | 1143 | 0.78 |
| OPC (600) | 82.04 | 17.74 | 3:1 | 2216 | 1.19 |
| OPC (700) | 85.07 | 14.93 | 3:1 | 2610 | 1.46 |
| OPC (750) | 88.21 | 11.79 | 3:1 | 2856 | 1.77 |
| OPC (800) | 89.28 | 10.72 | 3:1 | 3005 | 1.92 |
| Act. charcoal | 94.10 | 5.90 | 3:1 | 845 | 0.43 |

Example 3. Optimizing Carbon Dioxide Uptake and Carbon Dioxide-Methane Selectivity of Oxygen-Doped Porous Carbon Prepared from Oxygen Containing Polymer Precursors In this Example, Applicants report a reproducible synthesis of oxygen containing PC (OPC) by KOH activation at 500-800° C. of two oxygen containing precursor polymers: polyfurfuryl alcohol (PFFA) and polyanisyl alcohol (PAA), yielding FFA-OPC and AA-OPC, respectively. Both OPCs exhibit remarkable thermal stability and reproducible gas uptake properties for multiple cycles. Unlike other fine powder type activated PC materials, as-synthesized OPC sorbents are large pellet-like, making them a better candidate for preparing binder free solid pellet-like sorbent. The surface area and pore volumes of the OPC are independent of the precursor identity, but controlled by the activation temperature.

Similarly, the uptake of $CO_2$ is determined by the physical properties of the OPC: activation at 750° C. results in uptake that equals or out-performs existing PCs for high pressure uptake (30 bar) at 24.0° C. (FFA-$OPC_{750}$: 117 wt %; AA-$OPC_{750}$: 115 wt %). In contrast, while the uptake of $CH_4$ for both OPCs is greatest for samples activation at 750° C., FFA-$OPC_{750}$ shows significantly greater uptake compared to AA-$OPC_{750}$, 15.5 wt % versus 13.7 wt %, respectively. As a consequence, AA-$OPC_{750}$ demonstrates optimal selectivity for $CO_2$ capture over $CH_4$ uptake (AA-$OPC_{750}$: $V_{mass}(CO_2/CH_4)$=8.37 at 30 bar) as compared to other reported PCs. A higher value for the isosteric heat of adsorption of $CO_2$ (33 kJ $mol^{-1}$) versus $CH_4$ (14 kJ $mol^{-1}$) suggests a new temperature dependent strategy for removing $CO_2$ from natural gas via selective adsorption and desorption cycles. The differences in performance for $CH_4$ uptake between FA-OPC and AA-OPC, prepared under identical conditions, suggests that the structure of the precursor (heterocyclic versus exocyclic oxygen) is an additional variable in the design of new OPC materials.

In this Example, Applicants envision that an ideal PC would have a surface area of more than 2,800 $m^2g^{-1}$, a pore volume of more than 1.35 $cm^3g^{-1}$, and an oxygen content of between 5-20%. In this regard, Applicants have concentrated research efforts in developing routes to such materials that allow for low cost and reproducible synthesis.

Furfuryl alcohol (FA) has previously been formed into a highly cross-linked precursor via acid catalysis that can be converted to a PC. However, the process results in only a modest surface area and adsorption not sufficient to reach the performance parameters listed above. In this Example, Applicants report that, through $FeCl_3$ catalyzed polymerization and activation of polyfurfuryl alcohol (PFFA), an oxygenated PC (OPC) sorbent may be prepared which demonstrated higher room temperature $CO_2$ uptake as compared to other PC materials.

Applicants have shown that process conditions (temperature and KOH:precursor ratio) control the formation of micro (<2 nm) versus meso (>2 nm) porosity that is responsible for the highest $CO_2$ uptake. Although there appeared to be no significant difference in the performance as a function of the precursor, in creating nitrogen-doped PCs (NPCs) it was noted that incorporation of nitrogen into 6 versus a 5-membered cyclic precursor made a significant difference in the performance. Thus, there is interest as to whether using identical process conditions the precursor makes any significant effect. Applicants have therefore investigated a new OPC precursor polyanisyl alcohol (PAA) to compare with PFFA.

Moreover, if OPC is to be scaled, the cost of the catalyst used for PFFA, and similar polymeric precursors, is an issue to be addressed. Anisyl alcohol (4-methoxybenzyl alcohol), which is used as fragrance and flavourant and thus produced on a large scale, represents a low cost OPC precursor, while the formation of the polymer feedstock for OPC, polyanisyl alcohol (PAA), is synthesized by treating anisyl alcohol with concentrate $H_2SO_4$ in a single step.

Example 3.1. Materials and Methods $FeCl_3$, furfuryl alcohol (Sigma Aldrich, 98% purity), anisyl alcohol (Sigma Aldrich, 98% purity), $CH_3CN$, powdered KOH, distilled water, acetone, HCl, Ar (99.9% pure), $CO_2$ (99.99% pure, Matheson TRIGAS) and $CH_4$ (99.9% pure) were used as supplied. The SPC and NPC samples used as comparison were synthesized from 2-thiophenemethanol and polyacrylonitrile (Sigma Aldrich), respectively, following protocols previously described.

The chemical composition of the polymer and porous carbon materials were determined by X-ray photoelectron spectroscopy (XPS), Fourier transform infrared spectroscopy (FTIR) and Raman spectroscopy. The XPS measurements were carried out in a PHI Quantera scanning XPS microprobe. The wt % of chemical elements was determined by XPS survey scans with pass energy of 140 eV.

For detailed elemental analysis high-resolution multi-cycle elemental scans with pass energy 26 eV was performed. Each spectrum was then deconvoluted by appropriate basis functions. Before spectral fitting, each spectrum was corrected for reference binding energy for C1s to 284.8 eV. FTIR spectral measurements were performed in a Nicolet FTIR Infrared Microscope equipped with a liquid $N_2$ cooled detector. Raman spectra of solid samples were measured in a Renishaw Raman microscope equipped with a 514 nm excitation laser. Scanning electron microscopic images were obtained by a FEI Quanta 400 ESEM FEG high-resolution field emission scanning electron microscope. The high-resolution TEM images of activated OPCs were obtained by a JEOL 2100 field emission gun transmission electron microscope.

The textural properties: surface areas, distributions of pore volumes and total pore volume of carbonaceous materials were obtained by analyzing $N_2$ sorption isotherms (measured at 77 K), measured in a Quantachrome Autossorb-3b BET Surface Analyzer.

The surface area ($S_{BET}$) was calculated by the multipoint BET (Brunauer-Emmett-Teller) method. Before measurements, samples were dried at 140° C. for 12 hours under high vacuum system equipped with a liquid $N_2$ cold trap. The apparent BET surface area ($S_{BET}$) of the activated PC samples was calculated from the $N_2$ adsorption isotherm in the partial pressure ($P/P_0$) range of 0.05-0.30 and the total pore volume ($V_P$) was estimated from the amount of $N_2$ adsorbed at $P/P_0=0.99$. The distributions of pore volumes were determined by analyzing the data via non-local density functional theory. Selected results are given in Table 7.

Example 3.2. Synthesis of Polyfurfuryl Alcohol (PFFA)

In a typical synthesis, a solution was prepared by dissolving $FeCl_3$ (50 g) in $CH_3CN$ (200 mL). To this, a solution of furfuryl alcohol (5 g, Sigma Aldrich, 98%) mixed with $CH_3CN$ 50 (mL) was slowly added. The mixture was stirred for 24 hours under continuous argon purging. The polymerized product, brown colored polyfurfuryl alcohol (PFFA) was separated by filtration, washed thoroughly with DI water (ca. 4 L) and acetone (500 mL), before being dried at 40° C. for 12 hours under vacuum (Yield=98%).

Example 3.3. Synthesis of Polyanisyl Alcohol (PAA)

In a typical synthesis, concentrated $H_2SO_4$ (~6 mL) was slowly added dropwise to a glass beaker containing anisyl alcohol (10 g) in three steps. In each step, $H_2SO_4$ (2 mL) was added in drops to the glass beaker, stirred with a glass stirrer and a purple colored solid polymer of polyanisyl alcohol was formed. The synthesized polymer was separated from the mixture. To avoid over heating of reactants, the glass beaker was kept surrounded by a water/ice mixture. The reaction process continued until all the anisyl alcohol was converted into solid polymer. The synthesized polymer was washed with DI water (4×50 mL) to remove excess acid and then with acetone (200 mL). The solid polymer was then crushed into powder, transferred to a glass beaker and quickly washed with acetone (100 mL) and dried at room temperature for 12 hours under vacuum. The final product was a dark brown colored semi-soft mixture of PAA and trace amount of acetone, which helps mixing of polymer with KOH before chemical activation.

Example 3.4. Conversion of Polymer Precursors to Oxygenated Porous Carbon (OPC)

In a typical activation process, either PFFA or PAA (500 mg) was thoroughly mixed with KOH powder (1.5 g, crushed previously) in a mortar for 10 minutes. The mixture was then placed inside a quartz tube/tube furnace, dried for 20 minutes and then heated for 1 hour (for AA-OPC 30 minutes) at 500, 600, 700, 800 or 750° C., under a flow of Ar (99.9%, flow rate 600 sccm). The activated samples were then washed with HCl (100 mL, 1.4 M) and DI water until the filtrate attained pH=7. The product was dried at 70° C. for 12 hours under vacuum. The yield of activated PC materials depended on the activation temperature (e.g., FFA-OPC$_{500}$=55%, FFA-OPC$_{600}$=40%, FFA-OPC$_{700}$=30%, FFA-OPC$_{750}$=25-27%, and FFA-OPC$_{800}$=15%).

Example 3.5. $CO_2$ and $CH_4$ Uptake Measurements

The volumetric uptake measurements (pressure dependent excess isotherms) of $CO_2$ and $CH_4$ were performed in an automated Sievert instrument (Setaram PCTPRO). Various OPC samples were first crushed into powders and packed in a stainless steel autoclave sample cell. Initial sample pre-treatment was carried out at 130° C. for 1.5 hours under high vacuum. The free volume inside the sample cell was determined by a series of calibration procedures done under helium. Gas uptake experiments were carried out with high purity research grade $CO_2$ (99.99% purity, Matheson TRIGAS) and $CH_4$ (99.9% purity). The gravimetric uptake measurements were performed in a Rubotherm magnetic suspension balance instrument (Rubotherm, Germany). A summary of selected results is given in Table 7.

TABLE 7

$CO_2$ and $CH_4$ uptake properties (@ 24° C.) in comparison with commercial PC samples of OPC samples prepared from polyfurfuryl alcohol (FFA-OPC) and polyanisyl alcohol (AA-OPC).

| Sample [a] | Surface area $S_{BET}$ (m$^2$g$^{-1}$) [e] | Total pore volume $V_P$ (cm$^3$g$^{-1}$) [f] | Uptake $CO_2$ @ 10 bar (mmol·g$^{-1}$) | Uptake $CO_2$ @ 10 bar (wt %) | Uptake $CO_2$ @30 bar (mmol·g$^{-1}$) | Uptake $CO_2$ @30 bar (wt %) | Uptake $CH_4$ @30 bar (mmol·g$^{-1}$) | Uptake $CH_4$ @30 bar (wt %) | Molar ratio $CO_2/CH_4$ @30 bar | Mass ratio $CO_2/CH_4$ @30 bar |
|---|---|---|---|---|---|---|---|---|---|---|
| FFA-OPC$_{500}$ | 1143 | 0.78 | 8.6 | 37.8 | 17.1 | 75.2 | 6.7 | 10.7 | 2.5 | 7.0 |
| FFA-OPC$_{600}$ | 2116 | 1.19 | 12.5 | 55.0 | 20.0 | 88.1 | 8.3 | 13.3 | 2.4 | 6.6 |
| FFA-OPC$_{700}$ | 2610 | 1.46 | 12.7 | 55.9 | 20.8 | 91.5 | 9.1 | 14.6 | 2.3 | 6.3 |
| FFA-OPC$_{750}$ [b] | 2856 | 1.77 | 15.1 | 66.4 | 26.6 | 117.0 | 9.6 | 15.5 | 2.8 | 7.6 |
|  |  |  | (18.5) | (81.5) | (42.9) | (188.9) | (14.6) | (23.4) | (2.9) | (8.0) |
| FFA-OPC$_{800}$ | 3005 | 1.92 | 12.9 | 56.7 | 23.0 | 101.2 | 9.0 | 14.4 | 2.5 | 7.0 |
| AA-OPC$_{500}$ | 853 | 0.49 | 6.7 | 29.7 | 9.5 | 41.6 | 3.8 | 6.1 | 2.7 | 7.3 |
| AA-OPC$_{600}$ | 1980 | 1.13 | 11.6 | 50.9 | 17.6 | 77.3 | 6.8 | 10.9 | 2.6 | 7.1 |
| AA-OPC$_{700}$ | 2700 | 1.54 | 11.9 | 52.6 | 22.4 | 98.5 | 7.9 | 12.7 | 2.8 | 7.8 |
| AA-OPC$_{750}$ [b] | 3310 | 1.87 | 13.9 | 61.0 | 26.0 | 114.5 | 8.5 | 13.7 | 3.0 | 8.4 |
|  |  |  | (17.6) | (77.5) | (39.3) | (172.9) | (10.5) | (16.8) | (3.7) | (10.3) |
| AA-OPC$_{800}$ | 3040 | 2.27 | 9.6 | 42.2 | 21.8 | 96.0 | 8.3 | 13.2 | 2.6 | 7.2 |

TABLE 7-continued $CO_2$ and $CH_4$ uptake properties (@ 24° C.) in comparison with commercial PC samples of OPC samples prepared from polyfurfuryl alcohol (FFA-OPC) and polyanisyl alcohol (AA-OPC).

| Sample [a] | Surface area $S_{BET}$ (m$^2$g$^{-1}$) [e] | Total pore volume $V_P$ (cm$^3$g$^{-1}$) [f] | Uptake $CO_2$ @ 10 bar (mmol·g$^{-1}$) | (wt %) | Uptake $CO_2$ @30 bar (mmol·g$^{-1}$) | (wt %) | Uptake $CH_4$ @30 bar (mmol·g$^{-1}$) | (wt %) | Molar ratio $CO_2$/$CH_4$ @30 bar | Mass ratio $CO_2$/$CH_4$ @30 bar |
|---|---|---|---|---|---|---|---|---|---|---|
| Act. Charcoal [c] | 845 | 0.47 | 6.3 | 27.6 | 8.5 | 37.2 | 6.0 | 9.7 | 1.4 | 3.9 |
| BPL [d] | 951 | 0.53 | 6.30 | 27.7 | 8.7 | 38.1 | 6.18 | 9.9 | 1.4 | 3.8 |

[a] OPC activation temperature.
[b] Values in parenthesis performed at 0.5° C.
[c] Purchased from Mallinckrodt chemical works.
[d] Purchased from Calgon carbon corp.
[e] Apparent BET surface area estimated in P/P$_0$ range of 0.05-0.30.
[f] Total pore volume measured at P/P$_0$ ~0.99

Example 3.6. Results and Discussion

The experimental procedures for the synthesis of the best PC sample using KOH activation with the highest $CO_2$ uptake property rely on the optimization of two major parameters: the KOH:PFFA ratio and the temperature of activation ($T_a$). Earlier reports suggest that the overall porosity and the surface area of a chemically activated PC material increase with KOH concentration, and initial results suggested that KOH:PFFA=3 is best for developing nano-sized micropores (1-2 nm range). Thus, Applicants' procedures were carried out by keeping KOH:PFFA ratio fixed to 3 and by activating premixed KOH-PFFA mixtures at a single temperature in the range of 500-800° C.

Figure 24A:
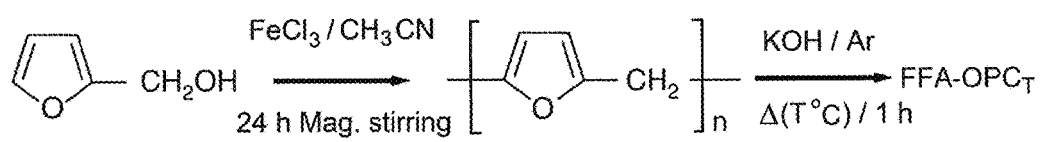
FIGS. 24A-24B provide schemes for the synthesis of various porous carbon materials.
Figure 24B:
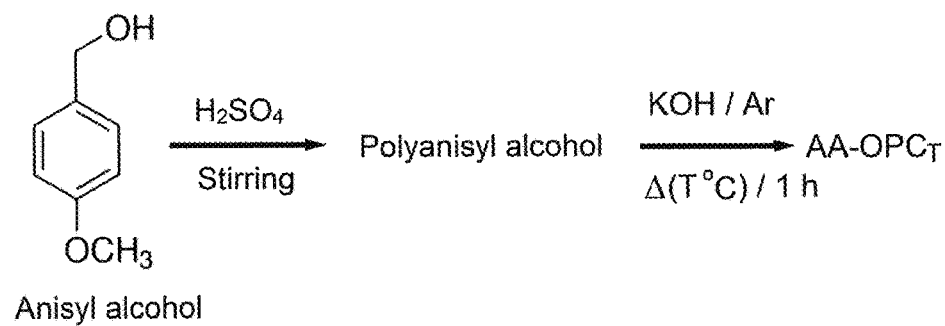

A schematic outlining the synthetic protocol for OPC from FA is presented in FIG. 24A. In the first step, a solid powder-like polymer of FA was prepared from liquid FA by the reaction in the presence of a FeCl$_3$ catalyst in CH$_3$CN. The synthesis of polyanisyl alcohol (PAA) is more facile and involves treating anisyl alcohol with concentrate H$_2$SO$_4$ in a single step (FIG. 24B).

The PFFA and PAA were then chemically activated by mixing with pre-ground KOH followed by pyrolysis at a stable temperature in the 500-800° C. range. A significant advantage of the use of the PFFA prepared in this manner, as compared to previous methods, is that it only releases a small amount of volatile product during activation, unlike other PC precursors.

Figures 25A, 25B, 25C:
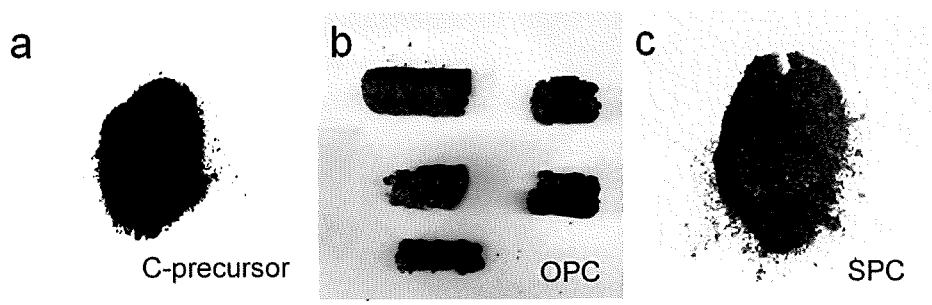
FIGS. 25A-25C show photographs of PFFA precursors (FIG. 25A), as-synthesized OPC (FIG. 25B), and as-synthesized SPC samples (FIG. 25C).

FIGS. 25A-25B show representative images of the PFFA and the resulting FFA-OPC$_{750}$. Both the as prepared OPC has a large pellet-like morphology. In comparison, an image of sulfur containing porous carbon (SPC) sample prepared under identical activation conditions is shown in FIG. 25C. This important structural rigidity makes OPC sorbents more appropriate for practical applications as opposed to other powder like sorbents.

The structural and textural morphology of the as-synthesized polymer and resulting activated OPC samples were determined by scanning electron microscopy (SEM) as represented by FIGS. 26A-26D. The PFFA and PAA precursors have a relatively dense morphology, but after activation with KOH, the resulting OPCs exhibit a texture full of micron size holes, multiple corners and edges that are absent in the precursors.

The related energy dispersive X-ray spectroscopy (EDS) determined elemental composition confirms the OPCs are primarily composed of carbon and oxygen (Table 8).

TABLE 8

Elemental composition of OPC as determined by XPS and EDS.

| | XPS | | EDS | |
|---|---|---|---|---|
| Sample | C (wt %) | O (wt %) | C (wt %) | O (wt %) |
| PFFA-precursor | 69.91 | 30.09 | 68.64 | 31.36 |
| FFA-OPC$_{500}$ | 77.49 | 22.51 | 78.64 | 18.85 |
| FFA-OPC$_{600}$ | 82.04 | 17.74 | 87.09 | 12.91 |
| FFA-OPC$_{700}$ | 85.07 | 14.93 | 89.92 | 10.08 |
| FFA-OPC$_{750}$ | 88.21 | 11.79 | 90.12 | 8.08 |
| FFA-OPC$_{800}$ | 89.28 | 10.72 | 90.58 | 9.42 |
| PAA-precursor [b] | 74.90 | 21.41 | | |
| AA-OPC$_{500}$ | 76.66 | 23.34 | | |
| AA-OPC$_{600}$ | 83.36 | 13.64 | | |
| AA-OPC$_{700}$ | 89.37 | 10.63 | | |
| AA-OPC$_{750}$ | 91.01 | 8.99 | | |
| AA-OPC$_{800}$ | 91.27 | 8.73 | | |

[a] Contributions from elemental H were excluded.
[b] PAA-precursor contained 3.7% S residue from the acid catalyst.

In order to image the microporous structure of activated OPCs, high-resolution transmission electron microscopy (HRTEM) was utilized. FIGS. 27A-27C display a set of images demonstrating randomly distributed micropores with dimension in the range of 1-2 nm for FFA-OPC$_{600}$ and slightly larger but evenly distributed micropores for FFA-OPC$_{800}$ and AA-OPC$_{800}$ samples. These nano-sized micropores play key roles in the ultra high $CO_2$ uptake at higher pressure.

Further characterization to determine important structural parameters such as surface area, pore size distribution and the total pore volumes of C-precursor and different OPC specimens activated at a fixed temperature in the range of 500-800° C. with a fixed KOH/PFFA ratio of 3 was carried out by measurement of the N$_2$ adsorption isotherms (at 77 K) using a BET (Brunauer-Emmett-Teller) surface area analyzer.

Figure 28A:
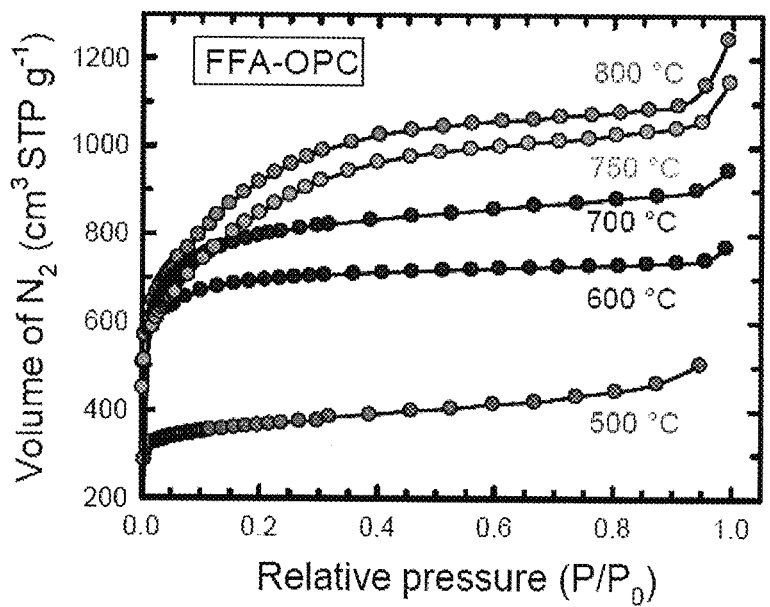
FIGS. 28A-28B show $N_2$ adsorption isotherms for FFA-OPCs (FIG. 28A) and AA-OPCs (FIG. 28B) measured at liquid $N_2$ temperature (77K).
Figure 28B:
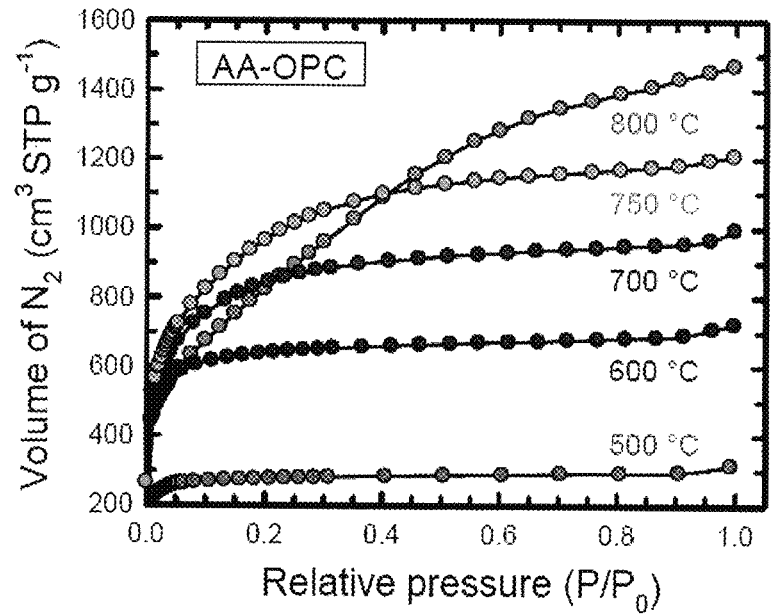

FIGS. 28A-28B show such set of isotherms for the OPCs activated at labelled temperature. Difference in the shape of these isotherms was noticed depending on the activation temperature. The isotherm for FFA-OPC$_{800}$ was much steeper than that of FFA-OPC$_{500}$ up to a relative pressure of 0.4 (FIG. 28A), indicating the variation in microporosity and adsorption capacity. The isotherm for AA-OPC$_{800}$ was shallower than that of the other samples, suggesting meso pore generation.

Figure 29A:
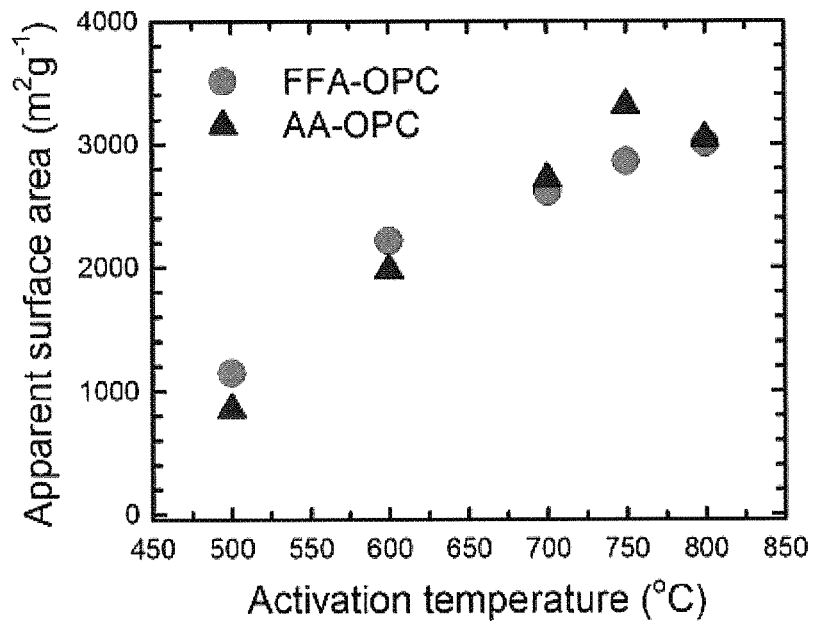
FIGS. 29A-29B show estimated apparent surface area (FIG. 29A) and total pore volumes versus activation temperature (FIG. 29B) for FFA-OPC and AA-OPC.
Figure 29B:
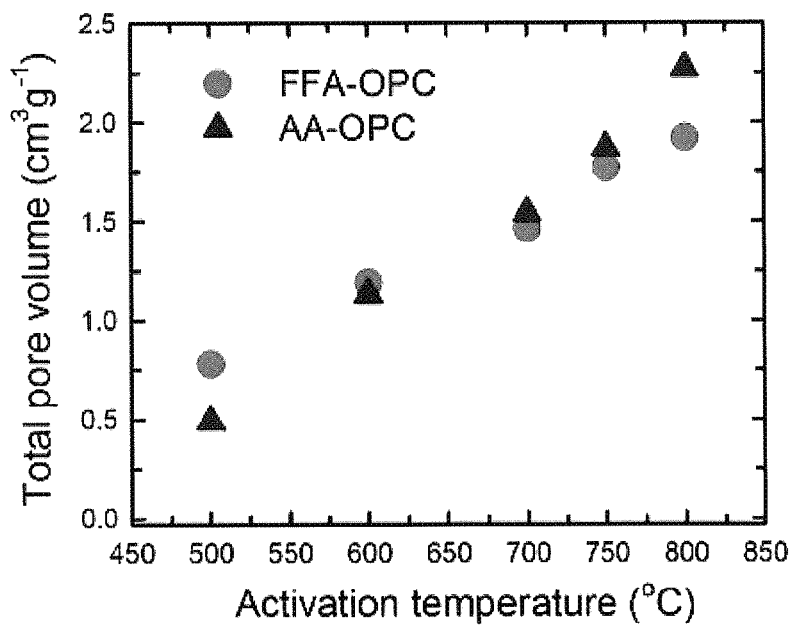

The estimated surface area ($S_{BET}$) and the total pore volume ($V_p$) gradually increased with activation temperature (FIGS. 29A-29B) describing the incremental trend for mildly to strongly activated samples. Activation between 650° C. and 800° C. the surface area for FFA-OPCs varied smoothly than that for pore volumes (FIG. 29A). In contrast, the surface area for AA-OPCs reaches an apparent maximum at 750° C. (FIG. 29B). Irrespective of these differences, both parameters increase with increasing activation temperature, with activation above 750° C. giving materials with surface area and pore volume above the threshold (i.e., >2,800 m$^2$g$^{-1}$ and >1.35 cm$^3$g$^{-1}$, respectively) to enable maximum $CO_2$ uptake.

Figure 30:
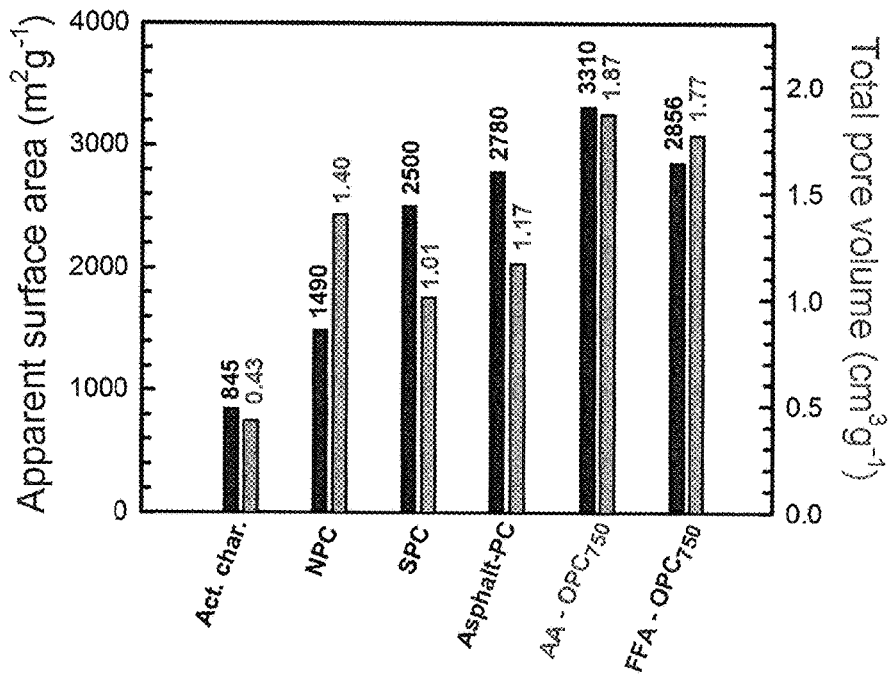
FIG. 30 shows apparent surface area (blue/dark bars) and total pore volumes (purple/light bars) for activated charcoal and PC samples with high $CO_2$ uptake properties at 30 bar (>12 mmol·$g^{-1}$).

FIG. 30 provides a comparison with other reported carbon based activated sorbents such as activated charcoal, SPC, NPC and asphalt derived PC specifically, explored for high pressure $CO_2$ uptakes. The values for AA-OPC$_{750}$ are amongst of the highest reported surface area and pore volume values for carbon based PC samples reported to date.

Figure 31A:
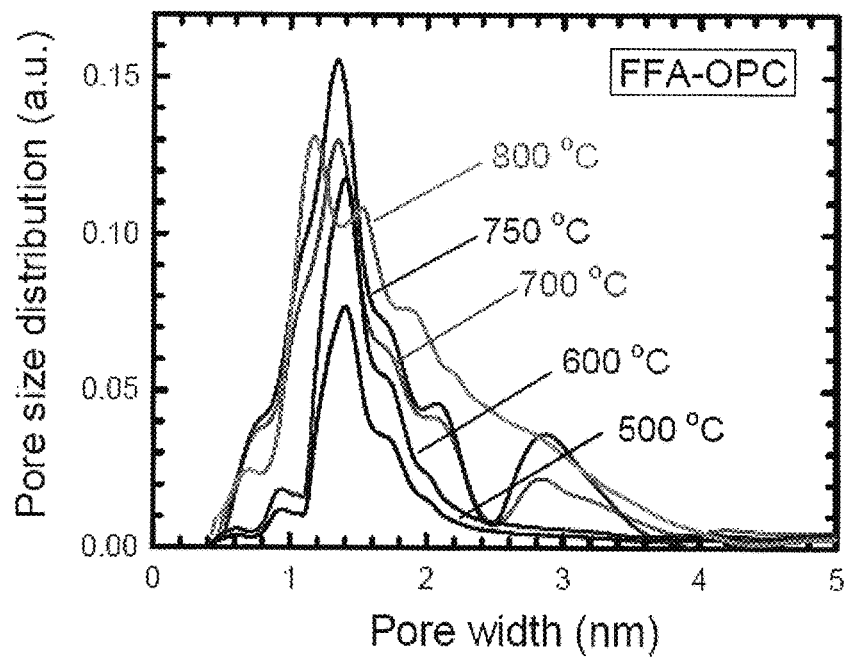
FIGS. 31A-31B show distribution of pore sizes as a function of pore width for five activation temperatures as determined by the nonlocal DFT method for FFA-OPC (FIG. 31A) and AA-OPC (FIG. 31B).
Figure 31B:
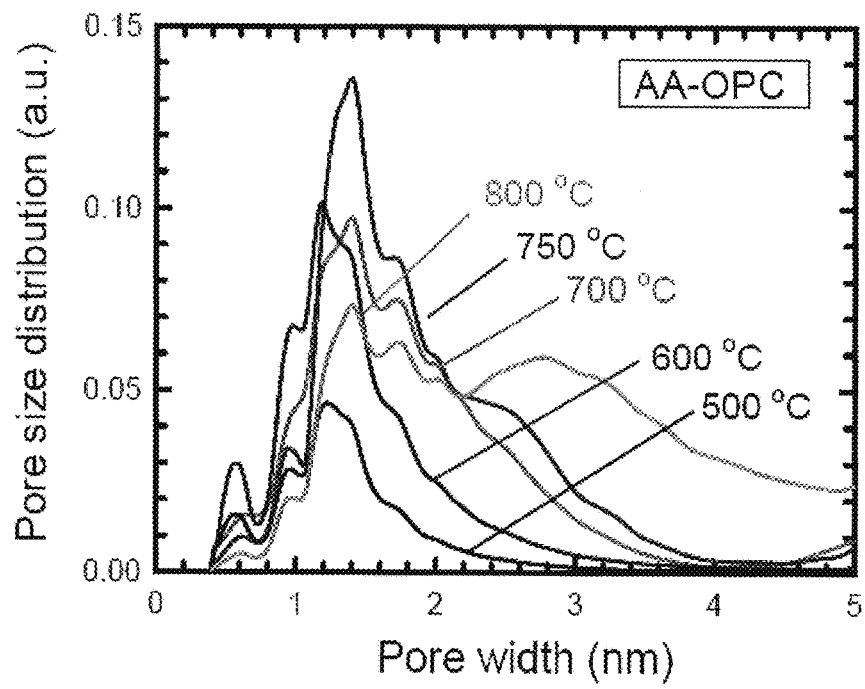
Figure 32A:
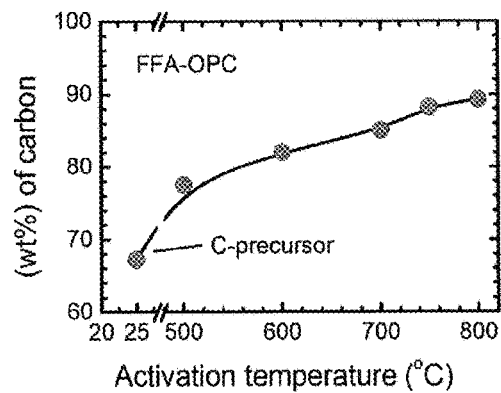
FIGS. 32A-32D show the wt % of elemental carbon (FIGS. 32A and 32C) and oxygen (FIGS. 32B and 32D) as determined by XPS versus activation temperature for FFA-OPC (FIGS. 32A and 32B) and AA-OPC (FIGS. 32C and 32D).
Figure 32B:
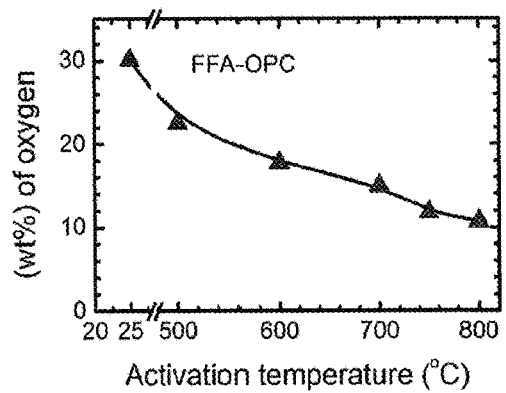
Figure 32C:
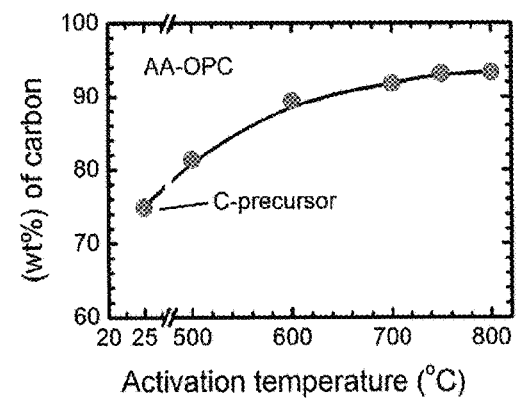
Figure 32D:
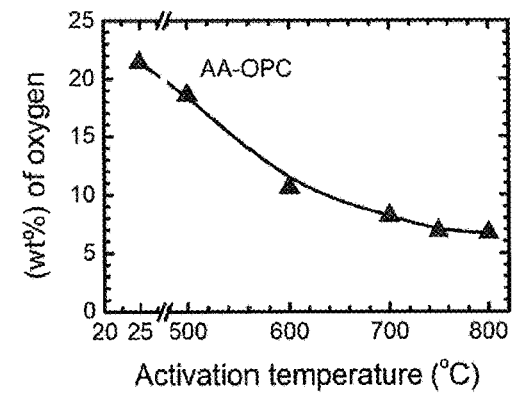

FIGS. 31A-31B depict the distributions of pore sizes as a function of pore width for activation temperatures (500° C.≤$T_a$≤800° C.) to strong ($T_a$=800° C.) activation conditions. These plots show that samples activated at temperatures between 500 and 700° C. mainly consisted of micropores in the range of 1-2 nm. In contrast, the distribution plot for FFA-OPC$_{800}$ indicates that chemical activation at temperature of about 800° C. created some additional mesopores in the 2.0-3.5 nm range, confirming the findings from HRTEM images discussed earlier (FIG. 27B). Pores larger than 4 nm were practically absent in all samples, except for AA-OPC$_{800}$ where the mesopore (>2 nm) contribution is dominant (FIG. 31B).

As noted above, the best $CO_2$ uptake of a PC is observed with a carbon content of 80-95 wt %. The chemical composition of polymer precursors and the subsequent OPCs was determined by X-ray photoelectron spectroscopy (XPS). The identity and wt % of the elements present on the sample surface were determined by XPS survey scans for core level electrons (Table 8). The XPS data further confirms that OPC samples primarily contained C and O (the H contents are not shown in XPS).

As expected, the C and O content varied from the polymers to the OPCs during chemical activation, and for the OPC samples the general trend was that the wt % of C increased and O decreased gradually with increasing activation temperature (FIGS. 32A-32D). Based upon the analysis, samples activated between 600° C. and 800° C. fall within the range required for maximum $CO_2$ uptake.

Figure 33A:
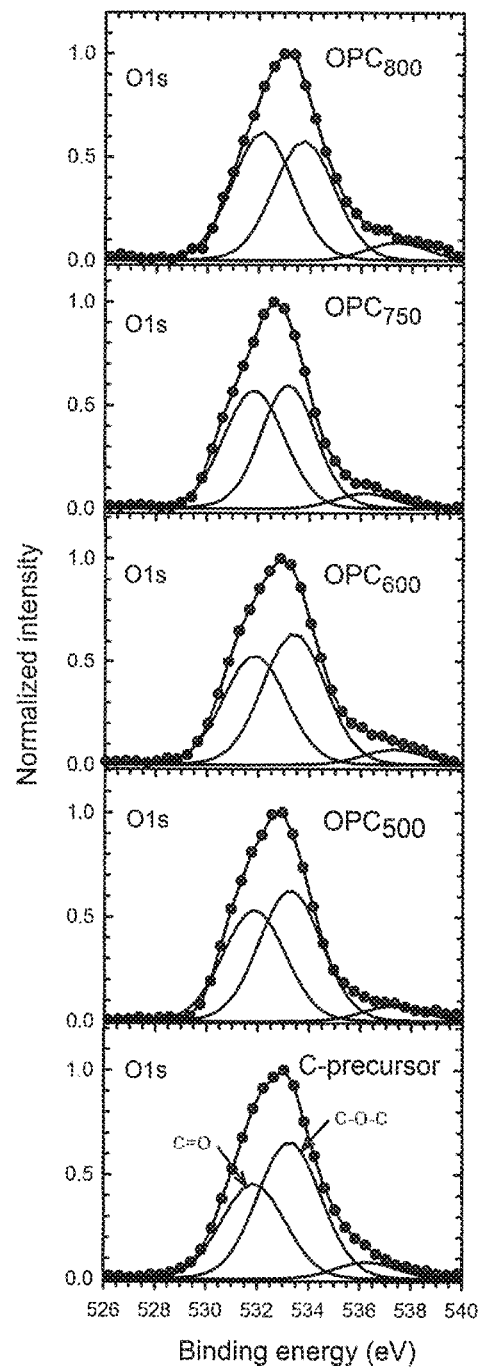
FIGS. 33A-33B show XPS elemental scanning for oxygen O1s (FIG. 33A) and carbon C1s (FIG. 33B) for PFFA precursor and FFA-OPC.
Figure 33B:
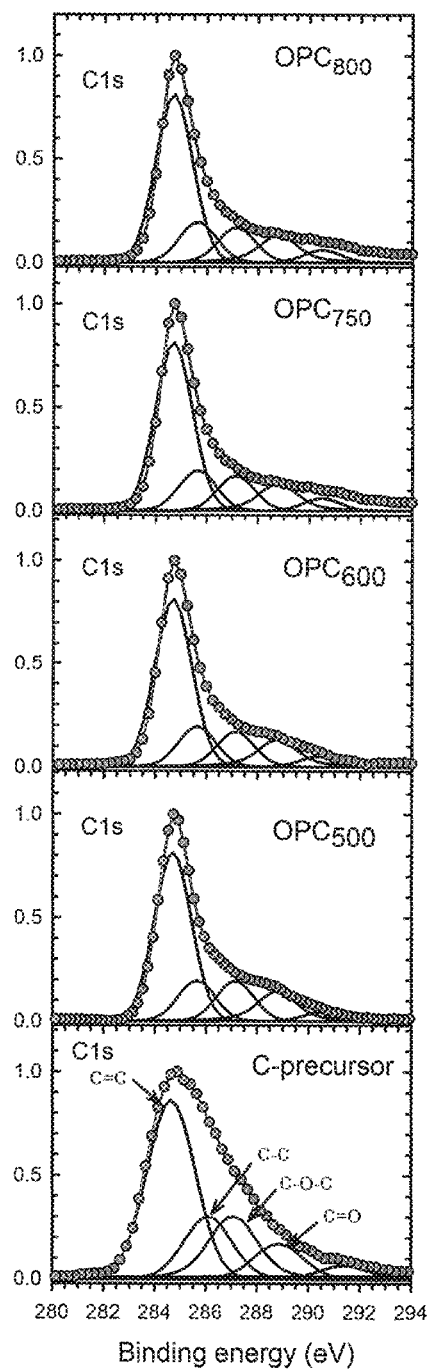

A set of high resolution XPS elemental scan data for C1s and O1s of PFFA and FFA-OPC samples (FIGS. 33A-33B), de-convoluted by appropriate basis peaks helped Applicants identify the possible functional groups present in the precursor and numerous activated samples. For PFFA, the C1s band could be resolved into four main peaks and labelled according to probable functional groups as in polythiophene. Thus, these peaks were assigned to the following functional groups: sp$^2$ hybridized C=C (284.7 eV), C—C (286.1 eV), C—O—C (287.1 eV) and C=O (288.9 eV). An additional shoulder near 291.3 eV is attributed to π-π* shake-up peak. In contrast to PFFA, the activated sample exhibited much narrower C=C peak (FWHM: 1.3 eV versus 2.2 eV for PFFA). The resolved basis peaks under O1s spectra were attributable to two main functional groups: the C—O—C group at 533.2 eV (O within the furan ring) and the carbonyl group (C=O) at 531.8 eV. Without being bound by theory, Applicants believe that KOH induced oxidation during chemical activation at higher temperature resulted in formation of more carbonyl groups, though the absence of well resolved band for O1s made it difficult to extract the absolute proportion of these two functionalities.

Figure 34:
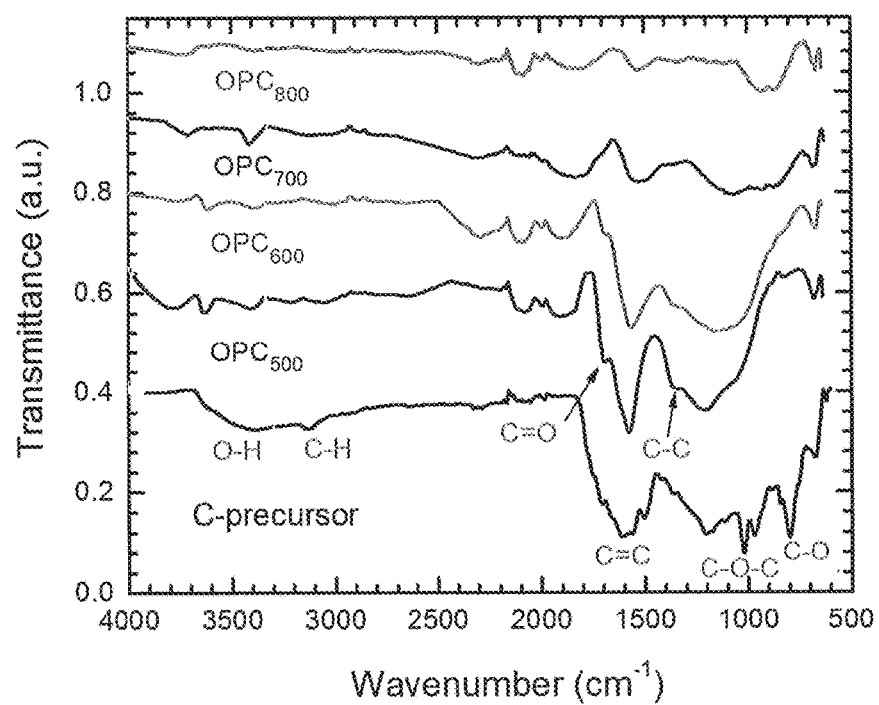
FIG. 34 shows FTIR spectra of PFFA precursor and activated FFA-OPCs. Spectra are base line corrected and vertically offset for clarity (KOH:PFFA=3 in all cases).

The nature of carbon and oxygen functional groups present in the as-synthesized PFFA and activated FFA-OPCs were further explored via FTIR spectroscopy. The IR spectrum for PFFA (FIG. 34) exhibited well defined but broad peaks originated from various IR active vibrational stretches identified as: C—O—C asymmetric stretching vibration (1020 cm$^{-1}$), C—C stretching (1358 cm$^{-1}$), and C=C symmetric and asymmetric stretching vibrations in the furan ring (1510 and 1585 cm$^{-1}$, respectively). The frequency shift and broadness of these bands may be attributed to the aggregated phase of the synthesized polymer. In contrast to PFFA, the activated samples exhibited multiple stretching vibrations with gradually decreasing intensity. The intensity of all these peaks decreased systematically with increasing activation temperature as evidenced by the spectra of FFA-OPC$_{500}$ and FFA-OPC$_{800}$. For FFA-OPC$_{500}$, in addition to C=C stretching frequencies another shoulder peak was identified near 1710 cm$^{-1}$, which could be assigned to C=O stretching vibrations. Moreover, the C—O—C and O—H functional groups that were present in the C-precursor and mildly activated samples ($T_a$=500° C.) slowly removed due to chemical activation at higher temperature.

Figure 35A:
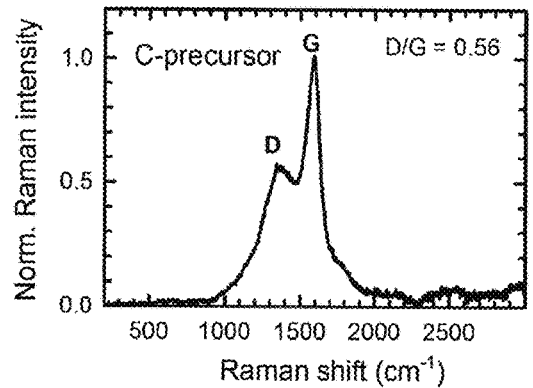
FIGS. 35A-35D show Raman spectra and Raman disorder (D) to graphene (G) band intensity ratio versus activation temperature (KOH:PFFA=3 in all cases).
Figure 35B:
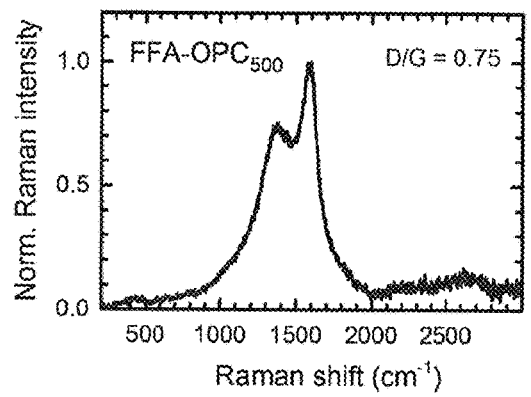
Figure 35C:
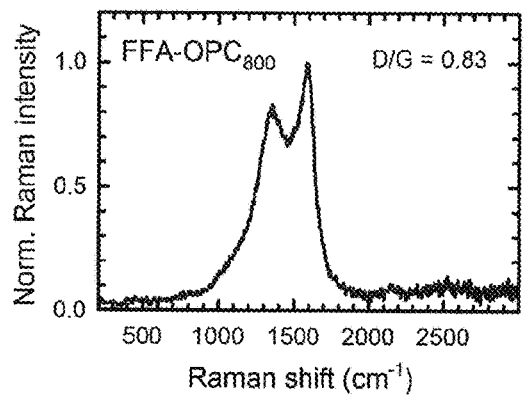
Figure 35D:
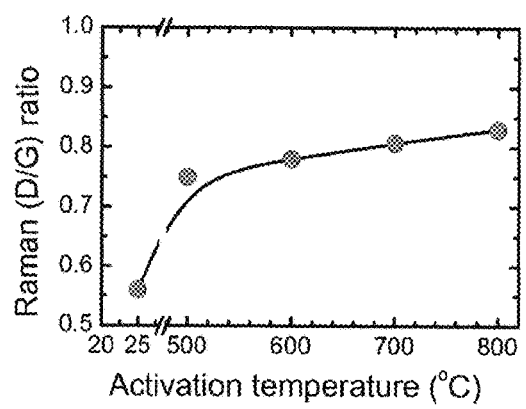

The aromatic sp$^2$ hybridized C=C and amorphous sp$^3$ hybridized C—C bonds present in PFFA and activated FFA-OPCs were further characterized by Raman spectroscopy. FIGS. 35A-35C represent a set of three normalized spectra depicting spectral changes for two major bands; the sharp graphene (G) band (1590 cm$^{-1}$) and the broad disorder (D) band located (1360 cm$^{-1}$), attributing to the aromatic sp$^2$ and amorphous sp$^3$ hybridized carbons, respectively. A more direct dependence for the (D/G) intensity ratio on activation temperature is shown in FIG. 35D, bottom panel. The D/G value varied from 0.56 for PFFA, to 0.75 for FFA-OPC$_{500}$ and 0.83 for FFA-OPC$_{800}$, signifying the gradual removal of sp$^2$ and addition of sp$^3$ carbons as a result of chemical activation under mild to strong activation conditions.

Example 3.7. $CO_2$ Uptake

Among the various types of solid porous materials that efficiently capture $CO_2$, MOFs (metal organic frameworks), zeolites, cross-linked polyethylenimine, and a variety of powder like activated PCs play significant roles over other sorbents and widely utilized for industrial application due to their high surface area, thermal stability, low cost of synthesis, and high gas adsorption capacity with remarkable reproducibility. However, within the category of activated PC materials with high $CO_2$ uptake capacity, to date, most of the sorbents were investigated for $CO_2$ uptake performance up to a pressure limit of only 1 bar due to the limitation of available instruments. However, in industrial applications, higher pressures are needed.

For example, removal of $CO_2$ from natural gas at the wellhead needs to be optimized between 15-30 bar. Applicants have previously shown that the best PC materials show a maximum $CO_2$ uptake of 20-25 mmol·g$^{-1}$ at 30 bar and 24° C. In this context, Applicants have carried out careful volumetric $CO_2$ uptake experiments on the OPC sorbents as a function of gas pressure up to a limit of 30 bar and compared the results to previously reported PC samples measured under the same conditions.

Figure 36A:
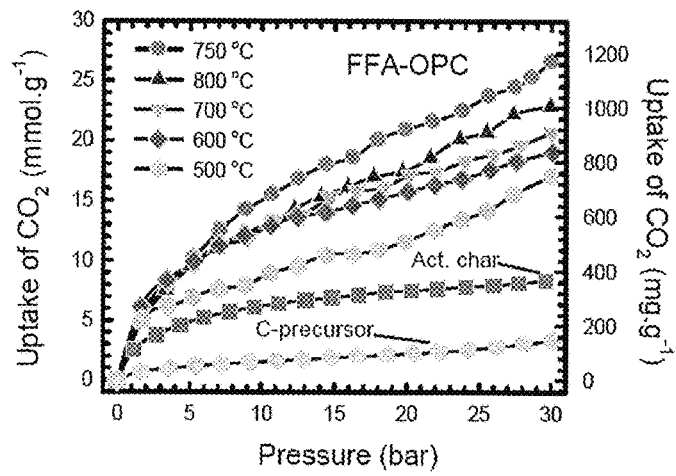
FIGS. 36A-36B show volumetric $CO_2$ uptakes of FFA-OPC (FIG. 36A) and AA-OPC (FIG. 36B) samples activated at different temperatures.
Figure 36B:
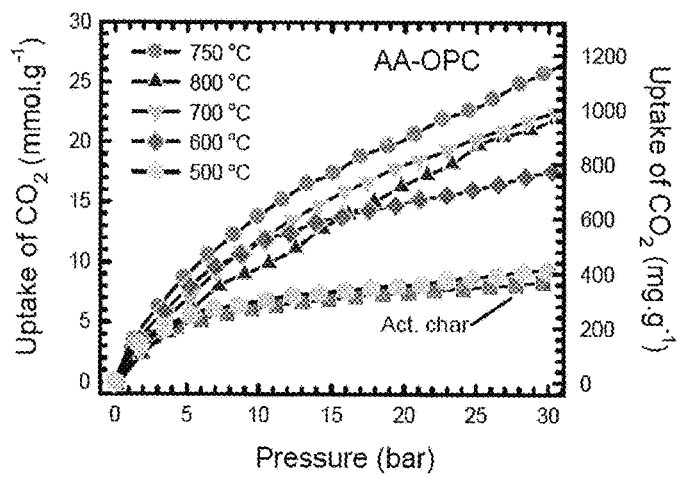
Figure 36C:
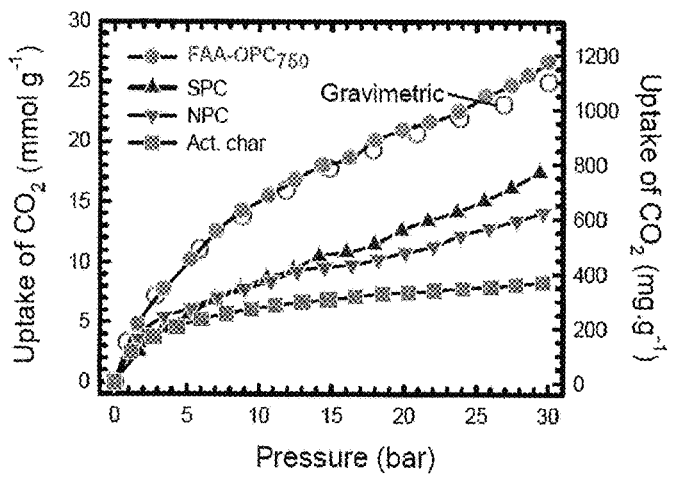
FIG. 36C shows the volumetric $CO_2$ uptakes of FAA-$OPC_{750}$, NPC, SPC, and activated charcoal up to a pressure limit of 30 bar. Measurements were performed in a PCTPRO instrument at 24° C.

In order to identify the OPC sorbent with the highest $CO_2$ uptake capacity, Applicants measured pressure dependent $CO_2$ uptake for a set of OPC samples prepared with a fixed KOH:polymer=3 and activated at a fixed temperature in the 500-800° C. range (FIGS. 36A-36C). Clear difference between the shapes of uptake isotherms indicates that uptake varies with activation temperature ($T_a$). In particular, higher values of $T_a$ correlated with higher uptake values for a specific adsorption pressure.

The C-precursors adsorbed negligible amount of $CO_2$ and the most mildly activated OPC. AA-OPC$_{500}$ showed an uptake similar to activated charcoal. The general trend was: OPC that was activated at higher temperature contained more micropores and with larger surface area performed better. Strikingly, both FFA-OPC$_{750}$ and AA-OPC$_{750}$ captured more $CO_2$ than their OPC$_{800}$ homologs; while in the case of FFA-OPC$_{800}$ it has a higher surface area and pore volume (Table 7).

A similar observation was reported for low pressure (up to 1 bar) gas uptake of $CO_2$ by polypyrrole derived PCs. Applicants believe that the reason for the higher uptake performance of OPC$_{750}$ was that OPC$_{800}$ contained more mesopores larger than 2 nm. In this context, it is important to note that up to a pressure bar of 5 bar all OPC samples capture similar amount of $CO_2$ (except the OPC$_{500}$ samples).

FIG. 36C displays a set of equilibrium volumetric $CO_2$ uptakes at room temperature as a function of adsorbate pressure for various PC specimens such as activated charcoal, NPC, SPC, FFA-OPC$_{750}$, and AA-OPC$_{750}$.

Applicants noticed that among the all activated OPCs, though all of them captured more $CO_2$ than previous reported SPC or NPC samples, both FFA-OPC$_{750}$ and AA-OPC$_{750}$, demonstrated the highest $CO_2$ capture capability. Thus, Applicants subsequently carried out repeated uptake experiments on different batches of both OPC$_{750}$. The $CO_2$ uptake result for FFA-OPC$_{750}$ was further verified by another gravimetric uptake experiment carried out in a Rubotherm magnetic suspension balance instrument (FIG. 36C, open circles). These uptake plots further established that at a pressure of 30 bar, FFA-OPC$_{750}$ exhibited an ultrahigh $CO_2$ capture capacity of 26.6 mmol·g$^{-1}$ (117 wt %), outperforming other doped PCs by a large margin. Moreover, OPC$_{750}$ adsorbed slightly, but repeatedly, more $CO_2$ than the recently reported activated PCs made from asphalt Versatrol-HT (26.6 versus 26 mmol·g$^{-1}$).

It should be noted that the latter material required multiple activation steps, pretreatment, N-addition and reduction by $H_2$ to be capable of adsorbing such quantity of $CO_2$, which is in contrast with the far simpler process described herein. In contrast, OPC$_{750}$ is prepared from a simple precursor in a single activation step without N-addition or $H_2$ reduction.

Figure 37:
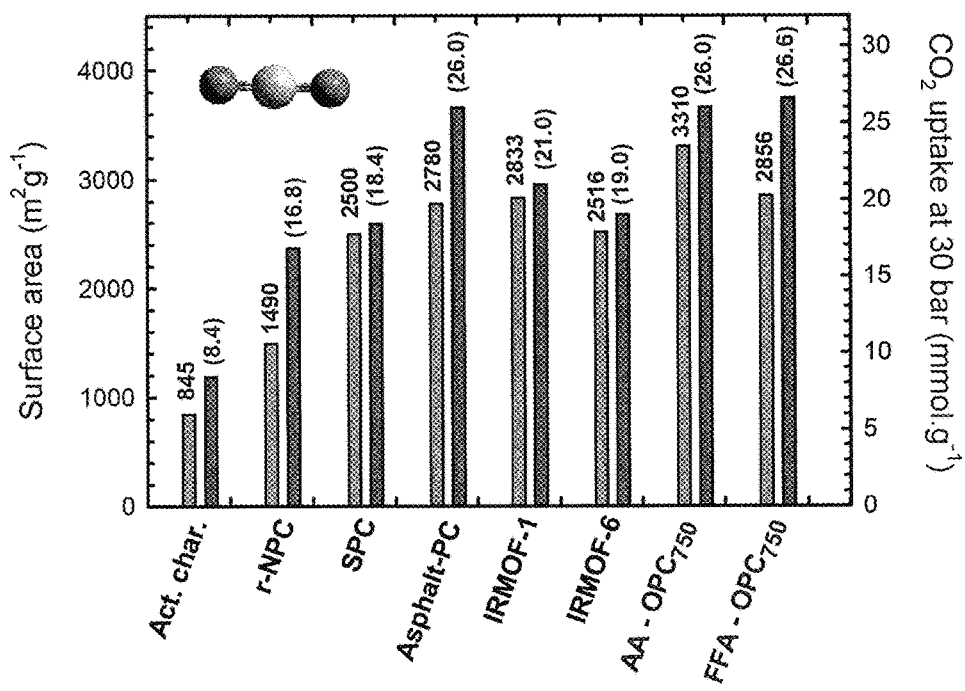
FIG. 37 shows graphical representation of surface areas and maximum $CO_2$ uptake capacities at 30 bar for activated charcoal and different sorbent samples with high $CO_2$ uptake properties at 30 bar (>12 mmol·$g^{-1}$).

To the best of Applicants' knowledge, among the category of high $CO_2$ uptake PC materials, FFA-OPC$_{750}$ exhibits remarkable $CO_2$ capture properties comparable to expensive MOFs with similar apparent surface area. For example, IRMOF-1 with a surface area of 2833 m$^2$g$^{-1}$ captures about 21 mmol·g$^{-1}$ of $CO_2$ at 30 bar. IRMOF-6 with a surface area of 2516 m$^2$g$^{-1}$ captures about 19 mmol·g$^{-1}$ at 30 bar. The overall volumetric $CO_2$ uptake results at 30 and 10 bar, for various sorbents are compared in Table 7, while the maximum amounts of gas uptakes at 30 bar for different PC samples with corresponding surface area is represented by FIG. 37.

Figure 18A:
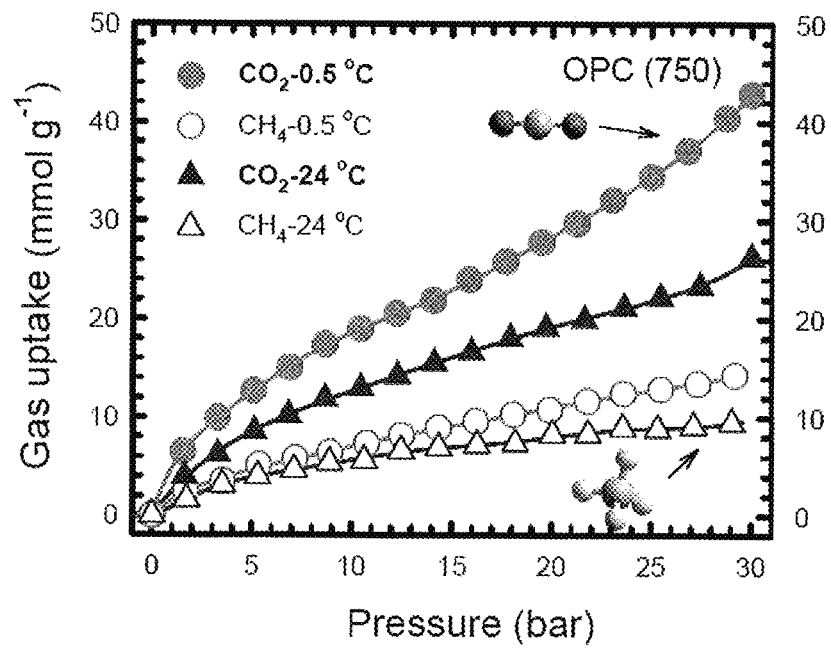
FIGS. 18A-18B provide a demonstration of optimal gas uptake selectivity of OPC samples for $CO_2$ over $CH_4$.
Figure 18B:
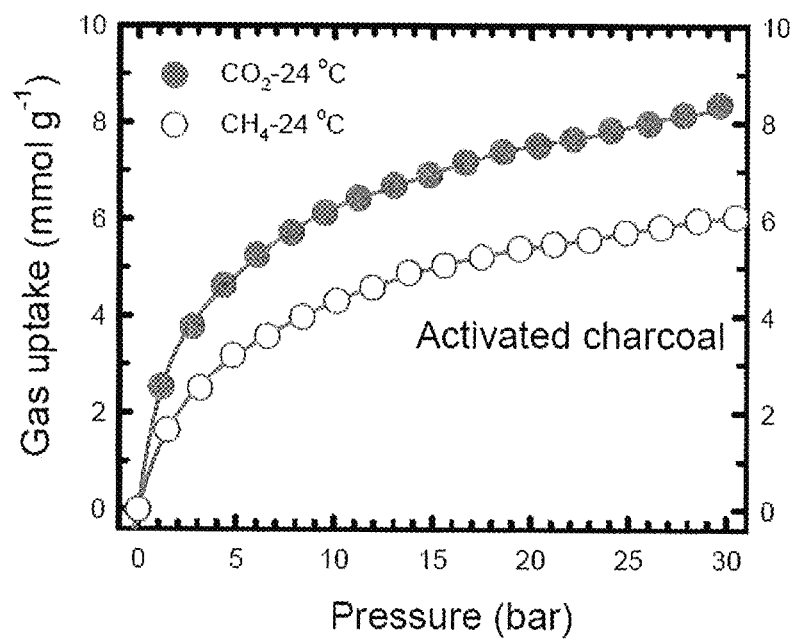
Figure 19:
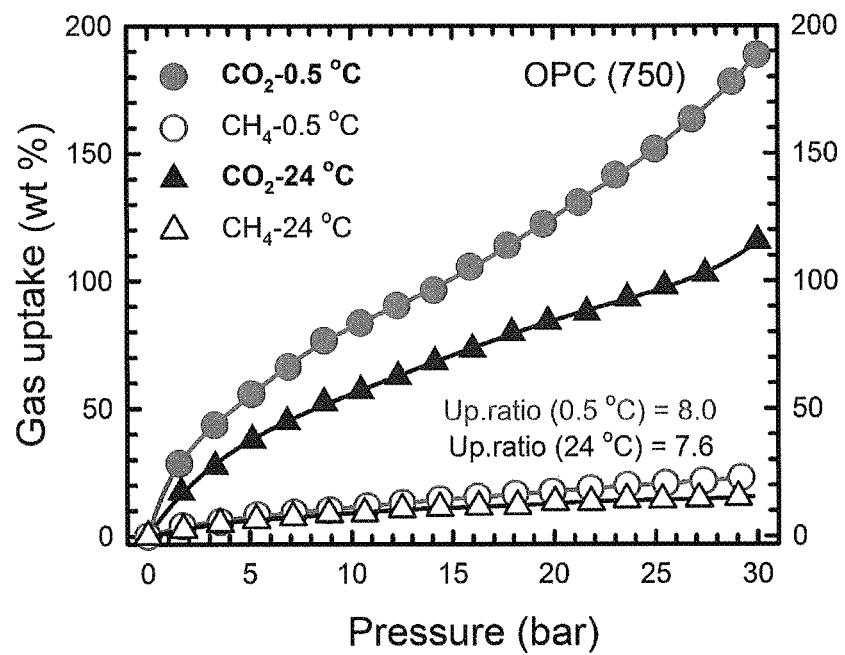
FIG. 19 provides a demonstration of optimal gas uptake selectivity of OPC samples for $CO_2$ over $CH_4$. Volumetric $CO_2$ and $CH_4$ uptake measurements on OPC (750) sorbents up to a pressure range of 30 bar at 0.5° C. and 24° C. are shown. The mass uptake ratios ($CO_2$/$CH_4$) at 30 bar for OPC (750) are 8.0 and 7.6, respectively.

For large scale gas uptake applications, such as removing $CO_2$ from natural gas, it is essential for a solid sorbent to exhibit both reproducible gas uptake capability and batch to batch reproducibility. This important requirement was examined via two experiments as shown in FIGS. 18A-18B, which displays a set of pressure dependent $CO_2$ uptake plots for different OPC$_{750}$ batches synthesized and activated same way. Almost identical gas adsorption characteristics, up to an upper pressure limit of 30 bar, confirmed the applicability of both OPC materials as cheap but very effective sorbent for industrial application. The other necessity for practical usage was further established by multiple cycles of gas adsorption-desorption measurements (2 cycles of adsorption and 2 cycles of desorption) that showed negligible or no hysteresis (FIG. 38C). Applicants' multiple cycle measurements and prolonged exposure to $CO_2$ on the same OPC sample satisfied two major requirements for practical application: no degradation in quality and no drop in gas uptake capacity.

Figure 39A:
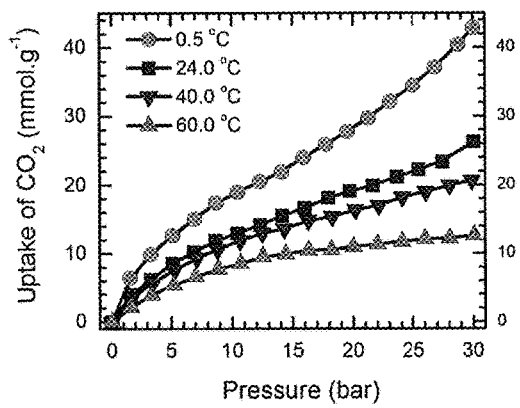
FIGS. 39A-39B show a demonstration of ultrahigh $CO_2$ uptake capability of an FFA-$OPC_{750}$ sample at low temperature.

For most of the solid sorbents, the gas uptake capacity increases with decreasing capture temperature. At 0.5° C. and a pressure of 30 bar, FFA-OPC$_{750}$ demonstrated an ultrahigh $CO_2$ uptake capacity that maxed to 189 wt % (43 mmol·g$^{-1}$) that is 60% higher than room temperature uptake (FIG. 39A). For any solid porous sorbents with high surface area, the trend of gas uptake is: the higher the gas pressure, the higher the $CO_2$ uptake and the uptake is both pressure and temperature dependent.

Figure 39B:
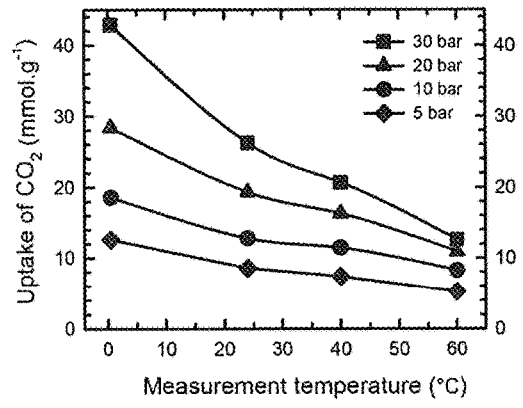
Figure 42A:
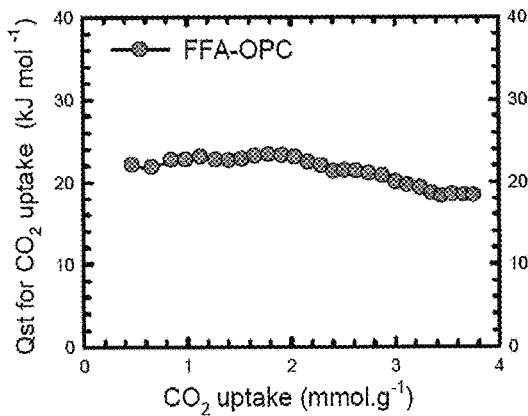
FIGS. 42A-42D show isosteric heat of gas adsorption of $CO_2$ (FIGS. 42A-B) and $CH_4$ (FIGS. 42C-D) as a function molar gas uptake for FFA-$OPC_{750}$ (FIGS. 42A and 42C) and AA-$OPC_{750}$ (FIGS. 42B and 42D).
Figure 42B:
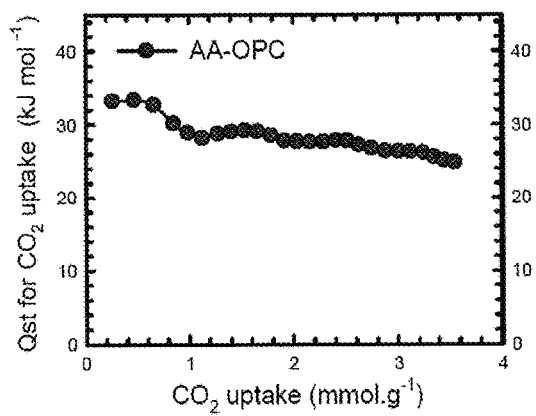
Figure 42C:
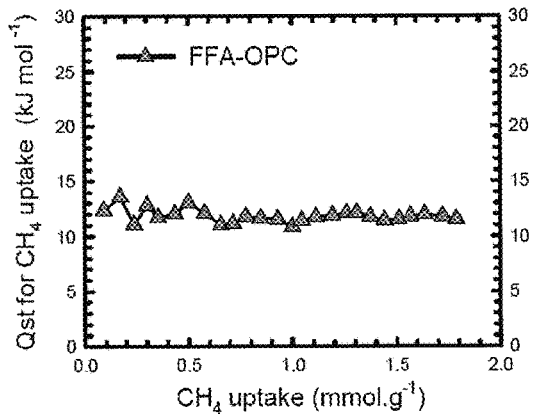
Figure 42D:
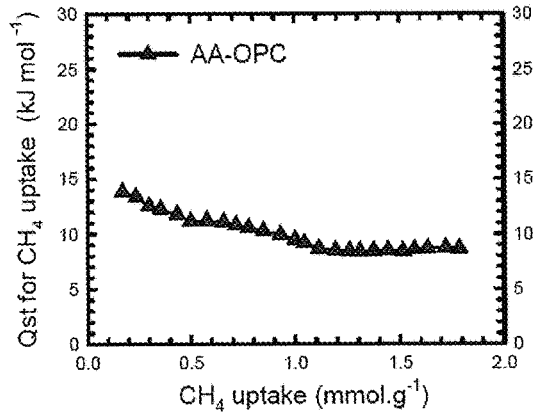

This result is further established by a set of plots describing the gas uptake capacity at four different uptake pressures as a function of experiment temperature (FIG. 39B). At a pressure of 5 bar, the $CO_2$ uptake varied from 5.2 to 12.6 mmol·g$^{-1}$ (increased by 142%) for a temperature change of 60 to 0.5° C.; whereas, at 30 bar, the change was significantly high, uptake varied from 12.6 to 42.9 mmol·g$^{-1}$ (increased by 240%). This important result signifies the possibility of selective $CO_2$ removal by exploiting the pressure-temperature dependent adsorption and desorption from a $CO_2$ rich gas mixture.

Example 3.8. $CO_2$/$CH_4$ Selectivity

The selective removal of $CO_2$ from natural gas, which essentially contains $CH_4$ and higher hydrocarbons along with other gases ($CO_2$, $H_2S$, and $N_2$), is one of the important industrial research goals, because these contaminant gases decrease power efficiency of the natural gas. The capture of $CO_2$ from natural gas primarily relies on purification strategies that allow the gas mixture to pass through a column packed with solid porous materials that captures $CO_2$ from the $CH_4$-rich environment with minimal $CH_4$ uptake. Applicants have previously shown that, unlike total $CO_2$ adsorption, the best $CH_4$:$CO_2$ adsorption ratio requires a PC with a surface area of more than 2000 m$^2$g$^{-1}$, a total pore volume of more than 1.0 cm$^3$g$^{-1}$, and a carbon content of less than 90 wt %. Based upon the forgoing, both OPC$_{750}$ materials meet these requirements. The absolute $CO_2$:$CH_4$ selectivity test was carried out by measuring volumetric $CO_2$ and $CH_4$ uptake isotherms up to a high pressure limit of 30 bar at 0.5 and 24.0° C. Applicants' study focused on the selectivity of FFA-OPC$_{750}$ and AA-OPC$_{750}$.

Two sets of volumetric $CO_2$ and $CH_4$ adsorption uptake measurements performed on each OPC$_{750}$ sorbent, at 0.5 and 24.0° C. (FIGS. 40A-40B, respectively). A similar set of room temperature uptake result for activated charcoal are presented in FIG. 40C. Here, the molar uptake selectivity ($\eta_{CO2}/\eta_{CH4}$) is defined by the molar ratio of adsorbed $CO_2$ and $CH_4$ at a certain pressure (i.e., at 30 bar).

Although the surface are and pore volumes and the $CO_2$ uptake of the two different OPC samples appear to be essentially independent of the choice of precursor (see FIGS. 29A-29B and Table 7), the same is not true of $CH_4$ uptake. As may be seen from Table 7, the $CH_4$ uptake for FFA-OPC is greater than that for AA-OPC for any given activation temperature. Given the relationship observed in FIGS. 29A-29B, this trend is also true for surface area and pore volume (FIGS. 41A-41B). Thus, even with similar physical parameters (surface area and pore volume) OPC prepared from PFFA shows greater $CH_4$ uptake than materials prepared from PAA. Although the differences are about 10%, this results in a comparable difference in $CO_2/CH_4$ selectivity, with AA-OPC samples providing better selectivity than FFA-OPC samples across the range of activation temperatures (Table 7).

Another important parameter that can be determined from FIGS. 42A-42D is the corresponding isosteric heat of adsorption of $CO_2$ and $CH_4$ for $OPC_{750}$ using the thermodynamic equations described elsewhere. In thermodynamic point of view, isosteric heat of adsorption of a gas determines the temperature change in a sorbent as a result of adsorption of adsorbate molecules to the sorbent surface and thus, it is one of the key thermodynamic parameters that can be utilized to separate this gas from a mixture of gases. The higher the difference between isosteric heats of adsorption for two gases the better will be the separation. For instance, as shown by FIGS. 42A-42D, there is a higher value for the isosteric heat of adsorption of $CO_2$ as compared $CH_4$ (Table 9), which allows Applicants to propose a temperature dependent strategy for removing $CO_2$ from natural gas via selective adsorption and desorption of $CH_4$ and $CO_2$. The results also suggest that understanding the factors controlling the difference between the values will offer a guide to the design of future adsorbents.

greater than values for SPC (2.6), reduced-NPC (2.2) and activated charcoal (1.4) and slightly higher than the recently reported asphalt Versatrol-HT derived PC (3.0). These results clearly established that among the category of activated PC materials for selective $CO_2$ capture from natural gas, $AA-OPC_{750}$ is one of the best absorbents reported so far and much lower cost relative to SPC and NPC prepared from analogous polymers.

TABLE 10

Summary of meso (>2 nm), micro (<2 nm), and narrower micropore (<1 nm) volume (V) for $OPC_{750}$ samples. Micropore volumes determined by the t-plot method. Within parentheses, % of the total pore volume is shown.

| Sample[a] | $V_{MICRO}$ (0-2 nm) ($cm^3g^{-1}$) | $V_{NARROW}$ (0-1 nm) ($cm^3g^{-1}$) | $V_i$ (1-2 nm) ($m^2g^{-1}$) | $V_{MESO}$ (2-50 nm) ($cm^3g^{-1}$) | $V_{MACRO}$ (>50 nm) ($m^2g^{-1}$) |
|---|---|---|---|---|---|
| $FFA-OPC_{750}$ | 1.10 | 0.23 (13%) | 0.87 (49%) | 0.57 (32%) | 0.10 (6%) |
| $AA-OPC_{750}$ | 1.24 | 0.12 (6%) | 1.12 (60%) | 0.58 (31%) | 0.05 (3%) |

Based upon prior work, it is known that the best $CO_2$ uptake and $CO_2/CH_4$ differentiation is obtained with a defined set of parameters involving surface area, pore volume, and carbon content. The latter has been related to the relative percentage of pores less than 2 nm. These results suggested that the way to prepare an ideal PC adsorbent is to use a pre-formed O-containing precursor, and the formation of both PFFA and PAA meets these needs. Thus, the use of a designed precursor allows for the reproducible formation of an OPC material with the required physical attributes. Furthermore, unlike NPC and SPC materials, the OPC reported herein lends to pellet formation as required for scalable processes.

In this Example, the structural features of the precursor appear to be irrelevant to the OPC that is formed when considering $CO_2$ adsorption. However, this is not true for $CH_4$ adsorption and hence $CO_2/CH_4$ selectivity. Based upon the results herein, and without being bound by theory, Applicants suggest that the identity of the precursor and the subsequent control over the pore structure is important for $CH_4$ adsorption and hence $CO_2/CH_4$ selectivity. In conclusion, Applicants propose in this Example that, while $CO_2$ uptake is optimized by maximization of pores of less than 2 nm, the $CO_2/CH_4$ selectivity requires optimization of pores in the 1-2 nm range.

TABLE 9

Isosteric heat of adsorption for $CO_2$ and $CH_4$.

| Sample | $CO_2$ (kJ $mol^{-1}$) | $CH_4$ (kJ $mol^{-1}$) |
|---|---|---|
| $FFA-OPC_{750}$ | 23 | 13 |
| $AA-OPC_{750}$ | 33 | 14 |

Applicants have previously reported that with regard to $CO_2$ uptake, the relative distribution of pores within defined ranges defined performance. The micro- and meso-porosity analysis of these samples was determined by the t-plot method and revealed pore volume dependencies on KOH amounts (Table 10). The absolute volumes and percentage of total pore volume for $OPC_{750}$ samples as a function of the $CO_2/CH_4$ selectivity suggest that Applicants' previous proposal is correct. The greater the relative percentage of pores less than 2 nm, the greater the $CO_2$ uptake is in line with previous suggestions. However, the comparison of $FFA-OPC_{750}$ and $AA-OPC_{750}$ provides further insight into Applicants' previous proposal that it was pores in the range of 1-2 nm that are most important in defining $CO_2/CH_4$ selectivity.

In order to recognize the PC sorbent with the highest $CO_2/CH_4$ selectivity, Applicants surveyed molar selectivity (at 30 bar) of recently explored PC sorbents such as SPC, NPC and activated charcoal and $AA-OPC_{750}$. The absolute molar ($CO_2/CH_4$) uptake selectivity of $OPC_{750}$ (3.05) is Example 4. The Effect of KOH Concentration in Chemical Activation of Porous Carbon Sorbents for Carbon Dioxide Uptake and Carbon Dioxide-Methane Selectivity: The Relative Formation of Micro (<2 nm) Versus Meso (>2 nm) Porosity In this Example, Applicants demonstrate that PC sorbents are synthesized from polymer precursors mixed with a chemical activation reagent and pyrolyzed (>500° C.). KOH is known to be the best activator for a wide range of precursors, as it creates PCs with a large surface area (1200-4000 $m^2g^{-1}$). In order to determine the optimum KOH:polymer ratio for both $CO_2$ adsorption and $CO_2/CH_4$ selectivity, Applicants prepared a set of five S-containing porous carbon (SPC) samples from polythiophene (PTh) with increasing KOH:PTh ratio (1 to 5), and investigated $CO_2$ and $CH_4$ uptake measurements on carbonaceous SPC samples up to a pressure limit of 30 bar. The SPCs have been characterized by XPS, SEM, TEM and BET surface area analysis.

Although the apparent surface area and total pore volume increased with increasing KOH concentration, the maximum $CO_2$ uptake (5-30 bar) was demonstrated for samples with KOH:PTh=3. This equates to SPC samples with a surface area and total pore volume of ~2700 $m^2g^{-1}$ and 1.5 $cm^3g^{-1}$, respectively. Greater values for either parameter do not enhance the $CO_2$ uptake, showing that it is not total porosity that is important. SPC samples formed with KOH:PTh=3 show both a maximum C composition (85%), and a maximum fraction of micro (<2 nm) porosity with a concomitant decrease in meso-pores (>2 nm). KOH:PTh=3 is also the synthetic conditions to maximize $CH_4$ uptake (5-30 bar). However, the optimum $CO_2/CH_4$ selectivity occurred with KOH:PTh=2. This correlates with different surface area (2,200 $m^2g^{-1}$) and total pore volume (1.2 $cm^3g^{-1}$) that required for optimum $CO_2$ uptake.

These results suggest that process conditions that lead to high relative micro porosity need to be considered rather than total surface area or pore volume. These results also suggest that, besides surface area and total pore volume of a particular sample, the relative composition of meso and micro porosity is the defining structural feature for optimizing $CO_2$ uptake.

Example 4.1. Materials and Methods $FeCl_3$, 2-thiophenemethanol (purchased from Sigma Aldrich, 98% purity), $CH_3CN$, powdered KOH, distilled water, acetone, HCl, Ar (99.9% pure), $CO_2$ (99.99% pure, Matheson TRIGAS) and $CH_4$ (99.9% pure) were used as supplied. Polymer precursors and SPC materials were characterized by X-ray photoelectron spectroscopy (XPS), Fourier transform infrared spectroscopy (FTIR), scanning electron microscopy (SEM), high resolution transmission electron microscopy (HRTEM) and BET surface area analysis. The XPS measurements were carried out in a PHI Quantera scanning XPS microprobe. The wt % of chemical elements was determined by XPS survey scans with pass energy of 140 eV. For detailed elemental analysis, high-resolution multi-cycle elemental scans with pass energy 26 eV was performed. Each spectrum was then deconvoluted by appropriate basis functions. Before spectral fitting, each spectrum was corrected for reference binding energy for C1s to 284.8 eV. FTIR spectral measurements were performed in a Nicolet FTIR Infrared Microscope equipped with a liquid $N_2$ cooled detector. Scanning electron microscopic images were obtained by a FEI Quanta 400 ESEM FEG high-resolution field emission scanning electron microscope. The high-resolution TEM images of activated SPCs were obtained by a JEOL 2100 field emission gun transmission electron microscope.

The textural properties (i.e., surface areas, distributions of pore volumes and total pore volume) of carbonaceous materials were obtained by analyzing $N_2$ sorption isotherms (measured at 77 K), measured in a Quantachrome Autosorb-3b BET Surface Analyzer. Before measurements, samples were dried at 130° C. for 6 hours under high vacuum system equipped with a liquid $N_2$ cold trap. The apparent BET surface area ($S_{BET}$) was calculated from $N_2$ adsorption isotherms in the partial pressure (P/P0) range of 0.05-0.30 by the multipoint BET (Brunauer-Emmett-Teller) method. The total pore volume was estimated from the amount of adsorbed $N_2$ at $P/P_0=0.99$. The distributions of pore volumes were determined by analyzing the data via non-local density functional theory. Pore volumes and surface area of micropores were determined by analyzing $N_2$ isotherms by t-plot method. Results are given in Table 11.

TABLE 11

Summary of PC and SPC samples studied with their elemental analysis, physical properties, and $CO_2$ uptakes.

| Sample[a] | C (wt %)[b] | O (wt %)[b] | S (wt %)[b] | Surface area $S_{BET}$ ($m^2g^{-1}$) | Total pore volume $V_P$ ($cm^3g^{-1}$) | $CO_2$ uptake at 30 bar (mmol·$g^{-1}$) | $CO_2$ uptake at 30 bar (mg·$g^{-1}$) |
|---|---|---|---|---|---|---|---|
| Act. charcoal[c] | 94.10 | 5.90 | 0.00 | 845 | 0.47 | 8.45 | 372 |
| BPL[d] | 91.30 | 8.70 | 0.00 | 951 | 0.53 | 8.66 | 381 |
| SPC-1 | 76.96 | 14.30 | 8.74 | 1680 | 0.98 | 14.68 | 646 |
| SPC-2 | 78.89 | 13.73 | 7.37 | 2180 | 1.22 | 19.18 | 844 |
| SPC-3 | 85.53 | 13.70 | 0.77 | 2675 | 1.51 | 22.64 | 996 |
| SPC-4 | 84.63 | 15.37 | 0.00 | 2860 | 1.66 | 21.82 | 960 |
| SPC-5 | 84.38 | 15.62 | 0.00 | 2980 | 1.76 | 21.29 | 937 |
| PTh | 61.45 | 5.39 | 29.49 | 40 | 0.02 | 2.40 | 106 |

[a]PC-KOH:precursor ratio. All SPC samples were activated at 700° C.
[b]Determined by XPS.
[c]Purchased from Mallinckrodt chemical works.
[d]Purchased from Calgon carbon corp. Total pore volumes are measured at $P/P_0$ ~0.99.z

Example 4.2. Synthesis of S-Containing Polymer Precursor (PTh)

The polymer precursor was prepared by a modification of previously reported protocols. A solution of 2-thiophenemethanol (5 g, Sigma Aldrich, 98% purity) mixed with $CH_3CN$ (20 mL) was slowly added to a solution of $FeCl_3$ (25 g) in $CH_3CN$ (200 mL). The mixture was stirred for 2 hours under continuous Ar purging. The brown polythiophene (PTh) was separated by filtration, washed with DI water (4 L) and acetone (1 L), and dried at 60° C. for 12 hours under vacuum (Yield=98%).

Example 4.3. Conversion of PTh to S-Containing Porous Carbon (SPC)

In a typical activation process, PTh (500 mg) was thoroughly mixed with KOH powder (crushed previously, with KOH:PTh weight ratio varying from 1 to 5) in a mortar for 10 minutes. The mixture was then placed inside a quartz tube/tube furnace, dried for 10 minutes and then heated for 1 hour at a stable temperature of 700° C., under a flow of Ar (99.9%, flow rate 600 sccm). The activated samples were then washed with DI water, HCl (100 mL, 1.4 M) to remove excess inorganic salt residue and DI water until the filtrate attained pH=7. The product was dried at 80° C. for 12 hours under vacuum.

Example 4.4. $CO_2$ and $CH_4$ Uptake Measurements

The volumetric uptake measurements (pressure dependent excess isotherms) of $CO_2$ and $CH_4$ were performed in an automated Sievert instrument (Setaram PCTPRO). Various OPC samples were first crushed into powders and packed in a stainless steel autoclave sample cell. Initial sample pre-treatment was carried out at 130° C. for 1.5 hours under high vacuum. The free volume inside the sample cell was determined by a series of calibration procedures done under helium. Gas uptake experiments were carried out with high purity research grade $CO_2$ (99.99% purity, Matheson TRIGAS) and $CH_4$ (99.9% purity). A summary of selected results is given in Table 11.

Example 4.5. Results and Discussion

The polymer precursor Applicants selected for the synthesis of activated sulfur containing porous carbon (SPC) sorbents is poly[2-thiophenemethanol] (PTh) synthesized by reacting with $FeCl_3$ following the protocol reported elsewhere. This polymer was further activated by a strong oxidant, KOH, at a fixed temperature under inert atmosphere.

In general, the optimization procedure for synthesis of a PC sorbent with high surface area, from a polymer precursor activated by KOH, depends on two major parameters: finding the right KOH to PTh weight ratio; and the identification of the correct temperature of activation that gave satisfactory porosity and yield. Earlier reports suggest that the porosity of a SPC sorbent increased with activation temperature. However, a final yield of the activated product decreased significantly with activation temperature above 700° C. Additionally, previous reports suggest that the overall porosity and the surface area of a chemically activated PC material increase with KOH concentration.

Therefore, Applicants synthesized a set of SPC samples activated at a fixed activation temperature with gradually increasing KOH:PTh ratio r, where r varies from 1 to 5. These samples are labelled by SPC-r (Table 11).

Figure 43A:
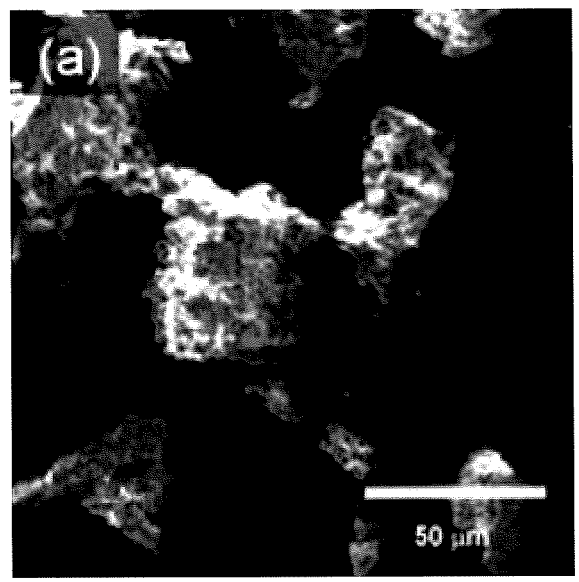
FIGS. 43A-43B show SEM images of the polymer precursor (PTh) (FIG. 43A) and a SPC-2 sample (FIG. 43B).
Figure 43B:
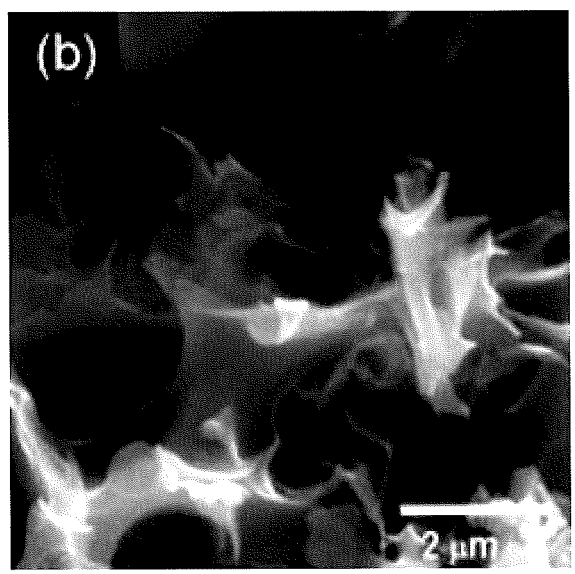

The structural and textural morphology of synthesized PTh and activated SPC samples were characterized by scanning electron microscopy (SEM). The precursor demonstrated more rigid rock like blunt texture (FIG. 43A), while the SEM image of a SPC-2 sample (FIG. 43B) exhibits a texture full of micron size holes, multiple corners and edges that are absent in the precursor. The energy dispersive X-ray spectroscopy (EDS) confirmed that the SPCs are primarily composed of carbon, oxygen and sulfur.

Example 4.6. $CO_2$ Uptake

Figure 44:
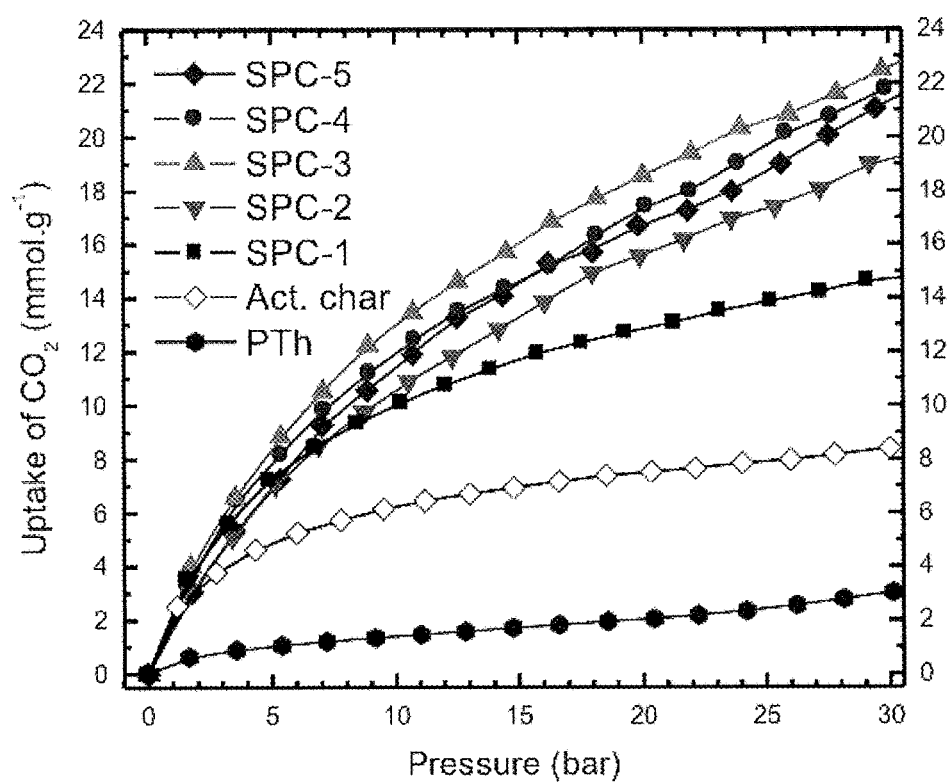
FIG. 44 shows high pressure volumetric $CO_2$ uptake as a function of $CO_2$ pressure on PTh, activated charcoal and activated SPC-700-R samples activated at 700° C. with increasing KOH:PTh weight ratio (r) where r varies from 1 to 5. Experiments were performed at 24° C.

The volumetric $CO_2$ excess uptake (mmol of adsorbed $CO_2$ per g of sample) measurements for the SPC sorbent specimens activated at 700° C. with different KOH:PTh weight ratio are shown in FIG. 44 as a function of adsorbate pressure for the labelled SPC specimens, PTh and commercial charcoal powders (Mallinckrodt Chemical Works). In this set of isotherms, the C-precursor PTh adsorbed the least amount of $CO_2$ and the SPC-1 specimen demonstrated twice as much $CO_2$ adsorption as activated charcoal at 30 bar.

Figure 45:
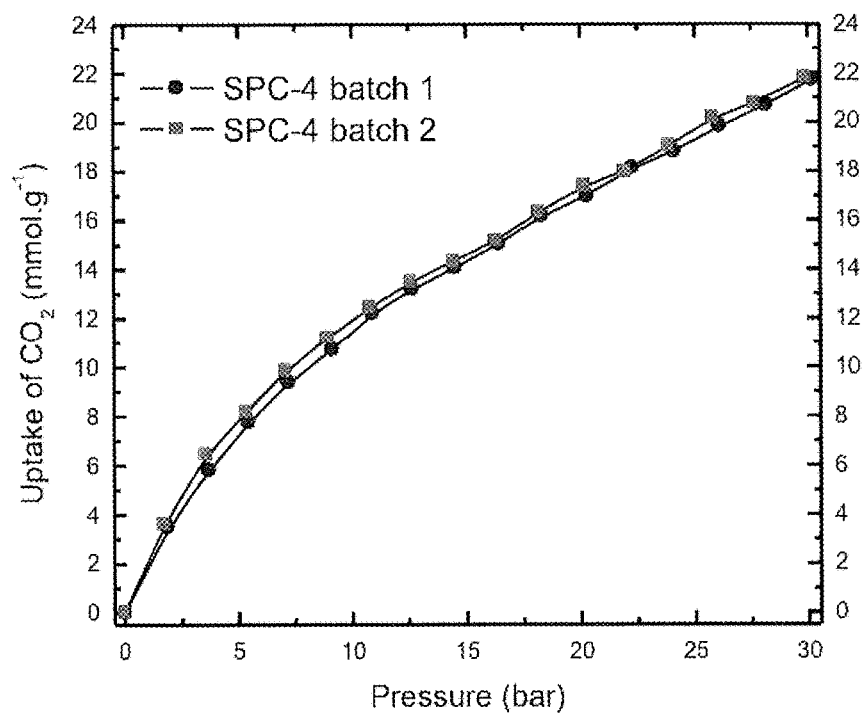
FIG. 45 shows high pressure volumetric $CO_2$ uptake as a function of $CO_2$ pressure for two batches of SPC-4 activated at 700° C. Uptake measurements were performed at 24° C.

The difference in the shape of uptake isotherms confirms that gas uptake strongly depends on the KOH:PTh weight ratio (r). In particular, higher values of r correlate with higher uptake amounts for a specific adsorbate pressure (>12 bar up to r=3). Moreover, the SPC-4 and SPC-5 samples captured less $CO_2$ than SPC-3. The reproducibility of both the synthesis and the measurements is shown by a comparison of the volumetric $CO_2$ excess uptake of two batches of SPC-4 (FIG. 45).

Figure 46:
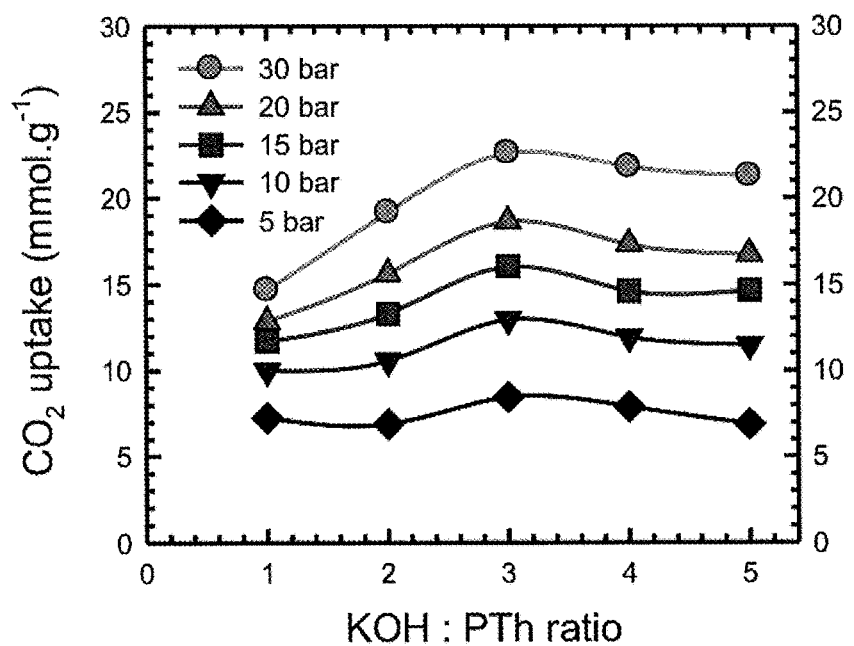
FIG. 46 shows dependence of $CO_2$ uptake at the labelled pressure on the KOH:PTh ratio for activated SPC-r samples activated at 700° C. Experiments were performed at 24° C.

Additional information for the dependence of gas uptake amounts at a specific pressure on the KOH:PTh weight ratio is presented by FIG. 46. The $CO_2$ capturing capacity increased from r=1 to 3 and then decreased again at higher r values. Previous low pressure studies (1 bar) results for KOH activation of petroleum coke show that KOH ratio of 3 and 4 show similar results.

Figure 47A:
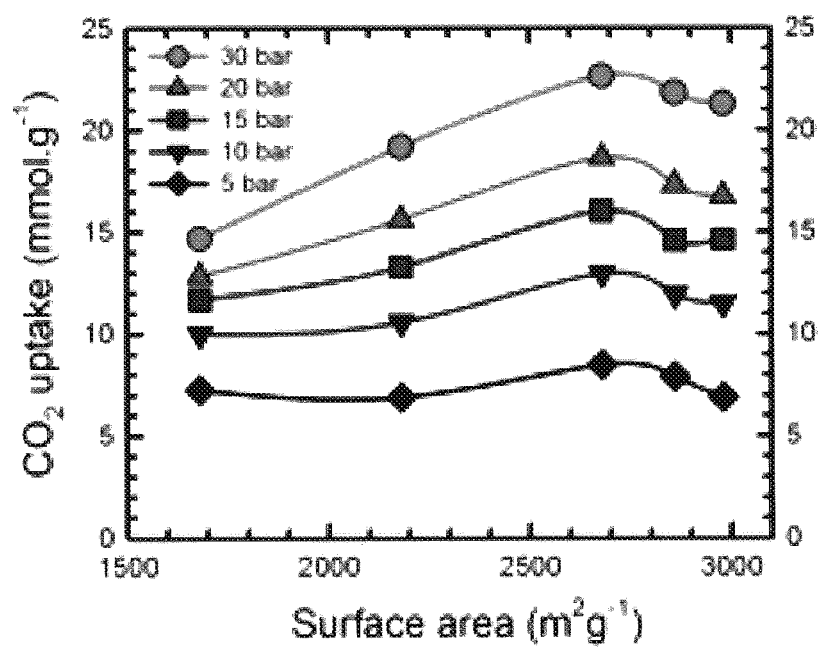
FIGS. 47A-47B show dependence of $CO_2$ uptake at the labelled pressure on surface area (FIG. 47A) and total pore volume (FIG. 47B). SPC samples were synthesized from PTh by activating at 700° C. with different KOH amounts. Experiments were performed at 24° C.
Figure 47B:
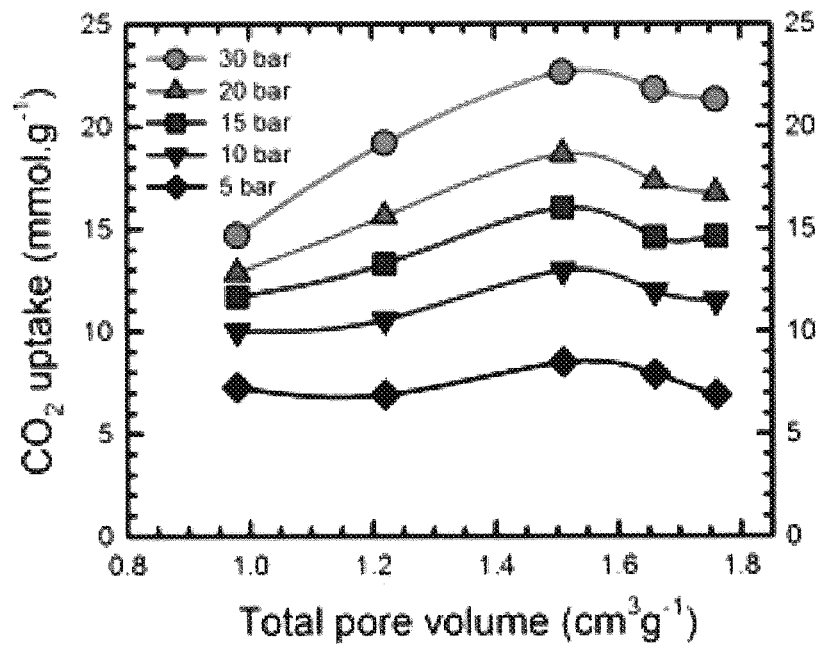

Decreased uptake for SPC-4 and SPC-5 would have been expected to be a consequence of decreased surface area and/or pore volume. However, as seen from FIGS. 47A-47B, such expectation is not true. Instead, above a surface area value of 2675 $m^2g^{-1}$ and total pore volume of 1.51 $cm^3g^{-1}$, the gas uptake began to drop. This indicates that there are other factors besides surface area and pore volume that influence the $CO_2$ uptake capacity of a specific SPC sample.

The chemical composition of the SPCs activated with different amounts of KOH was determined by X-ray photoelectron spectroscopy (XPS) and compared with PTh and commercial activated carbons. Applicants note that XPS only provides surface (and near surface) chemical composition that may differ from bulk chemical composition. However, surface composition is what matters in a surface adsorption process.

Figure 48A:
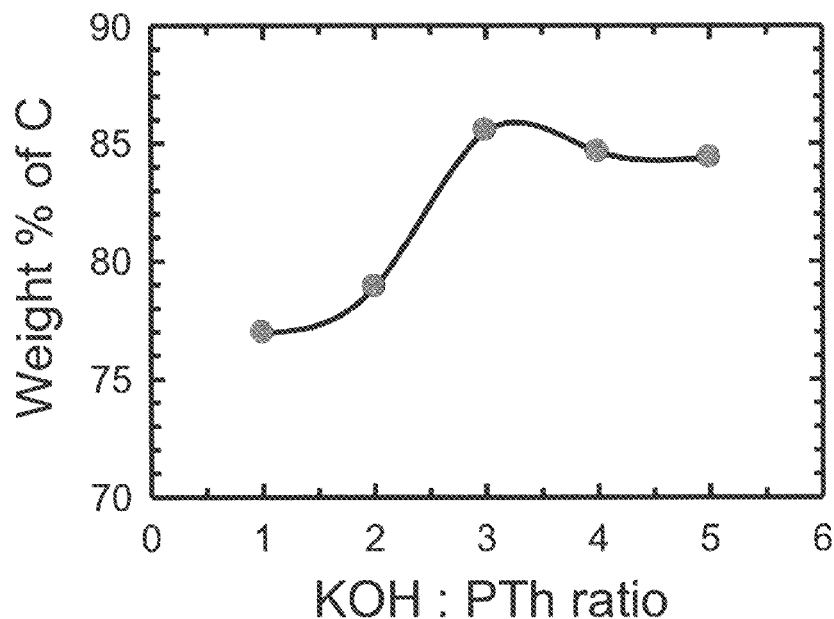
FIGS. 48A-48B show chemical composition of the activated SPC samples by XPS spectroscopy showing the wt % of elemental carbon (FIG. 48A) and oxygen and sulfur (FIG. 48B) versus KOH:PTh ratio.
Figure 48B:
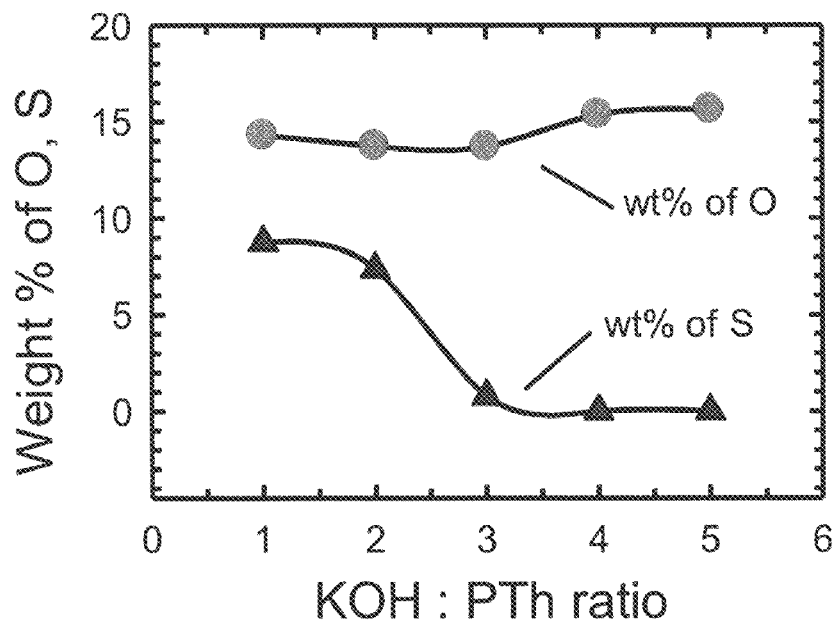

It should also be noted that the H content is not provided by XPS data. Therefore, percentage values measured by other techniques will vary. The wt % of elements present as determined by XPS survey scans is presented in Table 11. The PTh and consequently the SPC-r samples were primarily composed of C, O, and S and chemical activation by increasing amount KOH gradually changed wt % of all three elements. FIGS. 48A-48B depict these changes.

Figure 49:
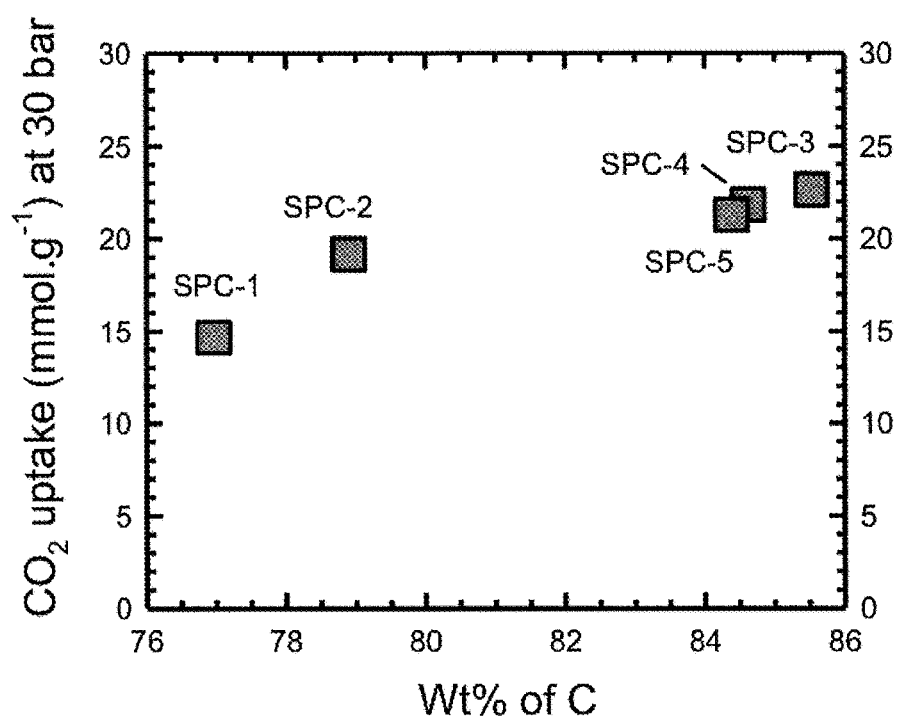
FIG. 49 shows dependence of $CO_2$ uptake at the activated SPC samples as a function of carbon composition as determined XPS spectroscopy.

Applicants have previously determined that for a wide range of PCs, the maximum $CO_2$ uptake occurs when the C composition (as determined by XPS) is in the range 80-95 wt %. In this Example, this range may be further specified as being more than 85%. However, the most important observation is that the trend observed in FIGS. 48A-48B is essentially the same as in FIG. 46. In particular, as indicated in FIG. 49, the $CO_2$ uptake increases with percentage of carbon content rather than the expected relationship with surface area or pore volume.

By consideration of the change in S content with increasing KOH:PTh ratio, it is clear that the loss of the majority of S correlates with the formation of PC samples with the highest $CO_2$ uptake (e.g., comparison between FIGS. 46 and 48B). However, replacement of S with O (at high KOH:PTh ratios) decreases the $CO_2$ uptake. Clearly, there is some significant physical change that occurs in these two regimes. In order to determine if there are distinct structural features that are associated with the C % and hence $CO_2$ uptake, Applicants have determined the pore structure changes that occur with KOH:PTh ratio.

Figure 50:
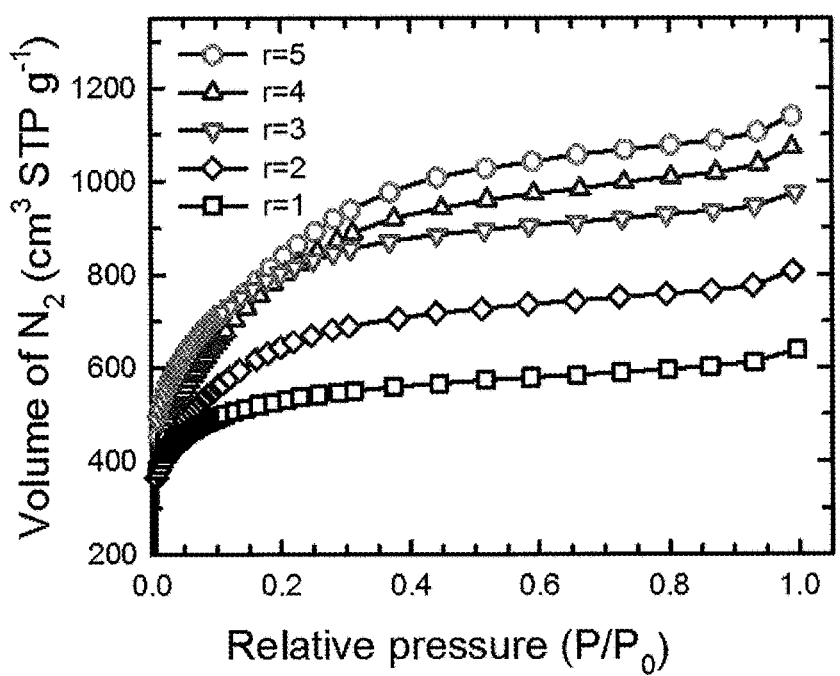
FIG. 50 shows $N_2$ adsorption isotherms (measured at 77 K) for five different SPC samples activated at 700° C. with KOH:PTh ratios varied from 1 to 5.

The surface area, total pore volume and pore size distribution of SPC samples activated with different KOH:PTh ratios were determined by measuring low temperature (77 K) $N_2$ adsorption isotherms in a BET (Brunauer-Emmett-Teller) surface area analyzer. FIG. 50 shows such set of isotherms for five SPC-r samples activated at 700° C. Here, KOH:PTh ratio dependent differences in the shape of these isotherms was noticed. The isotherms for SPC-3 to SPC-5 are much steeper than SPC-1 or SPC-2 in the relative pressure range 0.05-0.3, defining rapid increase of surface area and adsorption capacity with higher amount of KOH.

Figure 51A:
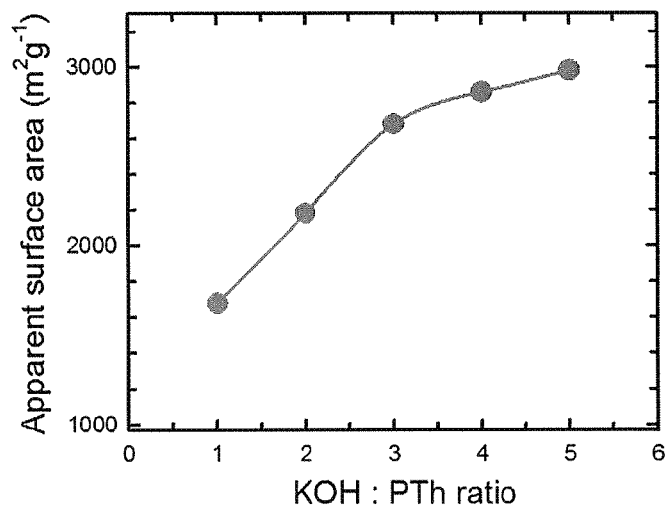
FIGS. 51A-51B show estimated surface area (FIG. 51A) and total pore volume (FIG. 51B) versus KOH:PTh ratio for five different SPC samples activated at 700° C.

The estimated surface area ($S_{BET}$) and the total pore volume ($V_p$) gradually increased with activation temperature (FIGS. 51A and 51B, respectively), describing the incremental trend for mildly to strongly activation conditions. As expected, the surface area increases with increased KOH:PTh ratio, although there is a change in the relationship above KOH:PTh=3. A similar trend is observed for the total pore volume (FIG. 51B), and the two show a near linear relationship. These demonstrate the strong influence of KOH on the porous properties of activated samples.

Figure 52:
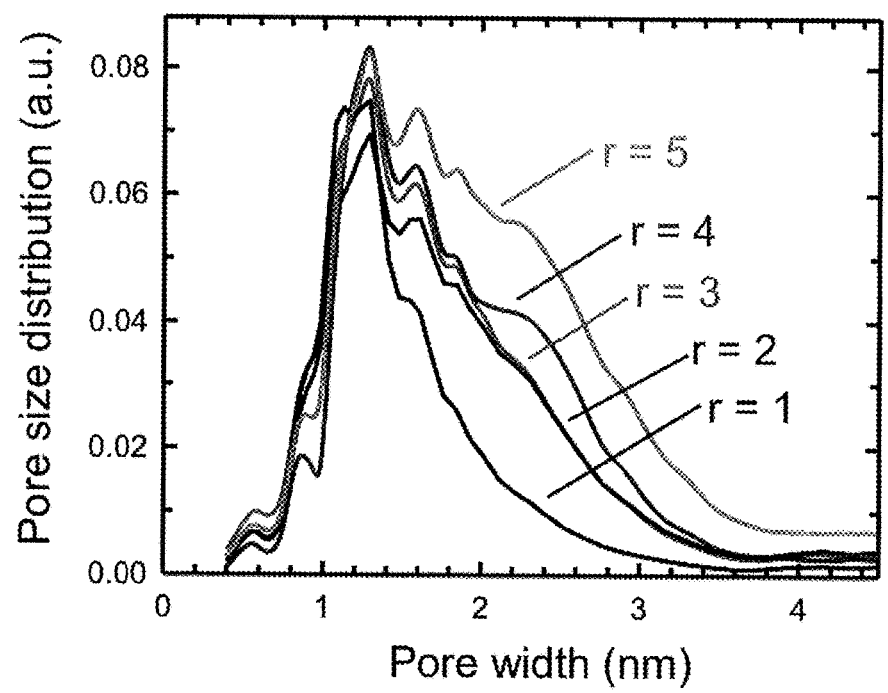
FIG. 52 shows pore size distributions for the samples in FIGS. 51A-51B.

One key piece of information that can be obtained from the BET surface area analysis is the pore size distributions as a function of pore sizes of a specific porous solid. FIG. 52 plots pore size distribution as a function of pore size for a set of five SPCs activated with mild (KOH:PTh=1) to strong (KOH:PTh=5) activation conditions. These plots show that SPC-1 sample primarily contains pores narrower than ~2 nm. As the KOH amount increases, wider pores began to form as evidenced by the PSD plot for SPC-2.

Figure 53:
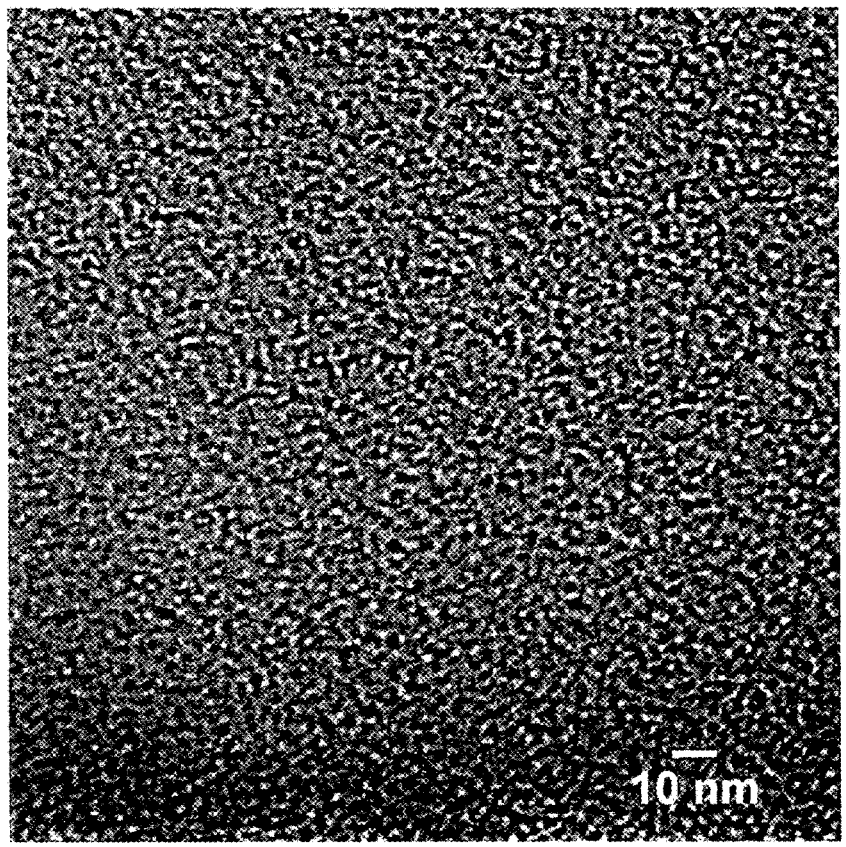
FIG. 53 shows a high resolution transmission microscope (HRTEM) image of a SPC-2 sample. Scale bar=10 nm.

Samples activated with minimal amount of KOH (i.e., SPC-1) contained pores in the range of 1-3 nm. In contrast, the distribution plots for SPC-4 and SPC-5 indicate that chemical activation with large amounts of KOH created some additional mesopores in the 3-4.5 nm range. The SPC-5 sample even contained pores larger than 4 nm. Confirmation of the pore sizes is obtained from high resolution transmission electron microscopy (HRTEM). For example, FIG. 53 displays an image of SPC-2, demonstrating randomly distributed micropores with dimension in the range of 1-2 nm.

Figure 51B:
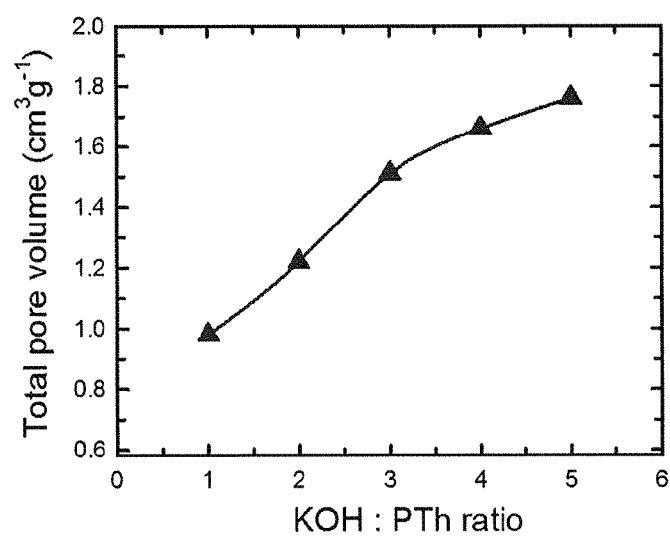

It is clear from FIG. 51B that total pore volumes (sum of pore volumes of narrower micro (<1 nm), micro, meso and macro-sized pores) systematically increase with KOH:PTh ratio. In addition, volume change behaves differently for different sizes of pores. The micro- and meso-porosity analysis of these samples was determined by the t-plot method and revealed pore volume dependencies on KOH amounts (Table 12).

Figure 54A:
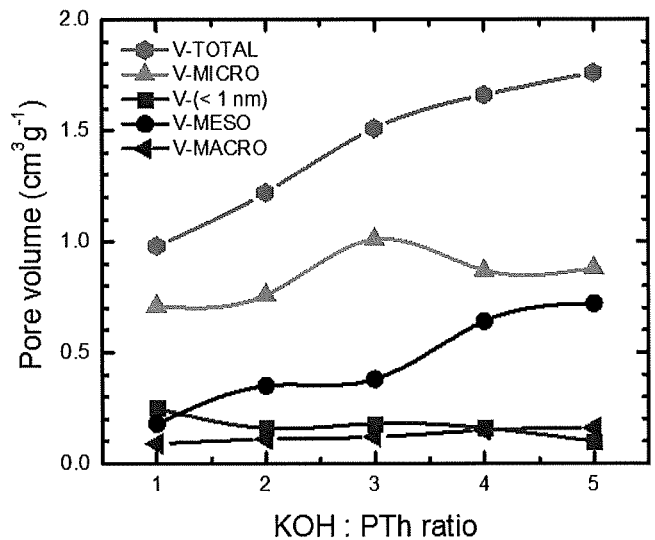
FIGS. 54A-54B show the total pore volume, volume of macropores (>50 nm), mesopores (>2 nm), micropores (<2 nm), and narrower micropores (<1 nm) as a function of KOH:PTH ratio (FIG. 54A), and percentages of total pore volumes for micropores, narrower micropores and mesopores versus KOH:PTH ratio (FIG. 54B).
Figure 54B:
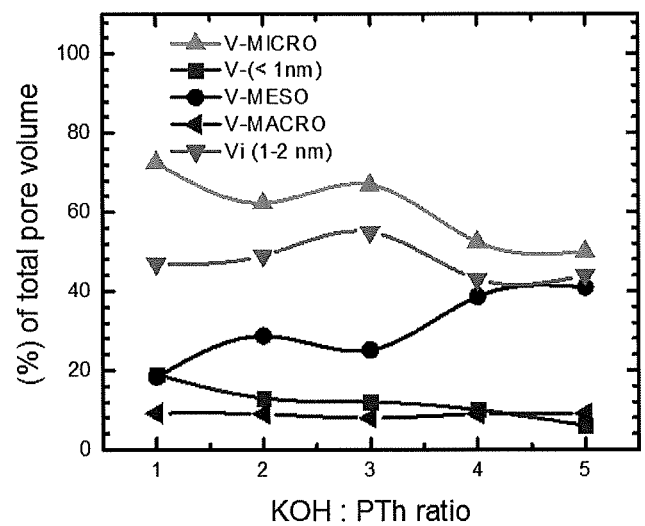

FIGS. 54A-54B depict absolute volumes and percentage of total pore volume for a set of five SPC samples as a function of the KOH:PTh ratio. In contrast to total pore volumes (FIG. 51B), the relative pore composition of micropores (defined as <2 nm) shows a marked increase with increased KOH:PTh ratio until SPC-3, above which the fraction of the total pore volume associated with these size regimes decreases (FIG. 54A). The mesopore composition shows the obverse trend. Interestingly, the micropore volumes show the strongest dependence on KOH.

TABLE 12

Summary of meso (>2 nm), micro (<2 nm), and narrower micropore (<1 nm) volume (V) for PC and SPC samples studied . . .

| Sample[a] | $V_{MICRO}$ (0-2 nm) ($cm^3g^{-1}$) | $V_{NARROW}$ (0-1 nm) ($cm^3g^{-1}$) | Vi (1-2 nm) ($m^2g^{-1}$) | $V_{MESO}$ (2-50 nm) ($cm^3g^{-1}$) | $V_{MACRO}$ (>50 nm) ($m^2g^{-1}$) |
|---|---|---|---|---|---|
| Act. Charcoal[b] | 0.32 | 0.11 (23%) | 0.21 (45%) | 0.11 (24%) | 0.04 (8%) |
| BPL[c] | 0.38 | 0.13 (25%) | 0.25 (47%) | 0.12 (23%) | 0.03 (5%) |
| SPC-1 | 0.71 | 0.19 (19%) | 0.52 (54%) | 0.18 (18%) | 0.09 (9%) |
| SPC-2 | 0.76 | 0.16 (13%) | 0.60 (49%) | 0.35 (29%) | 0.11 (9%) |
| SPC-3 | 1.01 | 0.18 (12%) | 0.83 (55%) | 0.38 (25%) | 0.12 (8%) |
| SPC-4 | 0.87 | 0.16 (10%) | 0.71 (43%) | 0.64 (38%) | 0.15 (9%) |
| SPC-5 | 0.88 | 0.10 (6%) | 0.78 (44%) | 0.72 (41%) | 0.16 (9%) |

[a]PC-KOH:precursor ratio. All SPC samples were activated at 700° C.
[b]Purchased from Mallinckrodt chemical works.
[c]Purchased from Calgon carbon corp. Micropore volumes are determined by t-plot method. Micropores include pores between 0.4 to 2 nm. Within parentheses, % of total pore volumes is shown.

Figure 55A:
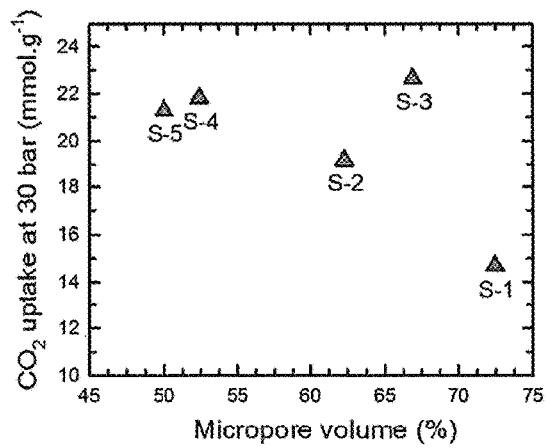
FIGS. 55A-55C show percentages of pore volumes for micropores, narrower micropores and mesopores versus $CO_2$ uptake.
Figure 55B:
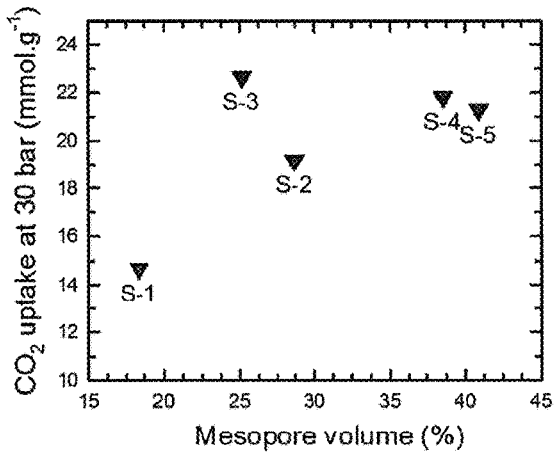
Figure 55C:
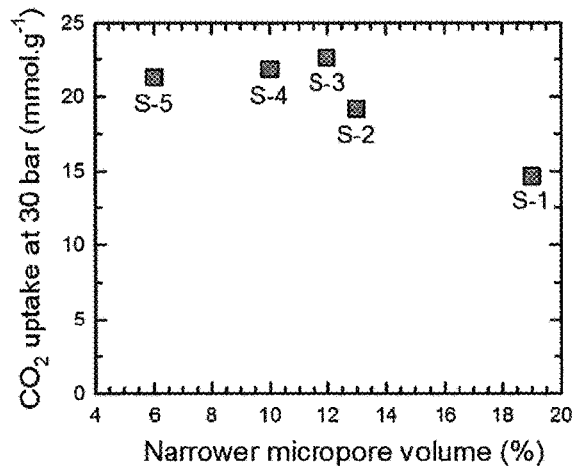

The relationship between relative composition of the various pore sizes and the $CO_2$ uptake is shown in FIGS. 55A-55C. This clearly shows that, in order to maximize $CO_2$ uptake, activation conditions (in this case KOH:PTh ratio) should be chosen to maximize the relative narrower micro and micro pores (especially those between 1-2 nm) rather than requiring solely on ever increasing surface area or pore volume.

A comparison of FIG. 54B with FIG. 48A suggests that narrower micropore formation is associated with the increased C content. However, mesopore formation appears to be controlled by increased O content. Previous work with carbide-derived carbons (CDCs) and PCs (at 1 bar) suggests that it is the pore volume less than 1 nm that is important. In contrast, it has also been suggested that mesopores (>2 nm) are the most important. There has also been a proposal that the important sizes depend on the pressure used. Applicants' results clearly show that, at higher pressures (>10 bar) it is a larger set (1-2 nm) that is controlling $CO_2$ uptake.

Example 4.7. $CO_2/CH_4$ Selectivity

The selective removal of $CO_2$ from natural gas, which essentially contains $CH_4$ and other gases such as $CO_2$, $H_2S$, and $N_2$, is one of the important industrial research goals, because these contaminant gases decrease power efficiency of the natural gas. Thus, Applicants have been directed to explore selective $CO_2$ capture capacity of different carbon-based porous sorbents at different gas pressure and temperature. For an ideal sorbent for selective removal of $CO_2$ from natural gas, the sorbent should demonstrate significantly lower $CH_4$ uptake than $CO_2$. In order to compare high pressure $CH_4$ uptake capacities of five SPC samples with their $CO_2$ uptakes, Applicants measured room temperature volumetric $CH_4$ uptake of same set of samples under similar condition.

Figure 56:
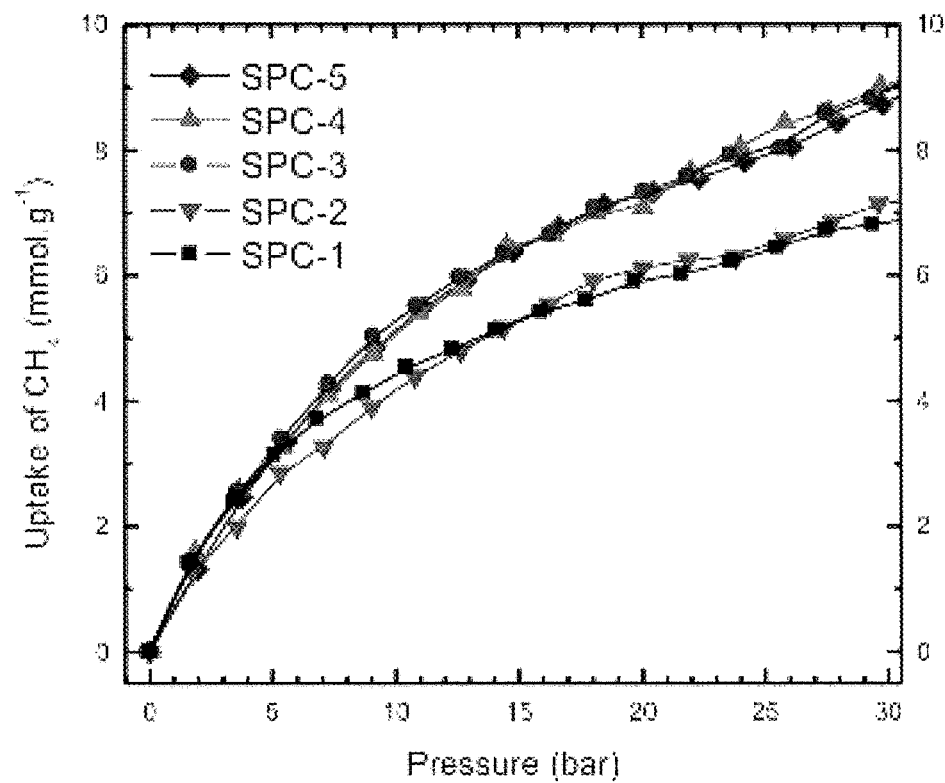
FIG. 56 shows high pressure volumetric $CH_4$ uptake as a function of $CH_4$ pressure on activated SPC-700-R samples activated at 700° C. with increasing KOH:PTh ratio (r) where r varies from 1 to 5. Experiments were performed at 24° C.
Figure 57:
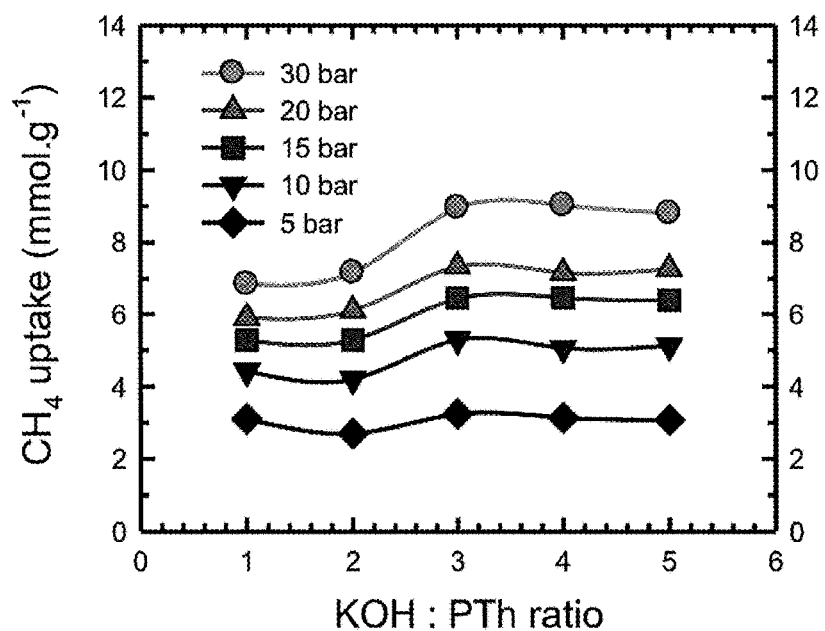
FIG. 57 shows dependence of $CH_4$ uptake at labeled pressure on KOH:PTh ratios for activated SPC samples. Experiments were performed at 24° C.

FIG. 56 represents a set of such uptake isotherms. In contrast to $CO_2$ uptake isotherms, Applicants see two distinct sets of isotherms. One set comprises SPC-1 and SPC-2 and the other for SPC-3, 4, and 5. This feature is further demonstrated by a set of plots showing dependence of $CH_4$ uptake on the KOH:PTh weight ratio of the corresponding sorbent at a specific capture pressure (FIG. 57). For example, at 30 bar, there was negligible difference in $CH_4$ uptakes of all three samples SPC-3 to 5 (~9 mmol·$g^{-1}$), suggesting that the amount of KOH had much weaker effect on the $CH_4$ uptake property relative to than $CO_2$ uptake, though surface area and porosity had changed significantly.

Figure 58A:
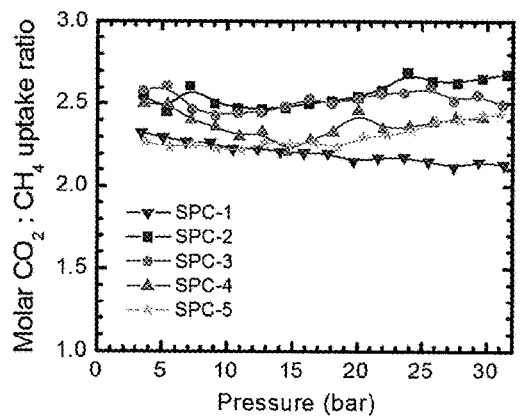
FIGS. 58A-58D show various data related to SPC samples.
Figure 58B:
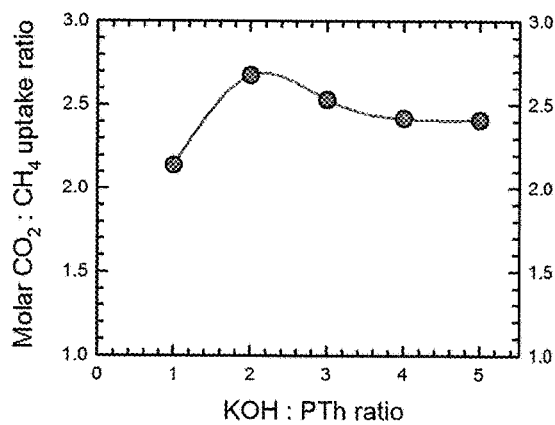
Figure 58C:
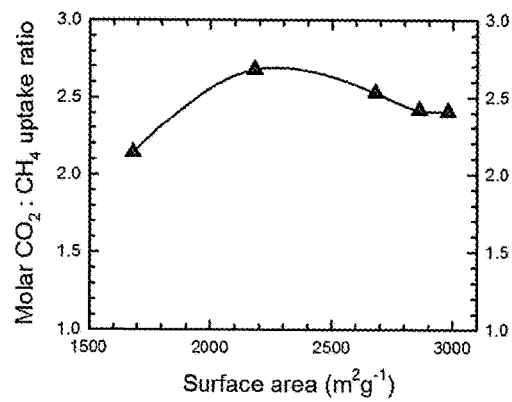
Figure 58D:
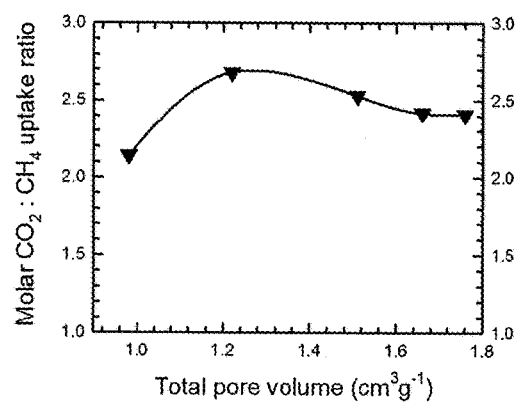

The molar uptake selectivity (molar $CO_2$:$CH_4$ uptake ratio) for the SPC samples as a function of gas pressure is shown in FIG. 58A. The selectivity traces for SPC-1 to SPC-3 varied smoothly between 10 to 30 bar. The dependence of high pressure selectivity at 30 bar on the KOH:PTh ratios, surface area and total pore volume of the corresponding SPCs are presented in FIGS. 58B-58D, respectively. Surprisingly, the SPC-2 sample (with surface area=2180 $m^2g^{-1}$ and total pore volume=1.22 $cm^3g^{-1}$) demonstrated highest molar selectivity (2.68) at 30 bar, though SPC-3 exhibited the highest $CO_2$ uptake.

The shift from KOH:PTh ratio of 3 to 2 for optimum selectivity as opposed to uptake for both $CO_2$ and $CH_4$ is due to the relative shape of the uptake as a function of reagent ratios (e.g., comparison of FIGS. 46 and 57). While the $CO_2$ uptake increased uniformly with KOH:PTh ratio from 1 to 3, that for $CH_4$ is a step function. This suggests that, in determining optimum selectivity, it is important to understand the variations between $CO_2$ and $CH_4$ adsorption rather than the maximum for both.

Applicants' prior work has demonstrated that the best $CO_2$ uptake and $CO_2$/$CH_4$ differentiation is obtained with a defined set of parameters involving surface area, pore volume, and carbon content which are in turn a function of the polymer precursor and the process activation temperature. In this Example, Applicants extend this work and demonstrate that there is an optimum KOH:PTh ratio for activation of the SPC. The ratio for optimum $CO_2$ (and $CH_4$ uptake) is 3, which equates to SPC samples with a surface area and total pore volume of 2700 $m^2g^{-1}$ and 1.5 $cm^3g^{-1}$, respectively. In contrast, the ratio is 2 for the best $CO_2$/$CH_4$ differentiation, which produces a surface area of 2,200 $m^2g^{-1}$ and total pore volume of 1.2 $cm^3g^{-1}$.

Moreover, in this Example, Applicants demonstrate that the optimum $CO_2$ uptake is not for a material with the highest pore volume or surface area, but for the material with $S_{BET}$>2000 $m^2g^{-1}$ and the highest percentage of a maximum fraction of narrower micro (<1 nm) and micro (<2 nm) porosity as compared to meso-pores (>2 nm). Increasing in the latter type of pores does increase both the surface area and pore volume, but not the $CO_2$ uptake.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of capturing $CO_2$ from an environment at pressures above 1 bar, the method comprising:
    associating the environment with a porous material,
    wherein the porous material comprises a surface area of at least 2,800 $m^2/g$, and a total pore volume of at least 1.35 $cm^3/g$,
    wherein the porous material has an oxygen content of more than about 10 wt % as measured by X-ray photoelectron spectroscopy,
    wherein a majority of pores of the porous material have diameters of less than 2 nm as measured from $N_2$ sorption isotherms using the BET (Brunauer-Emmett-Teller) method, and
    wherein the associating results in $CO_2$ capture from the environment by the porous material.

2. The method of claim 1, wherein more than about 60% of pores of the porous material have diameters of less than 2 nm.

3. The method of claim 1, wherein the porous material has an oxygen content between about 10 wt % and about 18 wt % as measured by X-ray photoelectron spectroscopy.

4. The method of claim 1, wherein the environment is a natural gas containing environment, an environment containing a mixture of gases, or combinations thereof.

5. The method of claim 1, wherein the $CO_2$ capture occurs by adsorption of the $CO_2$ to the porous material.

6. The method of claim 1, wherein the $CO_2$ capture occurs selectively over hydrocarbons in the environment.

7. The method of claim 1, wherein the porous material has a molar $CO_2$/$CH_4$ selectivity of at least about 2.5.

8. The method of claim 1, wherein the porous material has a $CO_2$ sorption capacity of at least about 100 wt % at 30 bar.

9. The method of claim 1, wherein the porous material comprises a porous carbon material with a carbon content of between 80% and 95% as measured by X-ray photoelectron spectroscopy.

10. The method of claim 9, further comprising a step of preparing the porous carbon material prior to the step of associating the porous material with the environment, the preparing of the porous carbon material being to synthesize or use an organic precursor with inherent oxygen content, the synthesizing including the step of exposing the organic precursor to an oxidant.

11. The method of claim 10, wherein the porous carbon material is prepared by heating the organic precursor in the presence of an activating agent, wherein the activating agent optionally comprises KOH or steam, and wherein the temperature of activation is between 700° C. and 800° C.

12. The method of claim 10, wherein the organic precursor comprises oxygen in a functional group, wherein the porous carbon material comprises an oxygen rich porous carbon material (OPC), and wherein the OPC includes an oxygen content of more than about 10 wt %.

13. The method of claim 12, wherein the functional group comprises a furyl, and wherein the organic polymer precursor polymerizes to form polyfurfuryl alcohol.

14. The method of claim 12, wherein the functional group comprises an anisyl, and wherein the organic polymer precursor polymerizes to form polyanisyl alcohol.

15. A method for the separation of $CO_2$ from natural gas in an environment at partial pressures of either component above 1 bar, the method comprising:
    associating the environment with a porous material,
    wherein the porous material comprises a surface area of at least 2,200 $m^2/g$, and a total pore volume of at least 1.00 $cm^3/g$,
    wherein the porous material has an oxygen content of more than about 10 wt % as measured by X-ray photoelectron spectroscopy, wherein a majority of pores of the porous material have diameters of greater than 1 nm and less than 2 nm as measured from $N_2$ sorption isotherms using the BET (Brunauer-Emmett-Teller) method, and wherein the associating results in $CO_2$ capture from the environment by the porous material.

16. The method of claim 15, wherein the porous material has an oxygen content between about 10 wt % and about 18 wt % as measured by X-ray photoelectron spectroscopy.

17. The method of claim 15, wherein the environment is a natural gas containing environment, an environment containing a mixture of gases, or combinations thereof.

18. The method of claim 15, wherein the $CO_2$ capture occurs by adsorption of the $CO_2$ to the porous material.

19. The method of claim 15, wherein the $CO_2$ capture occurs selectively over hydrocarbons in the environment.

20. The method of claim 15, wherein the porous material has a molar $CO_2/CH_4$ selectivity of at least about 2.5.

21. The method of claim 15, wherein the porous material has a $CO_2$ sorption capacity of at least about 100 wt % at 30 bar.

22. The method of claim 15, wherein the porous material comprises a porous carbon material with a carbon content of between 80% and 95% as measured by X-ray photoelectron spectroscopy.

23. The method of claim 22, further comprising a step of preparing the porous carbon material prior to the step of associating the porous material with the environment, the preparing of the porous carbon material being to synthesize or use an organic precursor with inherent oxygen content, the synthesizing including the step of exposing the organic precursor to an oxidant.

24. The method of claim 23, wherein the porous carbon material is prepared by heating the organic precursor in the presence of an activating agent, wherein the activating agent optionally comprises KOH or steam, and wherein the temperature of activation is between 700° C. and 800° C.

25. The method of claim 23, wherein the organic precursor comprises oxygen in a functional group, wherein the porous carbon material comprises an oxygen rich porous carbon material (OPC), and wherein the OPC includes an oxygen content of more than about 10 wt %.

26. The method of claim 25, wherein the functional group comprises a furyl, and wherein the organic polymer precursor polymerizes to form polyfurfuryl alcohol.

* * * * *